US009213950B2

(12) United States Patent
Randell

(10) Patent No.: US 9,213,950 B2
(45) Date of Patent: Dec. 15, 2015

(54) METHOD AND SYSTEM FOR MANAGING A PLURALITY OF PROCESSES OR TASKS

(76) Inventor: Anthony Keith Randell, Calgary (CA)

( * ) Notice: Subject to any disclaimer, the term of this patent is extended or adjusted under 35 U.S.C. 154(b) by 1026 days.

(21) Appl. No.: 12/028,486

(22) Filed: Feb. 8, 2008

(65) Prior Publication Data

US 2008/0195964 A1 Aug. 14, 2008

Related U.S. Application Data

(60) Provisional application No. 60/888,983, filed on Feb. 9, 2007.

(51) Int. Cl.
*G06F 3/048* (2013.01)
*G06Q 10/06* (2012.01)
*G06Q 10/00* (2012.01)

(52) U.S. Cl.
CPC ................ *G06Q 10/06* (2013.01); *G06Q 10/00* (2013.01)

(58) Field of Classification Search
CPC ............................... G06Q 10/00; G06Q 10/06
USPC ................... 715/772, 764, 771; 705/7, 8, 301
See application file for complete search history.

(56) References Cited

U.S. PATENT DOCUMENTS

| | | | | |
|---|---|---|---|---|
| 5,016,170 | A * | 5/1991 | Pollalis et al. | 705/7 |
| 5,365,360 | A * | 11/1994 | Torres | 715/802 |
| 5,745,110 | A * | 4/1998 | Ertemalp | 715/764 |
| 6,034,683 | A * | 3/2000 | Mansour et al. | 715/764 |
| 6,256,651 | B1 * | 7/2001 | Tuli | 705/7 |
| 7,302,401 | B1 * | 11/2007 | Tervonen | 705/9 |
| 7,426,701 | B2 * | 9/2008 | Strausbaugh et al. | 715/835 |
| 8,249,906 | B2 * | 8/2012 | Ponce de Leon | 715/751 |
| 2002/0038228 | A1 | 3/2002 | Waldorf et al. | |
| 2002/0091989 | A1 | 7/2002 | Cole et al. | |
| 2003/0033437 | A1 | 2/2003 | Fischer et al. | |
| 2005/0097536 | A1 * | 5/2005 | Bernstein | H04L 41/22 717/156 |
| 2007/0038963 | A1 * | 2/2007 | Moore | 715/859 |

* cited by examiner

*Primary Examiner* — Dino Kujundzic
(74) *Attorney, Agent, or Firm* — Bennett Jones LLP

(57) ABSTRACT

A computer-implemented method and system for processing data for monitoring, managing and/or displaying a plurality of processes, tasks or workflow events. According to an embodiment, the system includes an interface for inputting data, wherein the data comprises data associated with a business process, a processor configured for processing the data and configured for generating a graphical representation of the processed data, and wherein the graphical representation comprises one or more elements responsive to an input, and the one or more elements are configured to present additional information for the business process in response to the input.

31 Claims, 87 Drawing Sheets

5100

6000

7500

7600

7800

7900

METHOD AND SYSTEM FOR MANAGING A PLURALITY OF PROCESSES OR TASKS

COPYRIGHT NOTICE

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention relates to computer systems and more particularly, to a computer-implemented method and system for processing data for managing and/or monitoring a plurality of processes or tasks.

BACKGROUND OF THE INVENTION

Workflow is typically described as the order in which activities take place to complete a process, for example, a business process. Workflow tools or engines are known in the art. A workflow engine allows a user to model business processes and control the order in which the activities associated with the business process are executed.

While workflow engines allow a user to model or control the flow of the business process, the implementation of a workflow engine is non trivial. A business analysis must be performed to determine the workflow model(s). Then, the workflow engine is installed and configured according to the business analysis. Depending on the business process, the configuration of the workflow engine can be quite complex. Installation and configuration is followed by user training. As can be appreciated implementation can be not only expensive but resource intensive.

In view of the complexity and expense associated with existing workflow tools, there remains a need in the art for improvements and new features.

SUMMARY OF THE INVENTION

The present invention provides a computer-implemented method and system for processing data for monitoring, managing and/or displaying a plurality of processes, tasks or workflow events.

The system and method according to an embodiment of the invention includes one or more of the following functions:

- the capability to view on one screen a plurality of instances with activities that occurred within a defined period, for example, the last 48 hours
- the execution path of a business process
- differences in the execution paths of instances of a business process, where the business process includes decision steps (i.e. conditional logic)
- elapsed time to complete an instance of a finite business process
- execution time for monitored activities in a business process or an instance of a business process
- the capability to view attributes of an instance of a business process; and/or the capability to view attributes of an activity in a business process According to a first aspect, there is provided a system for managing a business process, the system comprises: an interface for inputting data, wherein the data comprises data associated with a business process; a processor configured for processing the data and configured for generating a graphical representation of the processed data; wherein the graphical representation comprises one or more elements responsive to an input, and the one or more elements are configured to present additional information for the business process in response to the input.

According to another aspect, there is provided a computer-implemented method for representing a business process, the computer-implemented method comprises the steps of: inputting data associated with the business process; processing the data according to one or more parameters; generating a graphical representation of the processed data, wherein the graphical representation includes one or more elements responsive to an input; and displaying additional information associated with the business process in response to the one or more elements being actuated.

According to a further aspect, there is provided a computer program product for generating a graphical representation of a business process, the computer program product comprises, a storage medium configured to store computer readable instructions; the computer readable instructions include instructions for, inputting data associated with the business process; processing the data according to one or more parameters; generating a graphical representation of the processed data, wherein the graphical representation includes one or more elements responsive to an input; displaying additional information associated with the business process in response to the one or more elements being actuated.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which:

FIG. 2(*b*) shows a screen shot of a business process entry screen or window for the system of FIG. 1 according to an embodiment of the invention;

FIG. 2(*c*) shows a screen shot of the main screen or window of FIG. 2(*a*) with an activated drop down box;

FIG. 2(*d*) shows a screen shot of an instances table for data lookup screen or window for the system of FIG. 1 according to an embodiment of the invention;

FIG. 2(*e*) shows a screen shot of an activity table for data lookup screen or window for the system of FIG. 2(*d*) according to an embodiment of the invention;

Like reference numerals indicate like or corresponding elements in the drawings.

DETAILED DESCRIPTION OF THE EMBODIMENTS OF THE INVENTION

A business process can be defined as a group or set of one or more business activities that are linked by a common thread. For the example of a home building company, the building and selling of a home is an instance of a business process. The instance, in turn, comprises a number of activities, for example, excavation, building of foundation, framing, roofing, drywall, mechanical and electrical, etc. A unique identifier or key, such as a job number, is provided as the common thread that relates all activities for a specific home.

In the context of the present description, there are two types of business processes, a "finite business process" and a "continuous business process". A finite business process is defined as a business process (or an instance of a business process) having a "start date" and an "end date". Finite business processes typically follow ordered activities, i.e. workflow. For the example of the home building company, the start date could be the commencement date for construction of a home and the end date could be the closing date of the sale of the home. As will be described in more detail below, the method and system according to an embodiment of the present invention provides the capability to perform instance time line comparisons.

A continuous business process, on the other hand, does not have a defined end date. The continuous business process deals with management and monitoring of the finite processes for a business. For example, a home building company will typically build more than one home. To optimize their processes, they have to efficiently plan and manage resources across several instances (i.e. home building projects). For instance, an excavator can only dig one basement at a time. As soon as one house basement excavation is complete, the excavator should be moving to another home (i.e. instance).

It will be appreciated that the business processes for some applications or companies will comprise both finite and continuous business processes, while some companies will have only finite business processes.

Figure 1:
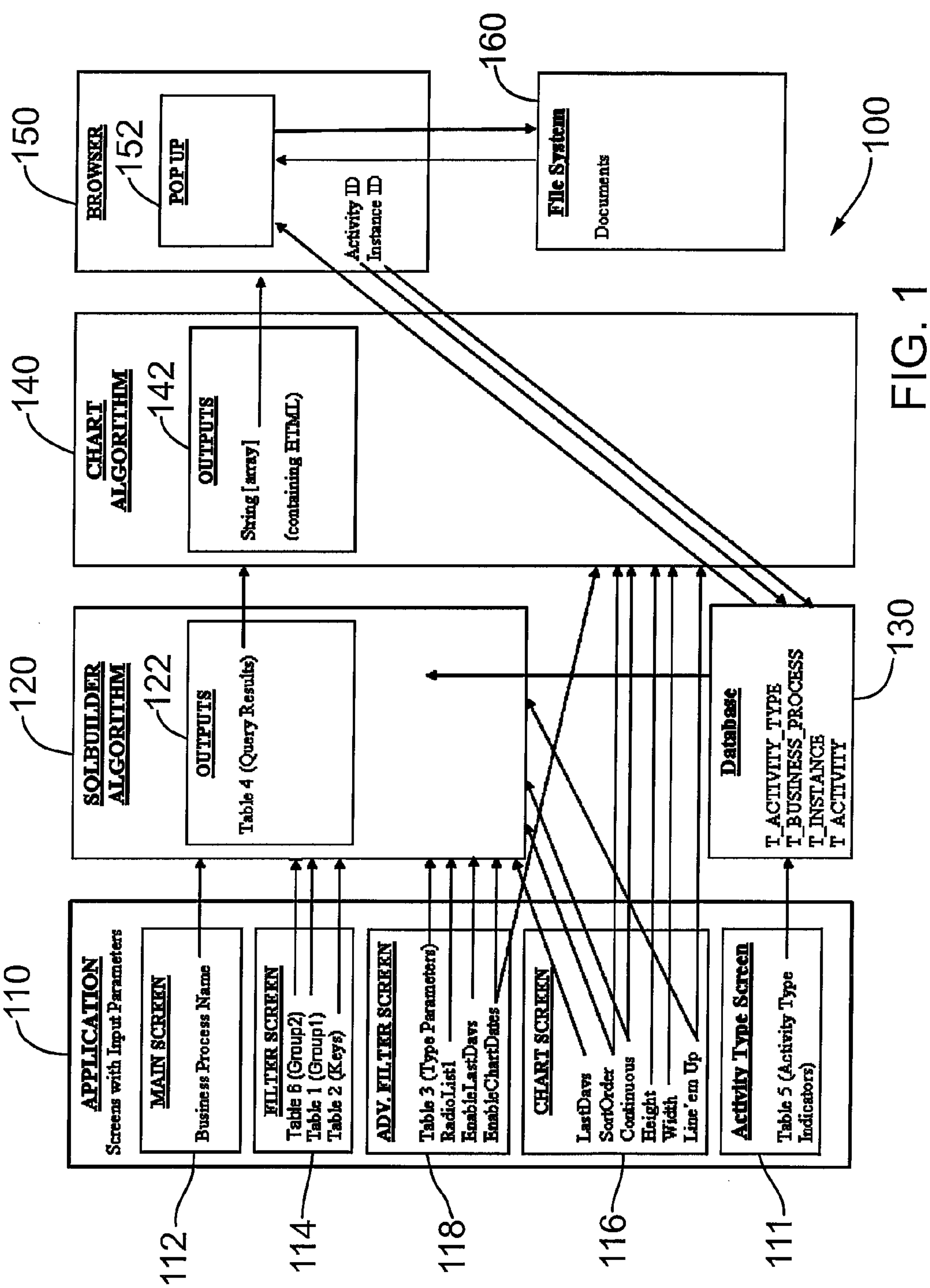
FIG. 1 shows in block diagram form a system for managing and monitoring a plurality of tasks or business processes according to an embodiment of the present invention.
Figure 2A:
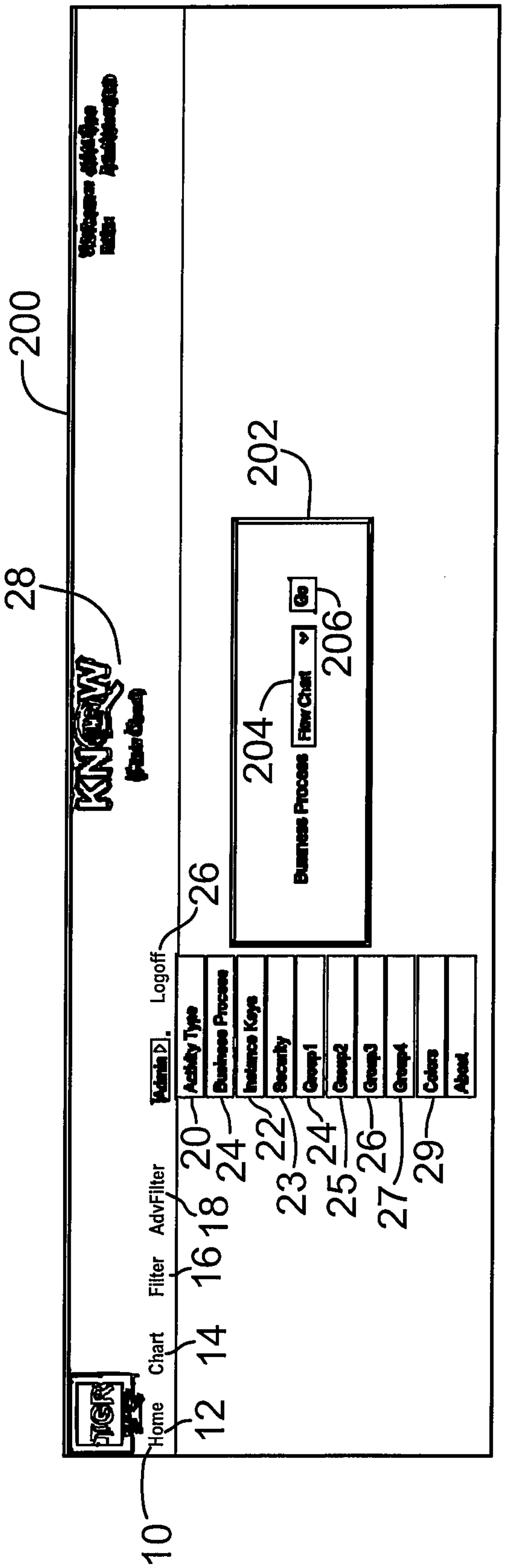
FIG. 2(*a*) shows a screen shot of the main screen or window for the system of FIG. 1 according to an embodiment of the invention.
Figure 2B:
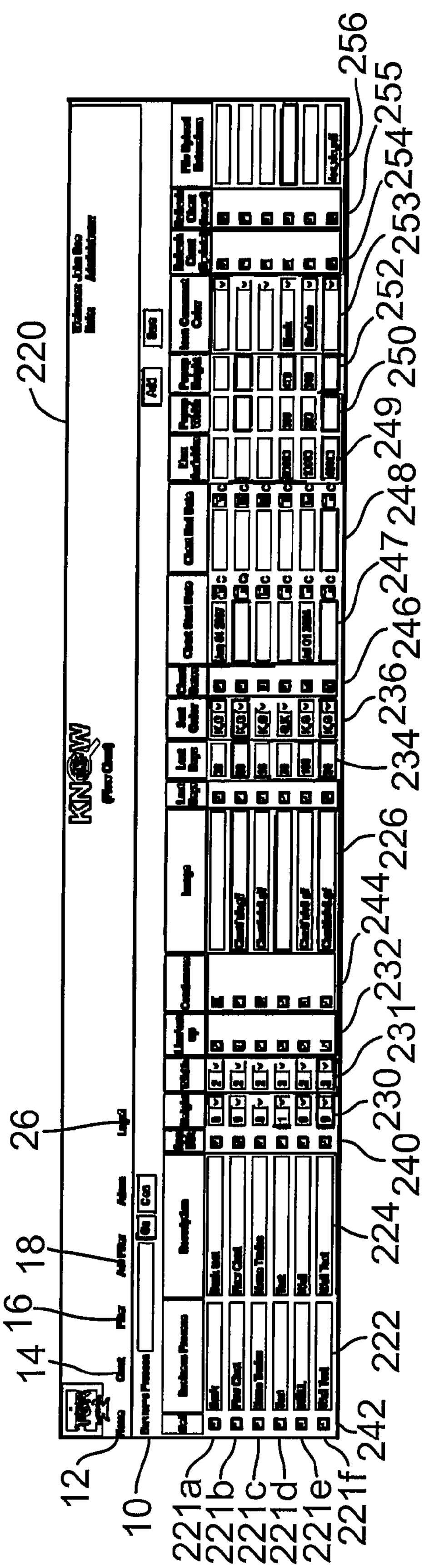
Figure 2C:
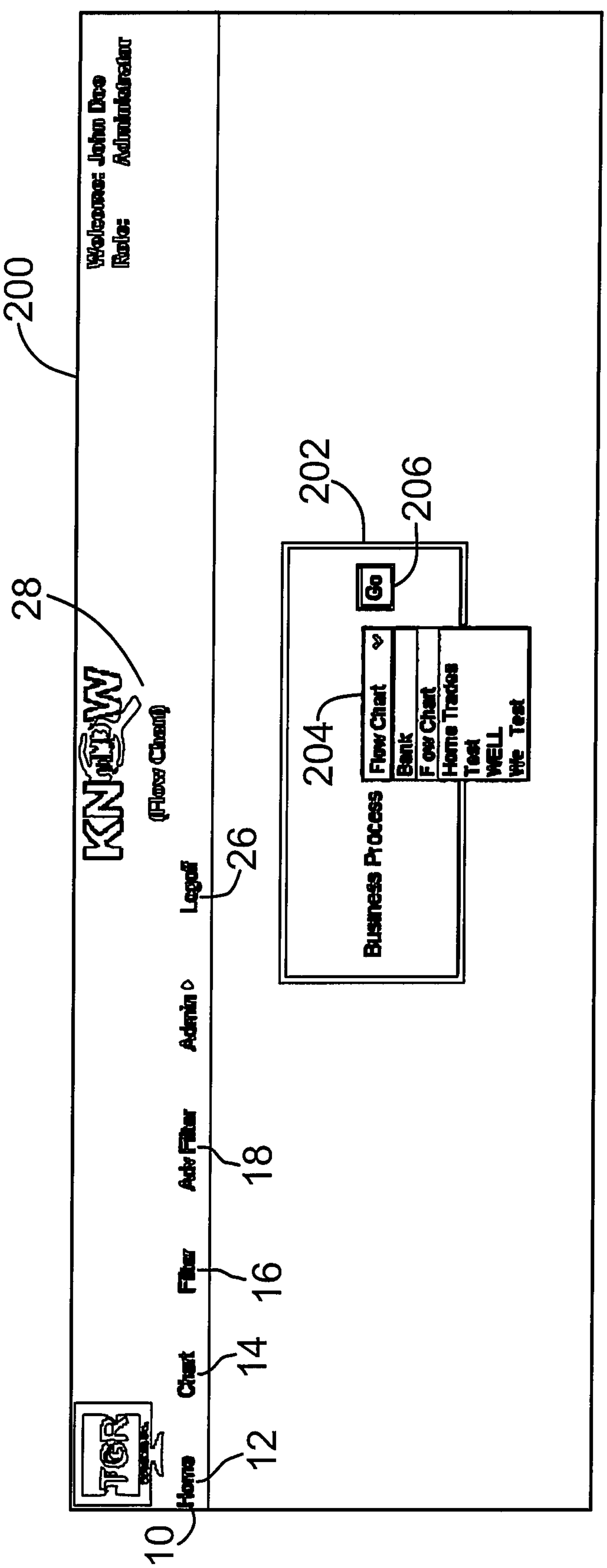
Figure 2D:
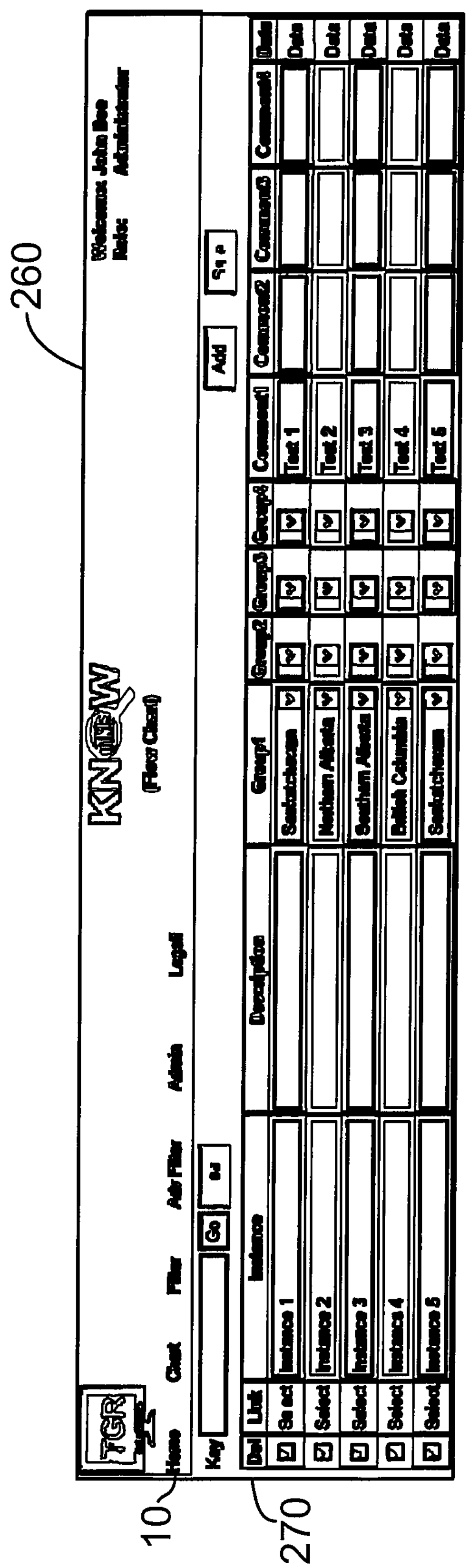
Figure 2E:
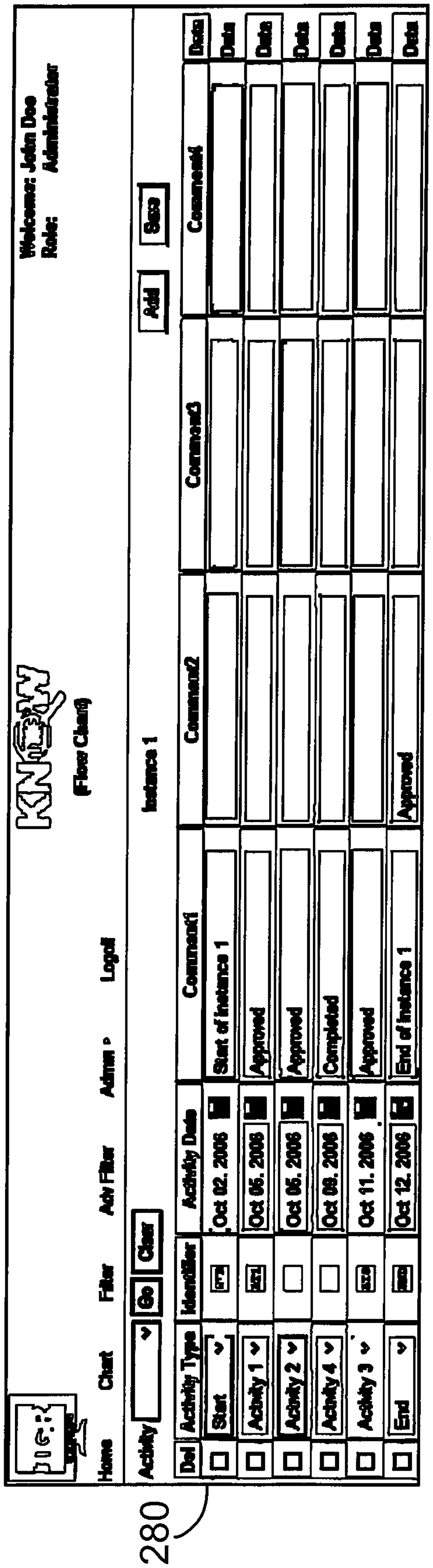

Reference is made to FIG. 1, which shows a system for monitoring and managing a business process according to an embodiment of the invention. The system is indicated generally by reference 100. According to an embodiment, the system 100 comprises an interface module and processor module. As will be described in more detail below, the interface module for system 100 is configured as a graphical interface which allows a user to enter and manage data and generates one or more graphical representations which are responsive to further inputs or actions from the user. The processor module comprises one or more processes configured to process the data, generate various graphical representations, and provide user interaction with the various graphical representations.

Figure 6:
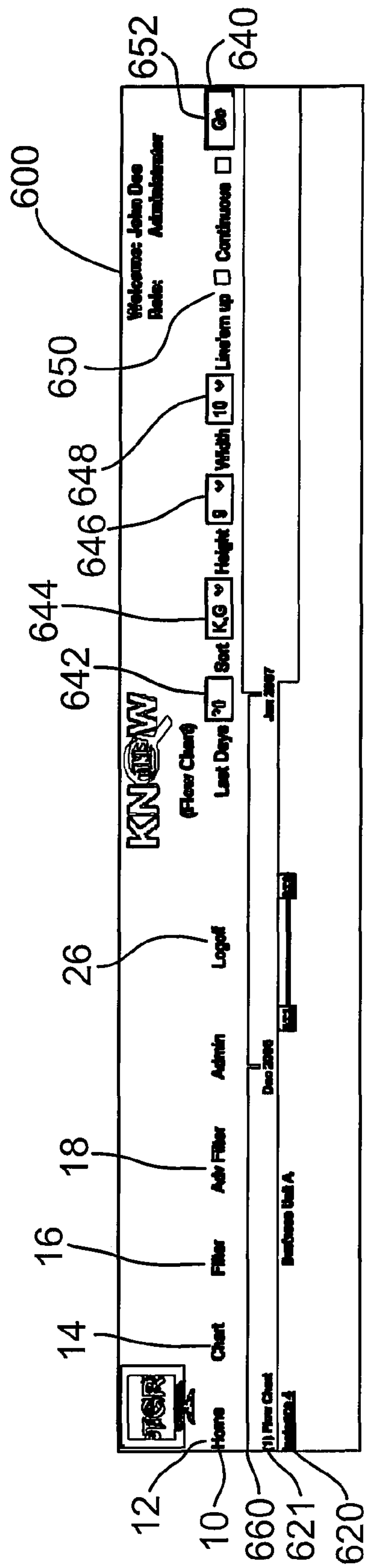
FIG. 6 shows a screen shot of a business process chart or timeline screen or window according to an embodiment of the present invention.
Figure 9:
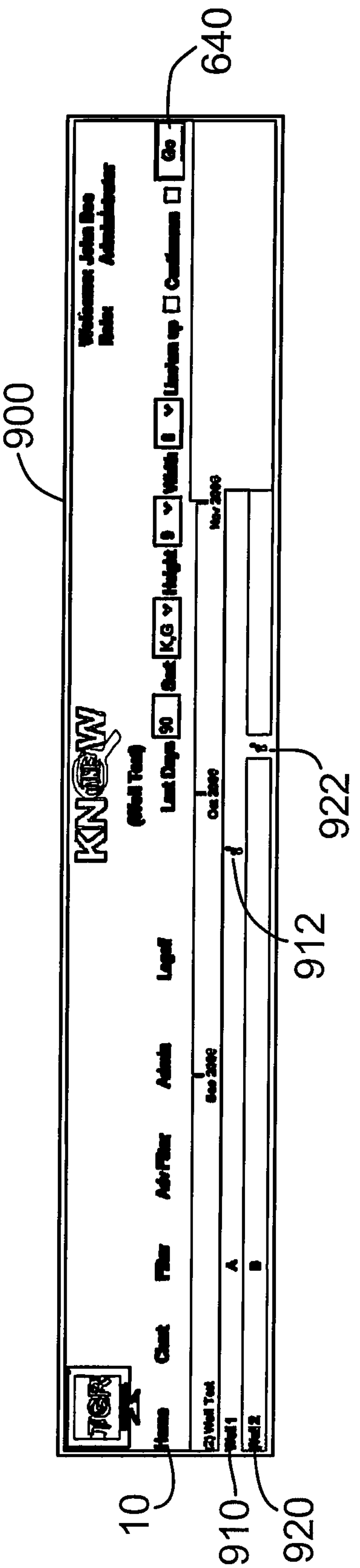
FIG. 9 shows a screen shot of a chart screen generated for an exemplary "Well Test" business process.
Figure 10:
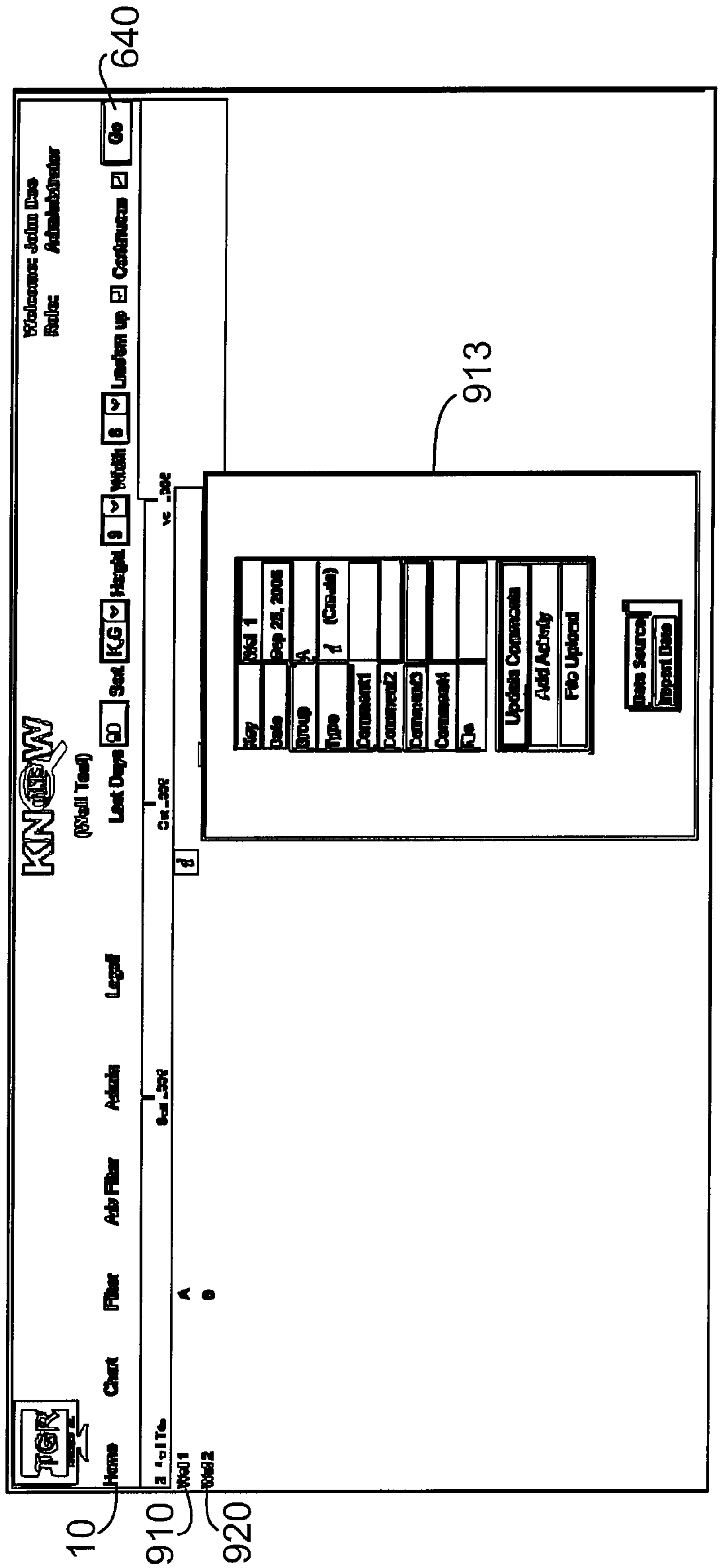
FIG. 10 shows a screen shot of the chart screen of FIG. 9 with a display box for Activity "i"

According to one aspect, the system 100 operates to generate a graphical display of a business process (and associated instances and activities) in various formats that allow for monitoring of the business process and/or cycle time analysis. As shown, the system 100 comprises an application module 110, a query module 120, a database module 130 and a chart module 140. An embodiment of the database module 130 is described in more detail below with reference to FIG. 7. According to an embodiment, the output of the chart module 140 is an array of HTML strings (indicated generally by reference 142), which are intended for display on a web browser 150, such as Internet Explorer™ from Microsoft Corporation. The web browser 150, in known manner, renders a graphical chart, for example as depicted in FIGS. 6, 9, 10, etc., as described in more detail below. As shown in FIG. 1, the web browser module 150 includes a pop-up module indicated by reference 152. According to an embodiment, the system 100 includes a file system module indicated by reference 160. The file system module 160 is configured to store "Documents" according to an Attach File function as described in more detail below.

Figure 3:
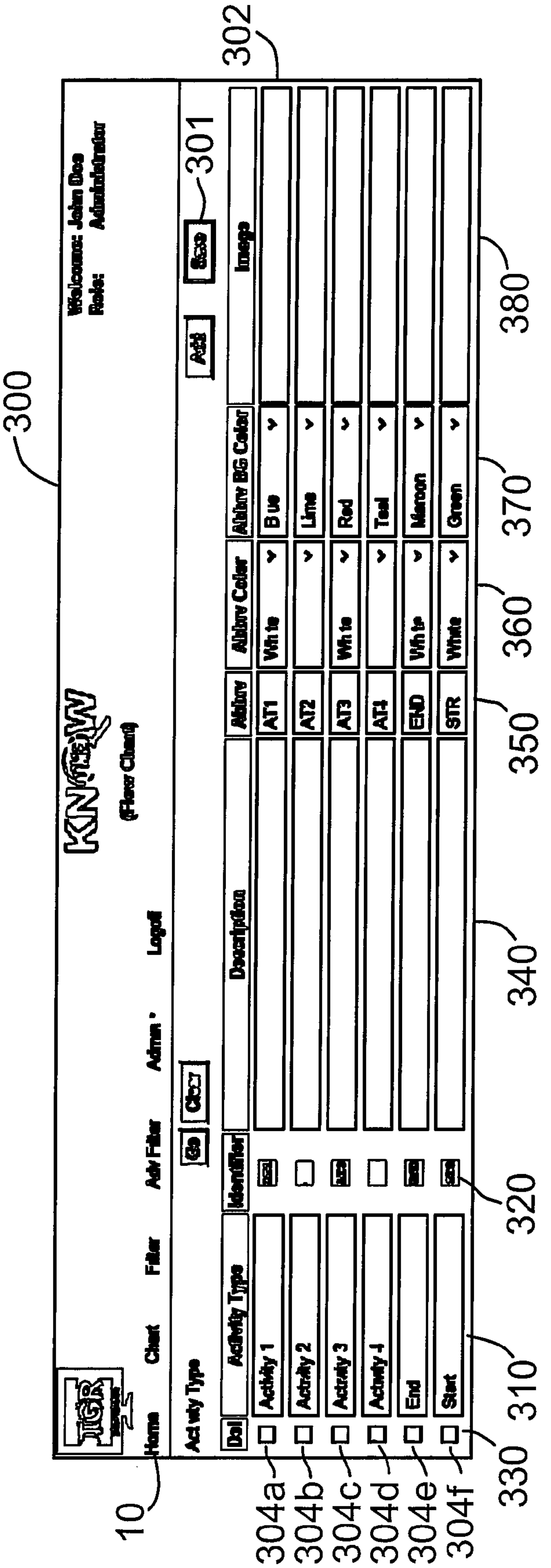
FIG. 3 shows a screen shot of an activity type screen or window for the system of FIG. 1 according to an embodiment of the invention.
Figure 4:
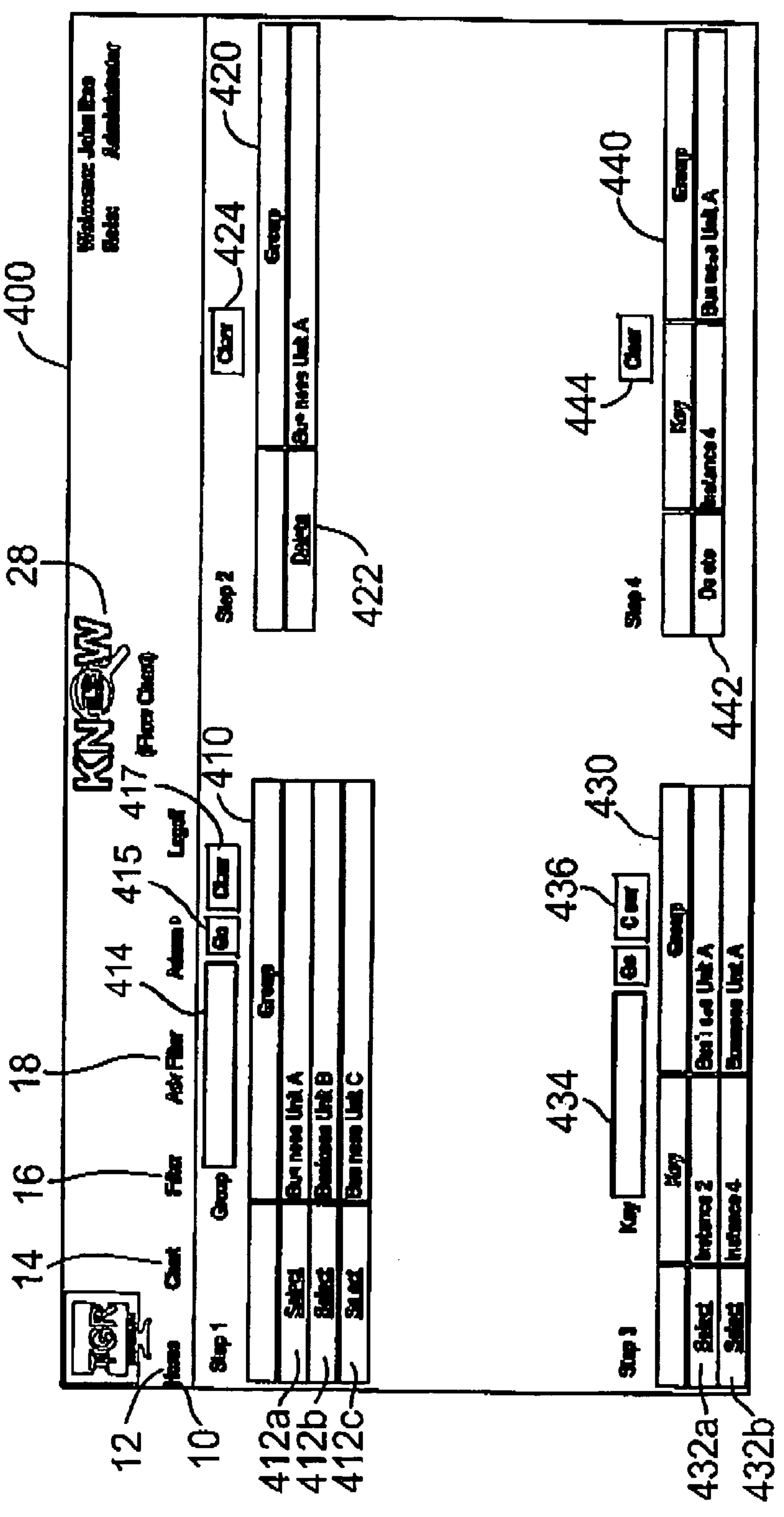
FIG. 4 shows a screen shot of a filter screen or window for the system of FIG. 1 according to an embodiment of the invention.
Figure 5:
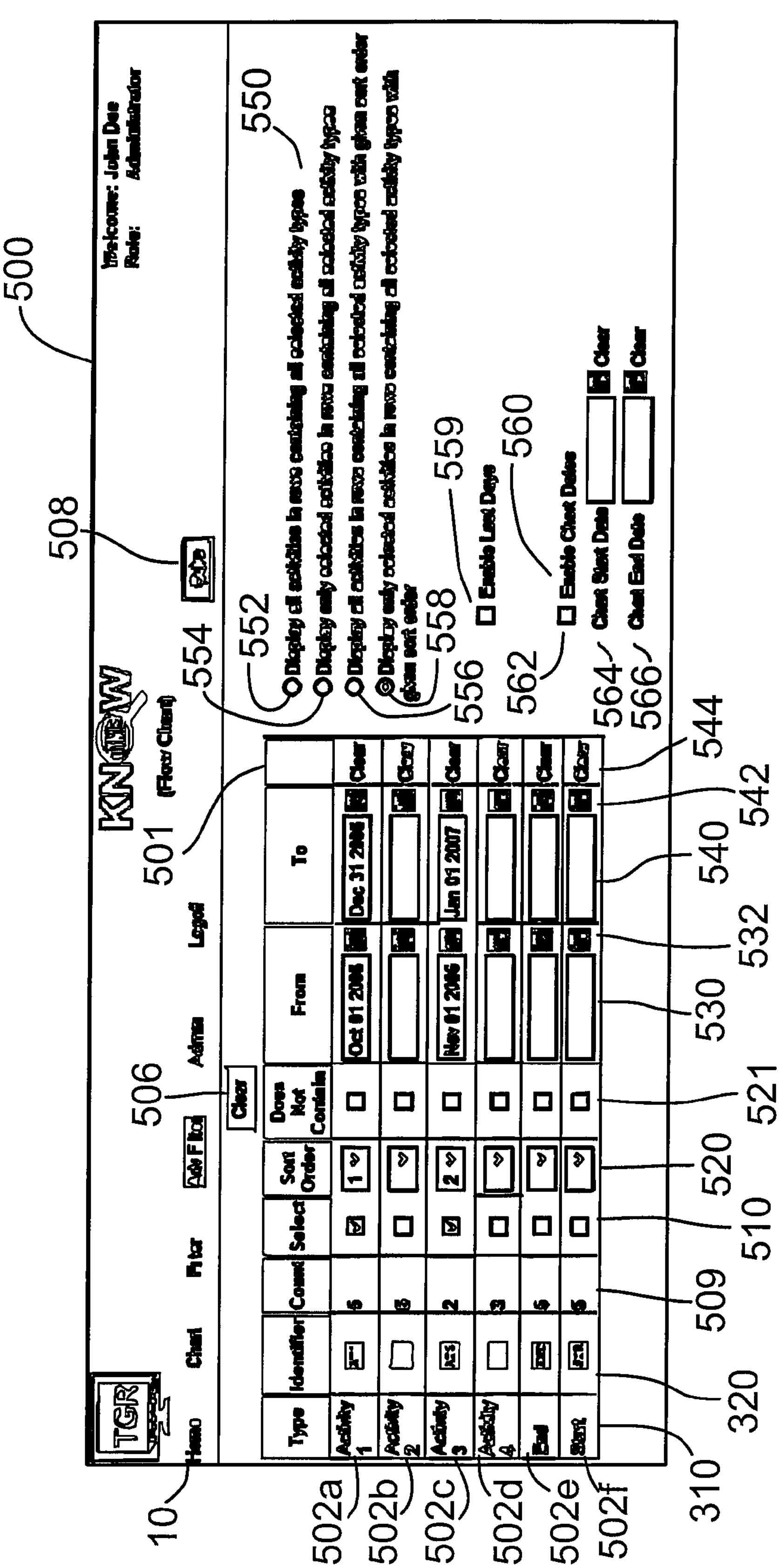
FIG. 5 shows a screen shot of an advanced filter screen or window for the system of FIG. 1 according to an embodiment of the invention.

The application module 110 according to an embodiment of the invention comprises a number of screens or windows which are implemented for a web browser that runs in a graphical user interface such as a Windows™ based platform and includes the underlying code (e.g. objects and/or functions) to provide the described functionality as will be within the understanding of one skilled in the art. The application module 110 includes an Activity Type screen 111, a Main screen 112, a Filter screen 114 and a Chart screen 116. The application module 110 may also include an Advanced Filter screen 118 according to an embodiment. As shown, the system 100 includes a database module 130 as described in more detail below with reference to FIG. 7. In addition, the application module 110 may include a Business Process Entry/Modify screen as depicted in FIG. 2(*b*), and a Data Lookup screen as depicted in FIG. 2(*d*), as described in more detail below. An exemplary implementation of the Main screen 112 is shown in FIG. 2(*a*) and denoted generally by reference 200. An exemplary implementation of the Business Process Entry/Modify screen is shown in FIG. 2(*b*) and denoted generally by reference 220. An exemplary implementation of the Data Lookup screen according to an embodiment is shown in FIG. 2(*d*) and denoted generally by reference 260. An exemplary implementation of the Data Lookup screen according to another aspect is shown in FIG. 2(*e*) and denoted generally by reference 280. An exemplary implementation of the Activity Type screen is shown in FIG. 3 and denoted generally by reference 300. An exemplary implementation of the Filter screen is shown in FIG. 4 and denoted generally by reference 400. An exemplary implementation of the Advanced Filter screen is shown in FIG. 5 and denoted generally by reference 500. An exemplary implementation of the Chart screen is shown in FIG. 6 and denoted generally by reference 600.

Reference is made to FIG. 2(*a*), which shows an implementation of the Main screen 200. The Main screen 200 is configured to select or access a business process. In this example, the business process is denoted as "Flow Chart". The Main screen 200 includes a frame or panel 202 with a pull-down box 204. The pull-down box 204 provides a list of the business processes entered into the system 100 (for example, via the Business Process Entry screen 220). One of the business processes is selected from the list in the pull-down box 204, for example, "Flow Chart", and a Go button 206 is clicked, as depicted in FIG. 2(*c*). In response to the Go button 206, the system 100 displays the name of the new Active Business Process in a header field 28, for example, the Active Business Process named "Flow Chart". In addition, the underlying code, e.g. functions and/or objects, populate variables with default values retrieved from the database module 130. According to one embodiment, the default values are retrieved from the database, and data entered in 220 and 300 is saved in the database first. For example, if a user changes the default width on the business process "Flow Chart" to 10, then the user must click "Save" to save it to the data table T_BUSINESS_PROCESS. The default(s) are then loaded from T_BUSINESS_PROCESS.

As shown in FIG. 2(*a*), the Main screen 200, the Business Process Entry screen 220 (FIG. 2(*b*)), the Data Lookup screen 260 (FIG. 2(*d*)), the Activity Type screen 300 (FIG. 3), the Filter screen 400 (FIG. 4), the Advanced Filter screen 500 (FIG. 5) and the Chart screen 600 (FIG. 6), include a common menu bar 10 comprising a Home menu option 12, a Chart menu option 14, a Filter menu option 16, an Adv Filter menu option 18, an Admin menu option 19 and Logoff menu option 26. The Chart menu option 14 allows the Chart screen 600 (FIG. 6) to be accessed from any of the screens. The Filter menu option 16 allows the Filter screen 400 (FIG. 4) to be accessed from any of the screens. The Adv Filter menu option 18 allows the Advanced Filter screen 500 (FIG. 5) to be accessed from any of the screens.

Figure 7:
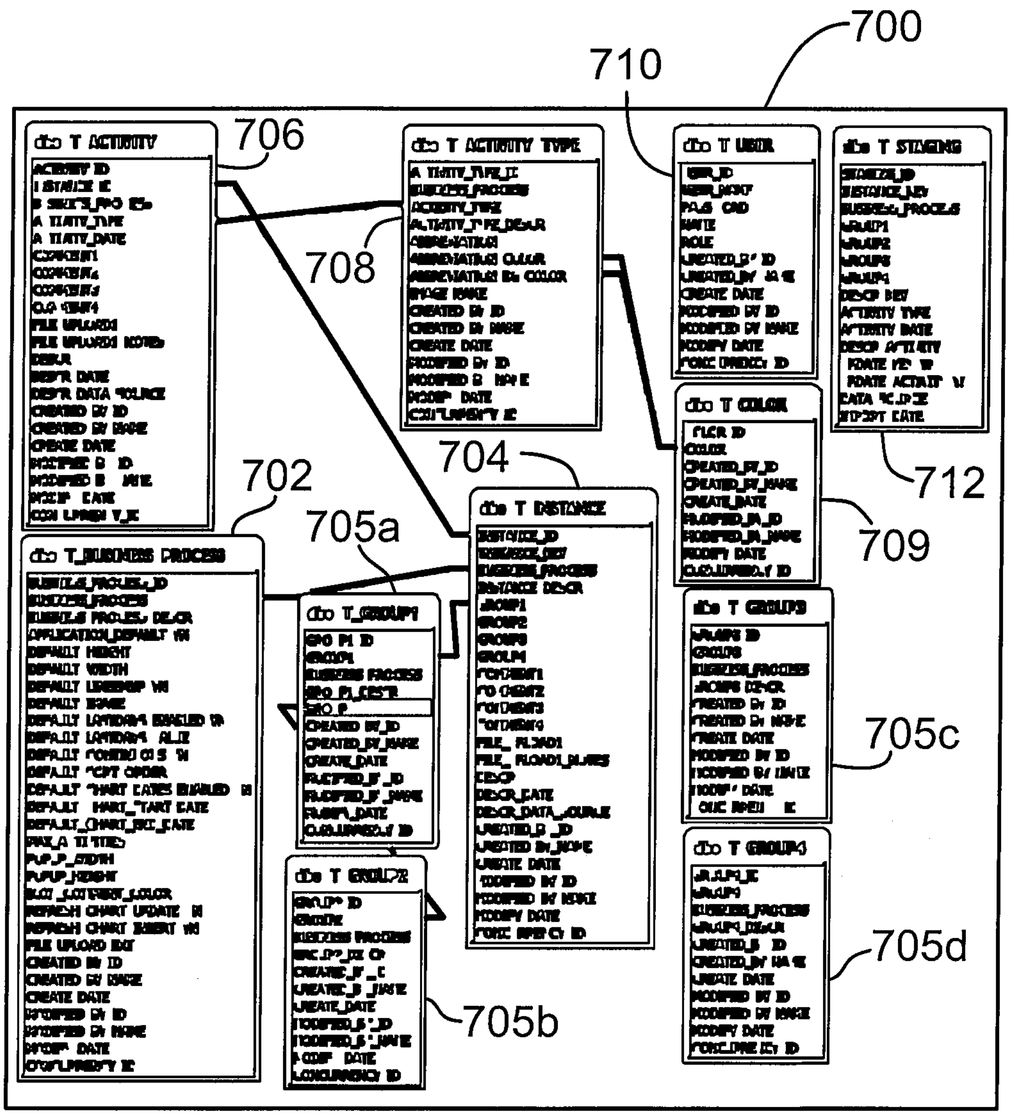
FIG. 7 shows in diagrammatic form a data structure or schema for the system of FIG. 1 according to an embodiment of the invention.
Figure 42:
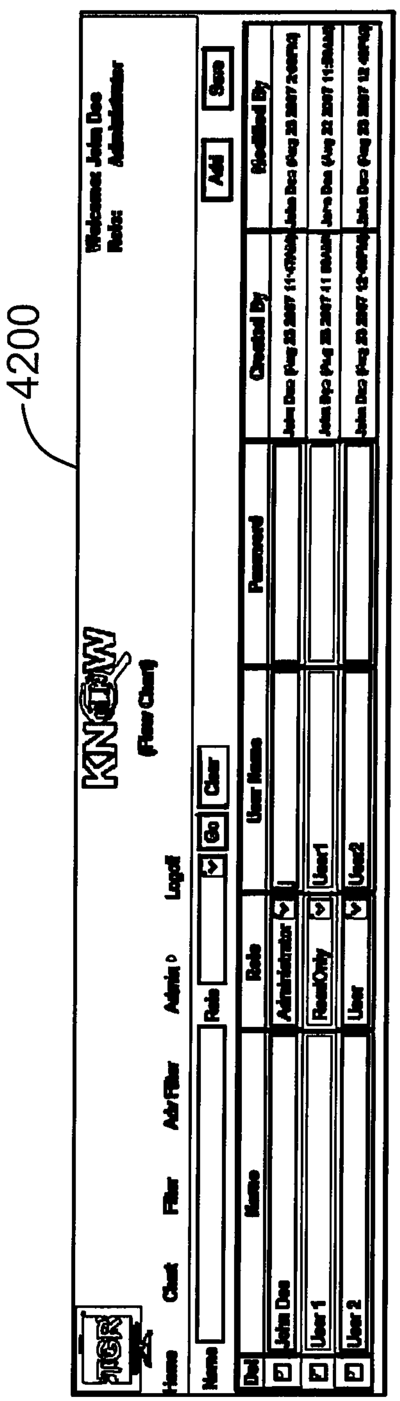
FIG. 42 shows a screen shot of a security screen according to an embodiment of the invention.

The Admin dropdown menu 19 allows a user with "administrator" privileges to access the functions associated with the system. According to an embodiment, the Admin dropdown menu 19 includes the following options:

- an Activity Type 20 menu option, which is configured to allow a user to maintain data in a T_ACTIVITY_TYPE data block as depicted in FIG. 7;
- an Instance Keys 22 menu option, which is configured to allow a user to maintain data in a T_INSTANCE data block as depicted in FIG. 7. A user can also maintain data in a T_ACTIVITY data block as depicted in FIG. 7 using the Activity screen in FIG. 2(*e*);
- a Business Process 24 menu option, which is configured to allow users to maintain data in a T_BUSINESS_PROCESS data block as depicted in FIG. 7;
- a "Security" menu option 23, which is configured to allow a user to maintain data in a T_USER data block as depicted in FIG. 7. The Security menu option 23 results in a Security screen being displayed as depicted in FIG. 42;
- a "Group1" menu option 24, which is configured to allow a user to maintain data in a T_GROUP1 data block as depicted in FIG. 7;
- a "Group2" menu option 25, which is configured to allow a user to maintain data in a T_GROUP2 data block as depicted in FIG. 7;
- a "Group3" menu option 26, which is configured to allow a user to maintain data in T_GROUP3 data block as depicted in FIG. 7.
- a "Group4" menu option 27, which is configured to allow a user to maintain data in T_GROUP4 data block as depicted in FIG. 7.
- a "Colors" menu option 29, which is configured to allow a user to maintain data in T_COLOR data block as depicted in FIG. 7.

Reference is next made to FIG. 2(*b*), which shows an implementation of the Business Process Entry/Modify screen 220. As described above, the Business Process screen 220 is implemented for a web browser that runs in a graphical user interface such as Windows™ based platform according to one embodiment and includes the underlying code to provide the described functionality as will be within the understanding of one skilled in the art. A user uses the Business Process screen 220 to enter or define a new business process and/or to modify an existing (i.e. already entered) business process. As shown, the Business Process Entry screen 220 provides a row 221 (indicated individually by references 221*a* to 221*f* in FIG. 2(*b*)) for each business process. Each row 221 comprises a Process name entry column 222, a process description column Desc 224 and an Image column 226. Each row 221 includes respective columns for the "Quick Filter" menu parameters, Height 230, Width 231, Line'em Up 232, Last Days 234 and Sort Order 236. The name of the business process is entered in the Business Process name entry column 222 for the row, for example, row 221*f*. As shown, the other descriptors and parameters are defined in the Desc column 224, the Image column 226, the Height 230 and Width 231 columns, the Line'em Up column 232, the Last Days column 234 and/or the Sort Order column 236. If a visual indicator is not configured (i.e. using the Configuration screen), then the image specified in the Image column 226 becomes the default image. As shown, the Business Process Entry screen 220 includes a Default column 240 for selecting one of the business processes as the default process, e.g. the business process shown in the display panel 202 on the main screen 200 (FIG. 2(*a*)) after a user logs in. A Delete column 242 may be provided and is configured to allow selected row(s) to be deleted, for example, by "selecting" and clicking the "Save" button. According to another embodiment, business process data are received from another system or application and entered into the system and then made available for editing using some or all of the functions described for FIG. 2(*b*).

Figure 11:
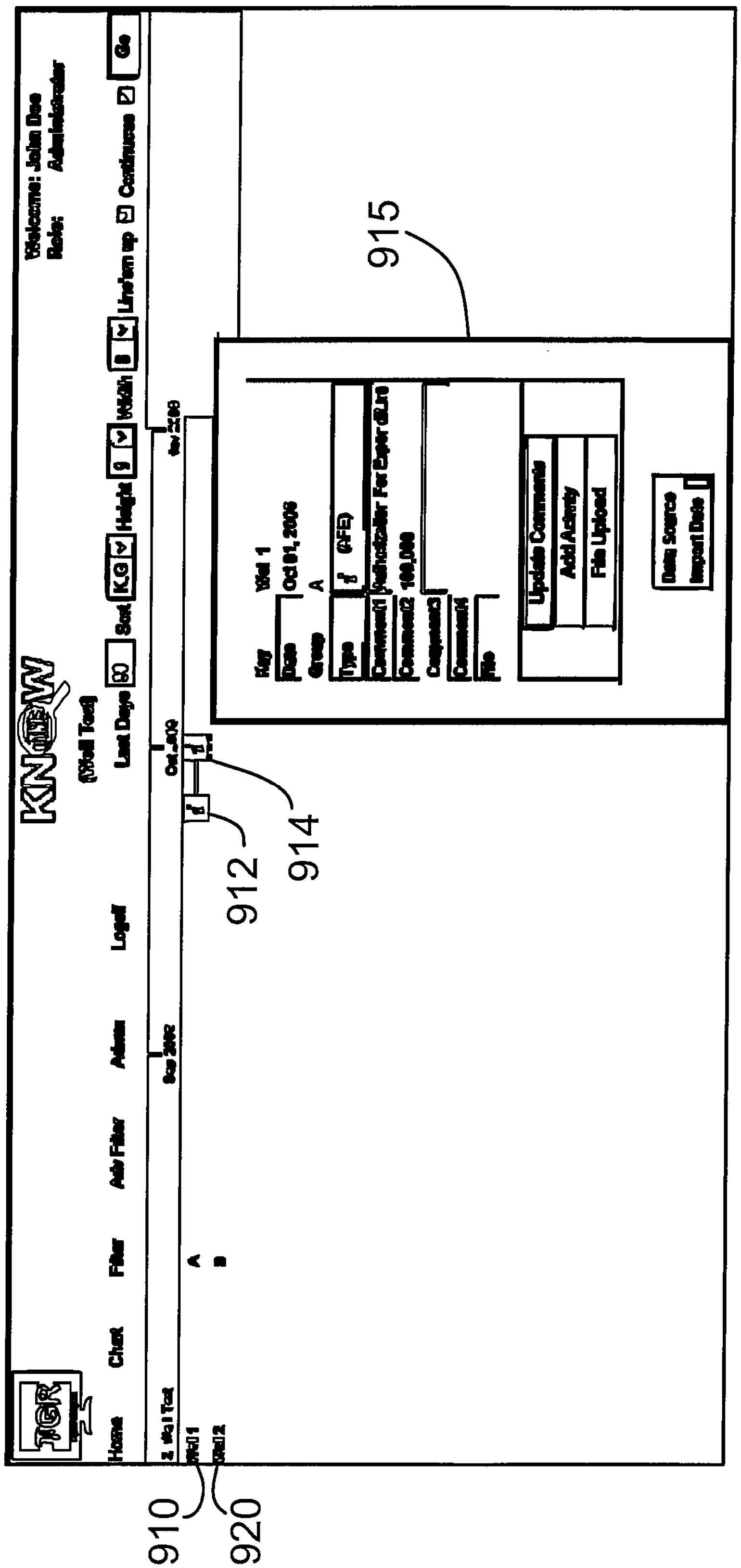
FIG. 11 shows a screen shot of the chart screen of FIG. 9 with a display box for an AFE Activity.

As shown in FIG. 2(*b*), the Business Process Entry/Modify screen 220 is further configured according to an embodiment to include a "Continuous" column 244, a "Chart Dates" column 246, a "Chart Start Date" column 247, a "Chart End Date" column 248, a "Max Activities" column 249, a "Popup Width" column 250, a "Popup Height" column 252, an "Icon Comment Colour" column 253, a "Refresh Chart (update)" column 254, a "Refresh Chart (insert)" column 255, and a "File upload Extensions" column 256. The Continuous column 244 is configured to provide a default value for quick menu 640. The Chart dates column 246 is configured to provide a default value for Enable Chart dates on the Advance Filter screen 500 (FIG. 5). The Chart Start Date 247 and Chart End Date 248 columns are configured for selecting or defining default dates for chart start and end dates on the Advance filter screen 500 (FIG. 5). The Max Activities column 249 is configured to provide limits on the number of activities a user can display on the chart screen. According to an embodiment, if the number of activities to be displayed exceeds this number the Chart will not display (i.e. the HTML in logic block 142 (FIG. 1) is not created and not rendered to the browser 150 (FIG. 1)). For example, if a user attempts to load a 100,000 or more icons, system performance may be impacted. The Popup Width 250 and the Popup Height 252 columns are configured to allow a user to specify the size of the popup display box (i.e. the popup box 152 in FIG. 1) when an activity icon is clicked. The Icon Comment Color column 253 is configured to display a line under icon if there are comments in the Popup display box. This value in this column determines the color of the line. The Refresh Chart (update) column 254 is configured to provide automatic refreshing, e.g. without clicking Chart on the main menu, of the chart screen if a user modifies Activity comments. The Refresh Chart (insert) column 255 is configured to provide automatic refreshing, e.g. without clicking Chart on the main menu, of the chart screen if a user Inserts a new Activity. The File upload Extensions column 256 is configured to operate in conjunction with the Activity display box, for example, as depicted in FIG. 11. According to an embodiment as shown in FIG. 11, the Activity display box includes three menu options: "Update comments", "Add Activity" and "File Upload". According to an embodiment, if the "File upload extension" does not contain a value for a business process, then the "File Upload" button do not display in the popup box If a value exists, then the uploaded file includes this extension. For example, if the value is "doc", then *.doc files are uploaded. According to another aspect, to enable uploads of multiple file types, the extensions are separated by a comma, and "doc,xls, pdf" results in "doc" "xls" and "pdf" type files being uploaded.

Reference is next made to FIGS. 2(*d*) and 2(*e*), which shows an implementation of the Data Lookup screen 260 comprises an Instance table as denoted by reference 270 in FIG. 2(*d*) and an Activity table as denoted by reference 280 in FIG. 2(*e*). As described above, the Data Lookup screen 260 is implemented for a web browser that runs in a graphical user interface such as a Windows™ based platform according to one embodiment and includes the underlying code to provide the described functionality as will be within the understanding of one skilled in the art. The Data Lookup screen 260 displays data associated with the business processes. According to one embodiment, the data displayed is dependent on the selected Active Business Process (i.e. selected in the Main screen 200). The Instances table 270 displays the instances and the Activity table 280 displays the activities for the selected instance. The ability to modify and/or add data in the Data Lookup screen 260 is controlled by a "user permissions" function as described in more detail below. The data in the Instances table 270 is persisted in a "T_INSTANCE" block in the database 130 (FIG. 1). Data in the Instances table 270 is also used to populate data in frames 430 and 440 in FIG. 4, as described in more detail below. It will be appreciated that this data corresponds to "Table 2" in 114 of FIG. 1.

According to an embodiment, the Activity Table 280 for the Data Lookup screen 260 is configured to display when the word "Select" is clicked on the link column in Table 270. The data in the Activity table 280 is persisted in a "T_ACTIVITY" block in the database 130 (FIG. 1). Data in Table 501 (FIG. 5) is used to populate data in Table 280.

Reference is next made to FIG. 3, which shows an implementation of the Activity Type screen 300. As described above, the Activity Type screen 300 is implemented or configured for a web browser that runs in a graphical user interface such as a Window™ based platform according to one embodiment and includes the underlying code to provide the described functionality as will be within the understanding of one skilled in the art. The Activity Type screen 300 allows the user to change attributes, for example, display attributes, associated with the "Activities" for a business process or instances of the business process. The business process (i.e. the Instances and/or the Activities) is defined by the user through the Business Process Entry screen 220 (FIG. 2(*b*)). As shown, the Activity Type screen 300 includes the main menu bar 10 and menu options as described above. As shown, the Activity Type screen 300 includes a main frame or panel 302 which has a row 304 for each activity for the selected business process. For the depicted business process "Flow Chart", there are activities 304, indicated individually as 304*a*, 304*b*, 304*c*, 304*d*, 304*e* and 304*f* for Activity 1, Activity 2, Activity 3, Activity 4, End and Start, respectively. Each row 304 comprises an Activity Type column 310, an Identifier column 320, a Delete column 330, a Description column 340, an Abbry column 350, an Abbry Color column 360, an Abbry BG Color column 370 and Image column 380. The End activity 304*e* and the Start activity 304*f* specify or define the End date and Start date, respectively, for the business process (i.e. instance). The Abbry column 350 allows a user to define an identifier (i.e. by entering a text string) for each of the activities and the end and start dates, and the corresponding identifier for each row is displayed in the Identifier column 320. The Abbry Color column 360 allows the user to select a font color for each of the activity abbreviations in column 320. The user selects the font color from a pull-down list for each row in the column 360. The Abbry Color BO column 370 allows the user to select the background color for the activity abbreviations in column 320 and is also implemented with a pull-down list for each row. The Image column 380 allows the user to select a symbol for each of the activities 304. The Identifiers defined for each of the activities in column 320 are displayed on the Chart screen 600, as described in more detail below. The Delete column 390 allows the user to click and delete a selected row. Data in the Activity Type screen 300 is persisted in T_ACTIVITY_TYPE in block 130 of FIG. 1. The data in this table is also used to populate Table 3 in block 118 of FIG. 1.

As will be described in more detail below, the query module 120 (FIG. 1) returns an output 122, which comprises a data table 4 containing instance/activity information which is used to generate a graphical rendering for display on the Chart screen 600 (FIG. 6). According to one embodiment, the data table 4 includes data for the Abbrv column 350, the Abbrv Color 360, the Abbrv Color BG 370 and the Image column 380. According to an embodiment, the Chart module 140 includes code (e.g. a function or object) to determine the visual indicator. If the image is not NULL, then the image specified in column 380 is used. If the abbrv is not NULL, then the respective indicators in columns 350, 360 and/or 370 are used, otherwise a default indicator is utilized. The images for the column 380 can be created by the user (e.g. designed for the particular business process or enterprise) or imported from another source. The image will typically comprise a small image file, which is placed in a directory on the web site.

Reference is next made to FIG. 4, which shows an implementation of the Filter screen 400 intended for a web browser running on a Windows™ based platform. The Filter screen 400 includes the underlying code to provide the described functionality as will be within the understanding of one skilled in the art. The Filter screen 400 allows the user to filter or create a subset of the instances for an active business process. As shown, the Filter screen 400 includes first 410, second 420, third 430 and fourth 440 frames. The frames represent a series of steps 1, 2, 3 and 4, for configuring the display of instance(s) of a business process in the Chart screen 600, as described in more detail below. The first frame 410 lists the business units for the Active Business Process, in this case "Flow Chart", which were entered into the system 100, and includes a Select button 412 for each of the listed business units, indicated individually by references 412*a*, 412*b* and 412*c*. The first frame 410 also includes a "Group" search function indicated by reference 414 with "Go" 415 and "Clear" 417 buttons. The Group search 414 logic enables a user to quickly look for a group by determining if the text entered in the group textbox is contained in a Group string. The searched business unit(s) are displayed in the first frame 410. Clicking the "Select" button in frame 410 results in the selected group being moved to frame 420. The second frame 420 includes and the user can delete the business unit (e.g. Business Unit A) by clicking a Delete button 422. A Clear button 424 is provided for clearing all of the business units in the second frame 420, for example, if the user selected both Business Unit A and Business Unit C. The third frame 430 displays the instances assigned to the business unit(s) selected in the first frame 410. For example, if the user had selected both Business Unit A and Business Unit C, then the instances for both Business Unit A and Business Unit B would be displayed in the third frame 430. The third frame 430 includes a Select button 432, indicated individually by 432*a* and 432*b*, for each of the displayed instances. The third frame 430 is used to select one of the instances, e.g. Instance 4, which is then displayed in the fourth frame 440. The fourth frame 440 includes a Delete button 442 and a Clear button 444. The third frame 430 also includes a text entry box 434, a Go button and a Clear button 436 is provided to clear the retrieved instances. If the second frame 420 doesn't have any selections, then all the instances for the business units in the first frame 410 are made available in the third frame 430. The text entry box 434 allows a user to look for a KEY without knowing the corresponding business unit. According to one embodiment, the KEYs comprise "Instance 1", "Instance 2", "Instance 3", "Instance 4", and "Instance 5".

According to one embodiment, the data in the second frame 420 corresponds to data in Table 1 in block 114 (FIG. 1), and the data in the fourth frame 440 corresponds to data in Table 2 in block 114 (FIG. 1). In operation, when the Chart menu option 14 is clicked, the underlying code (for example, as implemented in Appendix 1.0) includes logic to check Table 2 for the existence of data. If Table 2 includes data, then the data is utilized in the filter function. If Table 2 does not have any data, then Table 1 is checked for data. If Table 1 includes data, then the data is utilized in the filter function, otherwise the filter operation is not performed.

Reference is next made to FIG. 5, which shows an implementation of the Advanced Filter screen 500 configured for a web browser, which runs on a Windows™ based platform. The Advanced Filter screen 500 includes the underlying code to provide the described functionality as will be within the understanding of one skilled in the art. The Advanced Filter screen 500 is accessed using the Adv Filter menu option 18 in order to apply advanced sorting parameters and configurations to business process data and thereby produce chart displays suitable for more complex analysis, such as cycle time analysis or predictive analysis. As shown, the Advanced Filter screen 500 includes a frame or panel 501 having a row 502 for each activity for the selected business process, indicated individually by references 502*a*, 502*b*, 502*c*, 502*d*, 502*e* and 502*f* in FIG. 5 for Activity 1, Activity 2, Activity 3, Activity 4, End activity and Start activity respectively. The End 502*e* and Start 502*f* activities are associated with the Business Process, i.e. "Flow Chart", and will change if the active Business Process is changed. Each row 502 comprises a Select column 510, a Sort Order column 520, a Does Not Contain column 521, a From date column 530 with a Calendar button column 532, a To date column 540 with a Calendar button column 542 and a Clear column 544. Each row 502 also includes the Type column 310, the Identifier column 320, and a Count column 509. The Count column 509 displays the number of times the activity executed for the active business process. It will be appreciated that the count may not map equally to the number of instances because with conditional logic, some activities might not be required in an instance and due to conditional logic and looping, an activity might occur more than once for an instance.

The Does Not Include column 521 is configured to provide the capability to search for instances that do not include the selected activity. For example, a user might want to look at all instances that do not have an "End Date".

Referring to FIG. 5, the Advanced Filter screen 500 also includes a "Clear" button 506, a "save" button 508 and a list of radio buttons indicated generally by reference 550. The radio buttons include a radio button 552 to "Display all activities in rows containing all selected activity types", a radio button 554 to "Display only selected activities in rows containing all selected activity types", a radio button 556 to "Display all activities in rows containing all selected activity types with given sort order" and a radio button 558 to "Display only selected activities in rows containing all selected activity types with given sort order". The list also includes a check box 559 to "Enable Last Days". The exemplary Advanced Filter screen 500 depicted in FIG. 5 is configured to display Activity 1 between Oct. 1, 2006 to Dec. 31, 2006 and Activity 2 between Nov. 1, 2006 to Jan. 1, 2007, and with Activity 1 being displayed first (i.e. according to the specified Sort Order 520).

It will be appreciated that the Advanced Filter screen 500 may include additional filtering logic. As shown in FIG. 5, the Advanced Filter screen 500 includes "Enable Chart Dates" logic indicated generally by reference 560. The Enable Chart Dates logic 560 comprises an Enable Chart Dates box 562, a set Chart Start Date input 564, and a set Chart End Date input 566. In operation, if the Enable Chart Dates box 562 is checked, then the Chart start date input 564 is used for a user defined Chart Start Date. If the Chart Start date is not entered, then the Chart start date is determined by the earliest date in Table 4 indicated by reference 122 in FIG. 1. If Enable Chart Dates box 562 is checked, then the Chart end date input 566 is used for a user defined Chart End Date. If the Chart End date is not entered, then the Chart end date is determined according to the latest date in Table 4 122 in FIG. 1. According to another aspect, if the Enable Chart Dates box 562 is not selected, then the system is configured to determine the chart start and end dates according to the earliest and latest chart dates, respectively in Table 4 of FIG. 1.

It will be appreciated that the system 100, according to the embodiments as described, includes three methods or techniques for filtering data. The first technique utilizes the Filter screen 400 (FIG. 4) and comprises the user selecting subsets of instances based on the Business Unit(s) and/or Keys. The second technique utilizes the Advanced Filter screen 500 (FIG. 5) to look for instances that have activities which occur in a specific order and within a selected time frame. The third technique uses the "last days" function (i.e. in the "Quick Filter" menu as described in more detail below), which provides the capability to display instances having activity dates between Today's Date-last Days and today's date. If the last days parameter is a negative number, then the code looks for dates between today's date and a future date.

Reference is next made to FIG. 6, which shows an implementation of the Chart display screen 600 configured for a web browser which runs on a Windows™ based platform. The Chart display screen 600 is accessed using the Chart menu option 14 and displays a graphical depiction or rendering 620 of the instance(s) of a business process according to the parameters specified in the Activity Type screen 300 (FIG. 3), the Filter screen 400 (FIG. 4), the Advanced Filter screen 500 (FIG. 5), and/or the parameters 642, 644, 646, 648 or 650 as described in more detail below. According to an embodiment, a graphical rendering 620 can be displayed for each instance of a business process as will be described in more detail below with reference to exemplary business processes. For example, the graphical rendering 620 comprises a window for the browser 150 in FIG. 1. As shown, the Chart display screen 600 also includes a menu bar 640 with user configurable display parameters comprising a Last Days input box 642, a Sort select box 644, a display Height select box 646, and a display Width select box 648. The menu bar 640 provides a "Quick Filter" function as described in more detail below. The Chart display screen 600 also includes a check box 650 for activating/deactivating a "Line'em up" function which lines up the graphical depictions of multiple instances as will be described in more detail below. The display parameters are applied by clicking a Go button 652. The chart screen 600 also includes a time-line bar or time scale 660. The Sort select box 644 comprises to sorting parameters, K and G. The sort parameter K refers to the Key as described above with reference to FIG. 4. As described, the Key comprises "Instance 1", "Instance 2", "Instance 3", "Instance 4", and "Instance 5". The sort parameter G refers to the Grouping (i.e. the Business Unit), and according to an embodiment comprises "Business Unit A", "Business Unit B", and "Business Unit C". In operation, if the user selects the sort order "K,G", then the Key is used as the primary sort parameter and the Business Unit is the secondary sort parameter. If the user selects the sort order "G,K", then the Business Unit is the primary sort parameter and the Key is the secondary sort parameter. As shown in FIG. 6, an indication may be provided showing the number of instances plotted on the chart, for example, (1) as indicated by reference 621.

As described above, table 4 in the output module 122 of the query module 120 is populated with data. To ensure that the activities fit on the Chart display screen 600, the timeframe is determined based on the minimum activity date and the maximum activity date for the data in table 4. According to another embodiment, a user is provided with the capability to define the timeframe and indicator(s) are provided on the Chart display screen 600 to indicate activities that occur outside the user selected or defined timeframe. As described above with reference to FIG. 5, the Advance Filter screen 500 is configured to allow a user to define Chart Start and Chart End dates using the Enable Chart Dates function 560.

The depictions of instances/business processes according to various embodiments and examples are described in more detail below with reference to FIGS. 9 to 26 and FIGS. 27 to 29.

Referring back to FIG. 1, the query module 120 comprises a computer program or code module that generates data associated with a business process intended for display in graphical form on the Chart screen. According to one embodiment, the query module 120 is implemented as an algorithm that in response to a request builds and executes a SQL (Structured Query Language) statement. The query returns an output 122, i.e. a data table containing instance/activity information, which is used to generate a graphical rendering for display on the Chart screen 600 (FIG. 6). A pseudo code listing of an algorithm for the query module according to an embodiment of the invention is provided in Appendix 1.0. It will be apparent to one skilled in the art that the pseudo code listing presented in the Appendix utilizes syntax representing the SQLServer from Microsoft. The particular implementation and coding details will be within the understanding of those skilled in the art.

The chart module 140 receives the output from the query module 120 and generates the graphical depictions for display on the Chart screen 600 (FIG. 6). According to an embodiment, the chart module 140 comprises an algorithm that converts the output 122 from the query module 120 into an array of HTML (Hyper Text Mark-up Language) strings 142. The HTML output 142 from the chart module 140 is interpreted and displayed by the web browser 150. A pseudo code listing of an algorithm for the query module according to an embodiment of the invention is provided in Appendix 2.0. The particular implementation details will be apparent to one skilled in the art.

Reference is next made to FIG. 7, which shows a data model or schema for the database module 130 (FIG. 1) according to an embodiment of the invention. The data model is indicated generally by reference 700 and comprises a Business Process block 702. The Business Process block 702 includes a Business_Process field to identify the business process. The data model 700 also includes one or more Instance blocks indicated generally by reference 704. According to an embodiment, an Instance block 704 is provided for each instance of a business process. The Instance block 704 includes an Instance_ID to identify the instance and is linked to the Business Process block 702 via the Business_Process field. According to an embodiment, the data model 700 also includes one or more Group reference tables indicated generally by reference 705, and individually by references 705*a*, 705*b*, 705*c*, 705*d*. The Group1 reference table 705*a* is linked to the Instance block 704 by the Group1 field, and the Group2 reference table 705*b* is linked to the Group1 table 705*a* by the Group2 field. The Group reference tables 705 are provided for populating various "drop-down" boxes in the screens. The data model 700 also includes one or more Activity blocks indicated generally by reference 706. According to an embodiment, an Activity block 706 is provided for each activity in an instance of the associated business process. The Activity block 706 includes an Activity_ID to identify the activity and is linked to the Instance block 704 via the Instance_ID field. The data model 700 may also include one or more Activity Type blocks 708 which identify the type(s) of activities associated with a business process. The Activity Type block(s) 708 are linked to the Activity block 706 via the Business_Process field and the Activity Type field. According to an embodiment, the data model includes a Color reference table 709. The Color reference table 709 is linked to the Activity Type block 708 via a color field, and according to one aspect provides data for populating dropboxes.

As shown in FIG. 7, the data model 700 may also include a User table 710 and/or a Staging table 712. According to an embodiment, the User table 710 comprises a security table for storing user information and credentials. According to an embodiment, the Staging table 712 is not accessible directly by the program, but is configured to assist in the importation of data from external sources.

Figure 8:
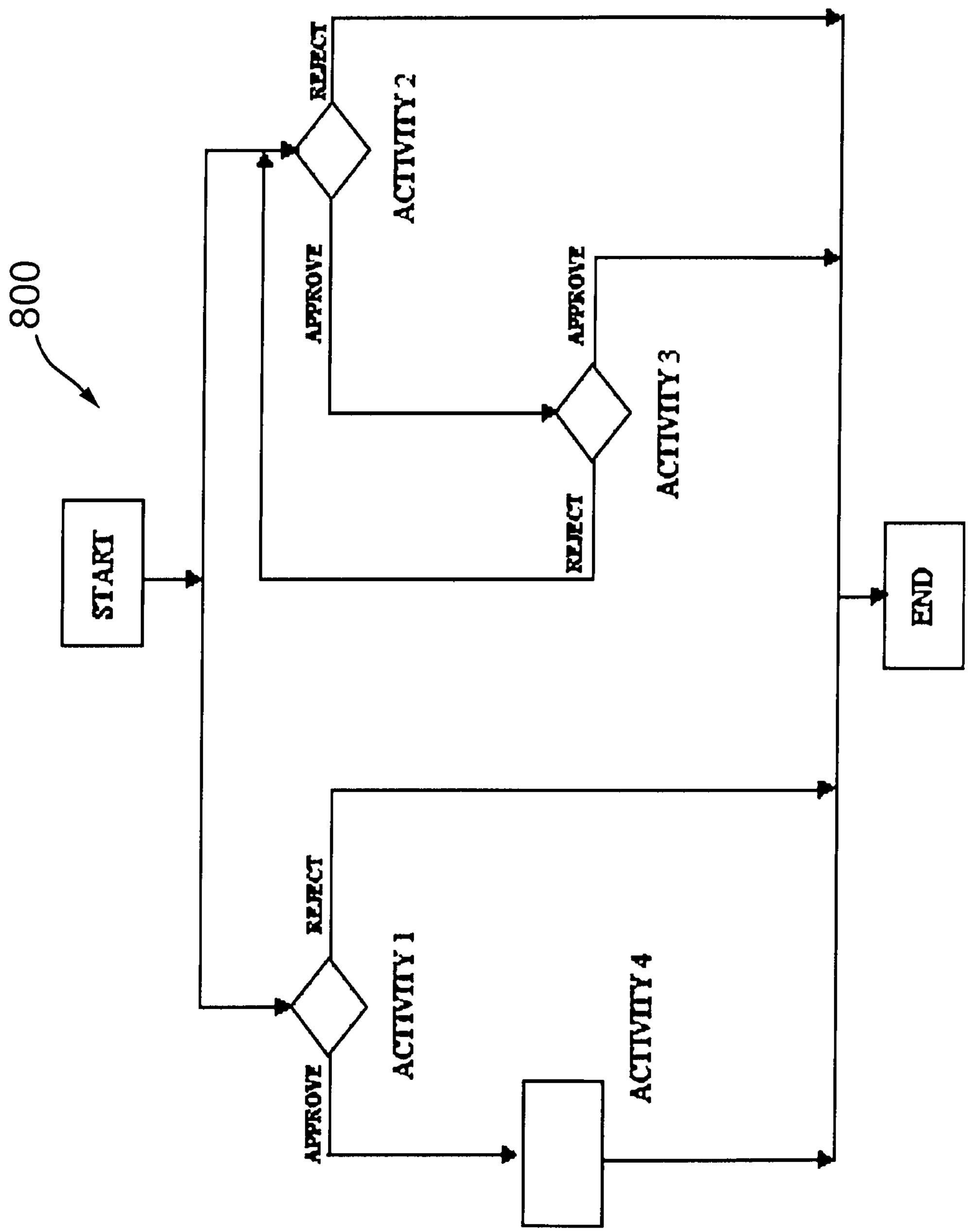
FIG. 8 shows in flowchart form a typical sequence for selecting or configuring activities or tasks in a business process.

Reference is next made to FIG. 8, which shows in flowchart form a typical business process indicated generally by reference 800. As shown, the business process 800 includes two main branches, with each branch having conditional steps for the performance or execution of Activities 1 to 4.

Reference is next made to FIGS. 9 to 22, which further illustrate the operation and features of the system 100 according to an embodiment of invention in the context of an oil well process. FIG. 9 depicts a chart screen 900 for the business process called "Well Test". The Chart screen 900 comprises the menu bars 10 and 640 as described above. In FIG. 9, the Chart screen 900 shows two instances for the Well Test process, "Well 1" indicated by reference 910 and "Well 2" indicated by reference 920. Well 1 instance 910 has an activity icon 912 and Well 2 instance 920 has an activity icon 922. In FIG. 10, the activity icon 912 has been activated (e.g. by clicking or moving a mouse over the icon 912) and the system 100 has activated a display box 913 providing additional information of the Well 1 instance 910, such as "Create" date. In FIG. 11, the Well 1 instance 910 has been configured with an activity icon 914, for example, using the parameters specified in an Activity Type screen 1300 as depicted in FIG. 13.

Figure 12:
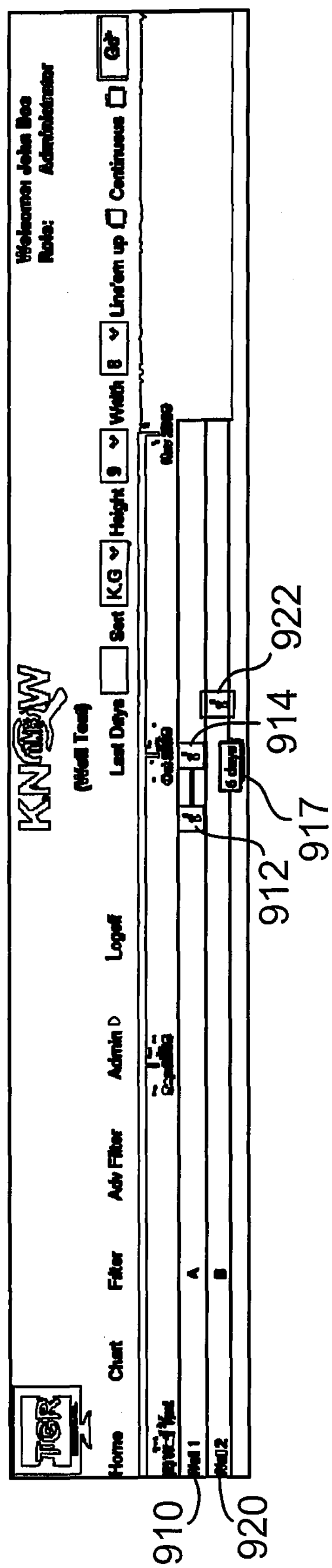
FIG. 12 shows a screen shot of the flowchart of FIG. 9 with another active display box.
Figure 13:
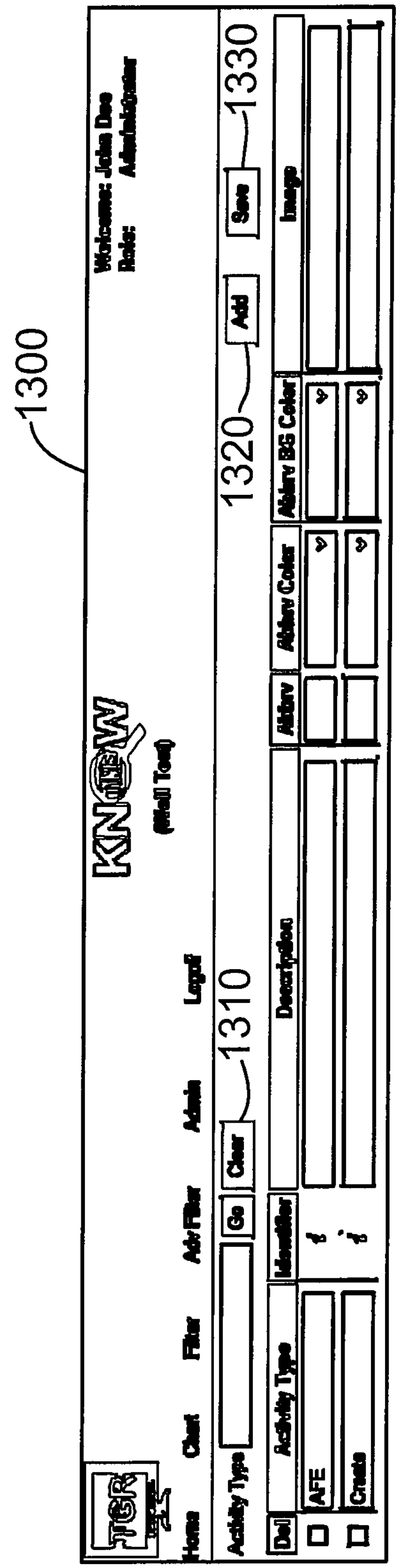
FIG. 13 shows a screen shot of an activity type screen for the "Well Test" example of FIG. 9.

FIG. 13 is configured to provide a user with the capability to add, delete and/or edit data. As shown, FIG. 13 is configured with an "Activity Type" textbox control 1310, and Add 1320 and Save 1330 buttons as shown. The textbox control 1310 provides the capability to also filter data. In FIG. 11, the activity icon 914 for the Well 1 instance 910 has been activated resulting in a display box 915 showing "AFE" activity (i.e. Authorization For Expenditure). In FIG. 12, a display box 917 has been activated between the activity icons 912 and 914, which indicates the number of days, i.e. "6 days", between the "Create" date and the "AFE" date.

Figure 14:
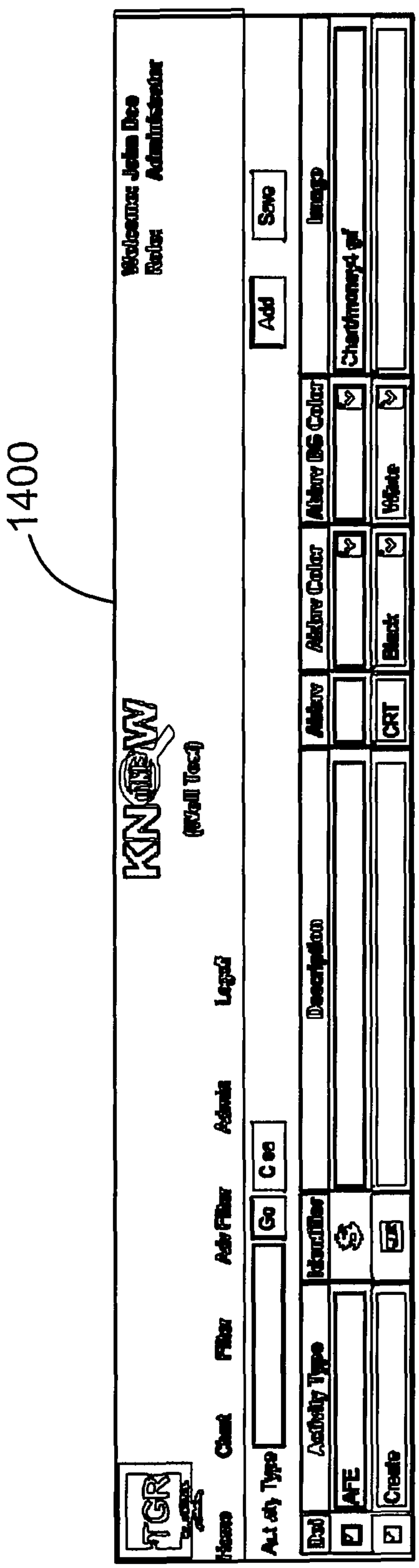
FIG. 14 shows a screen shot of the Activity Type screen of FIG. 13 with user entered parameters.
Figure 15:
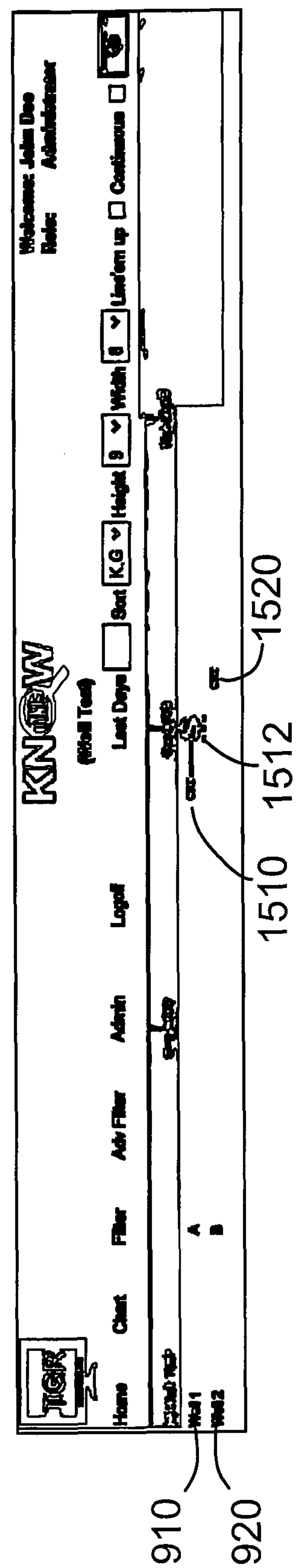
FIG. 15 shows a screen shot of a chart screen generated in response to the parameters entered in FIG. 14.

Reference is next made to FIG. 15, which shows the Well 1 instance 910 and the Well 2 instance 920 with user defined identifiers indicated by references 1510, 1512 and 1520. The user defined identifiers 1510, 1512, 1520 have been configured according to an Activity Type screen 1400 as depicted in FIG. 14. The identifiers 1510 and 1520 identify the respective "create" dates for Well 1 and Well 2, respectively, and have been abbreviated to display as "CRT". The AFE icon 914 (FIG. 11) has been replaced by a "$" symbol indicated by reference 1512. Similarly in FIG. 16, user defined identifiers 1610 and 1620 and 1622 have been added for Well 1 and Well 2, respectively. The user defined identifiers 1610 and 1622 comprise "SRV", the abbreviation for "Survey", which is a defined activity in the context of the Well Test business process.

Figure 17:
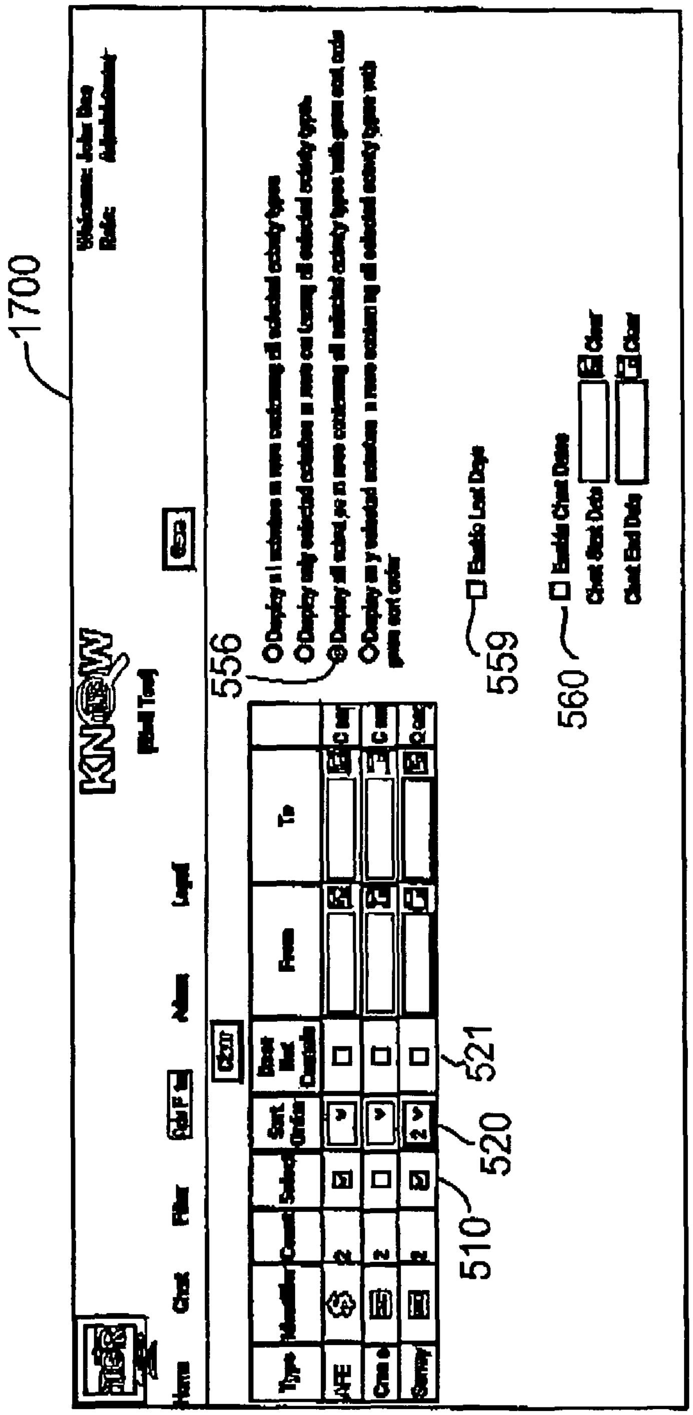
FIG. 17 shows a screen shot of an Advanced Filter Screen for the example of FIG. 16 with the selection of sort order and activation of display options.
Figure 18:
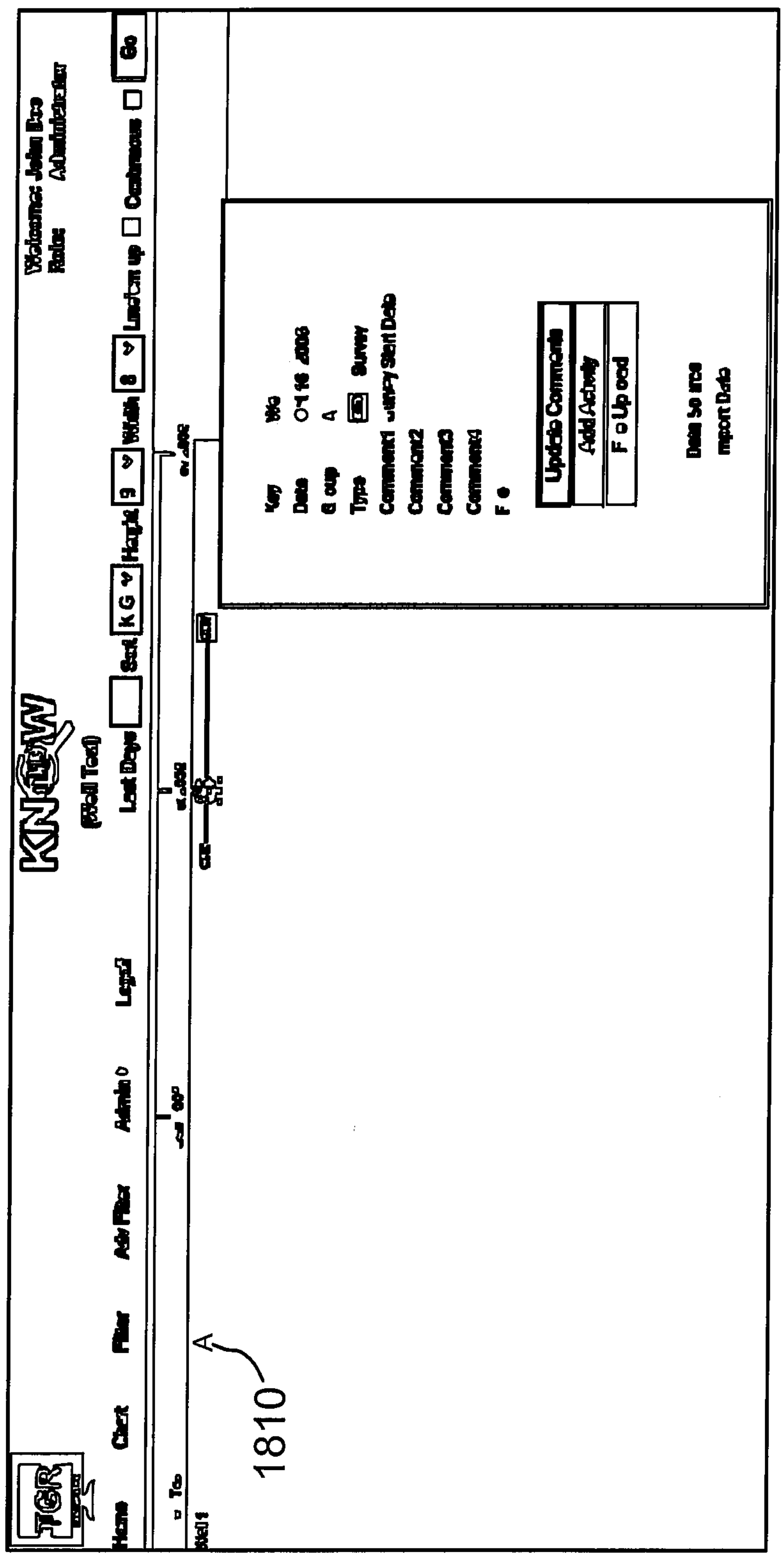
FIG. 18 shows a screen shot of a chart screen generated in response to the filter settings of FIG. 17.

Reference is next made to FIGS. 17 and 18. FIG. 17 shows an exemplary Advanced Filter screen 1700 configured to generate a graphical depiction 1810 of the Well 1 instance as shown in FIG. 18. As shown in FIG. 17, the instance of Well 1 is configured to display according to the "AFE" and "Survey" activities (column 310) as selected in the Select column 510 and according to the Sort order specified in column 520. As also depicted in FIG. 17, the radio button 556 has been activated, and the "Enable Last Days" checkbox 559 has not been activated. According to an embodiment, the Advanced Filter screen 1700 is configured with logic for an "Enable Chart Dates" function 560 and a "Does Not Contain" column 521 as described above with reference to FIG. 5.

Figure 19:
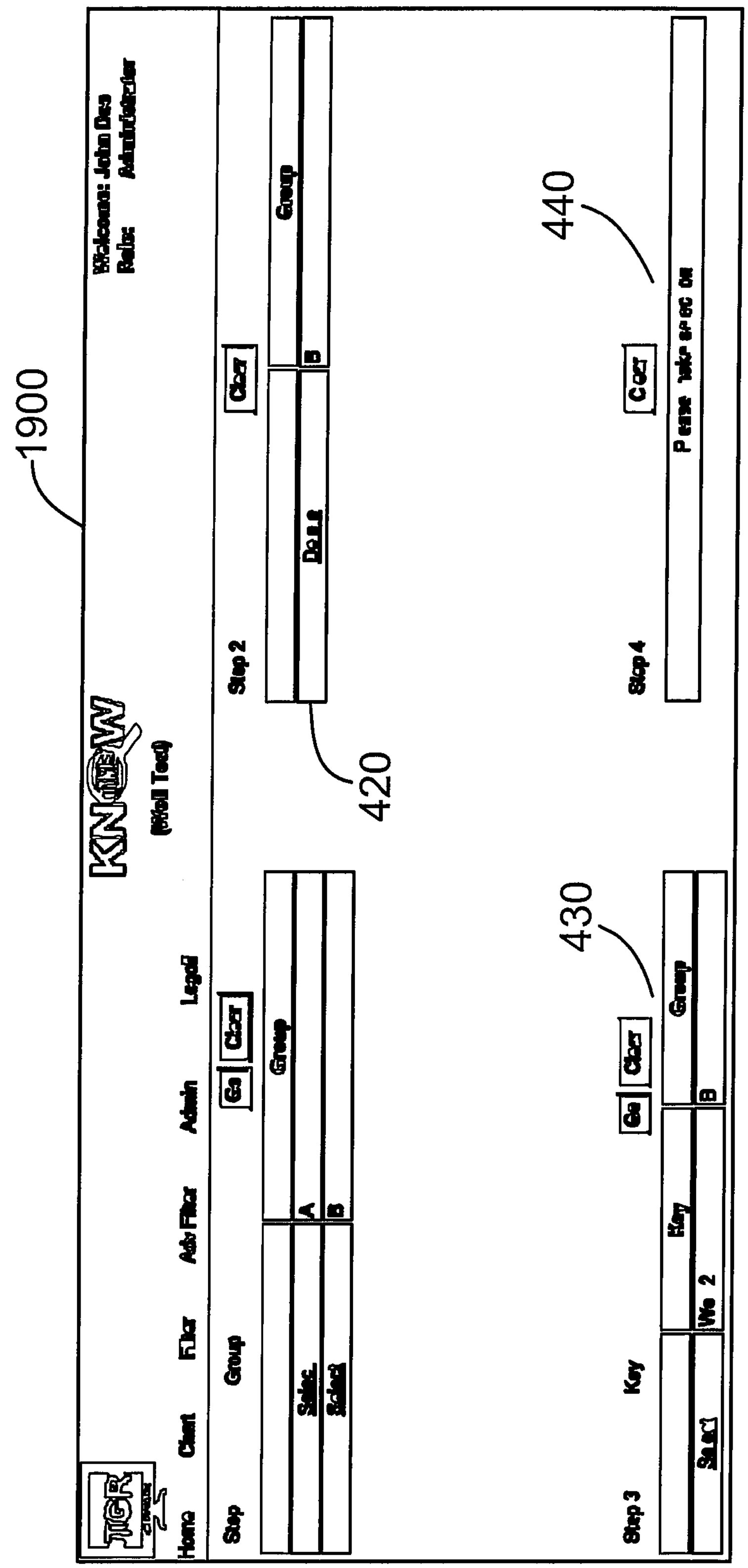
FIG. 19 shows a screen shot of a Filter Screen for the example of FIG. 16 with Group B selected.
Figure 20:
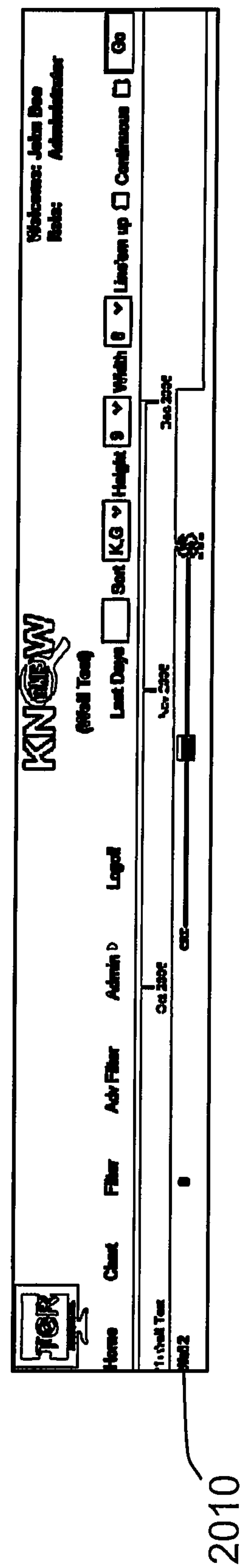
FIG. 20 shows a screen shot of the chart screen generated in response to the Filter screen settings of FIG. 19.

Reference is next made to FIGS. 19 and 20. FIG. 20 shows a graphical depiction of the Well 2 instance indicated by reference 2010. The Well 2 instance 2010 is generated in response to the parameters specified in the Filter screen 1900 depicted in FIG. 19. As shown in FIG. 19, the instance of Well 2 in group B has been specified in frame 420 of the Filter screen 1900. The individual instances of group B exist in frame 430 (for this example, there is only one instance). The user can further filter the display chart by selecting instances in frame 430 and moving them to the fourth frame 440.

Figure 16:
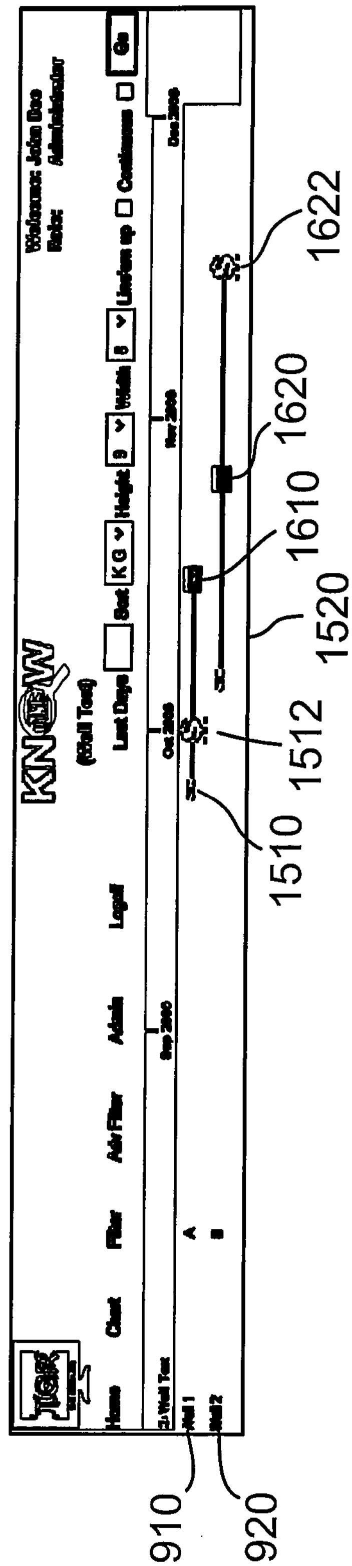
FIG. 16 shows a screen shot of the chart screen of FIG. 15 with additional user defined parameters.
Figure 21:
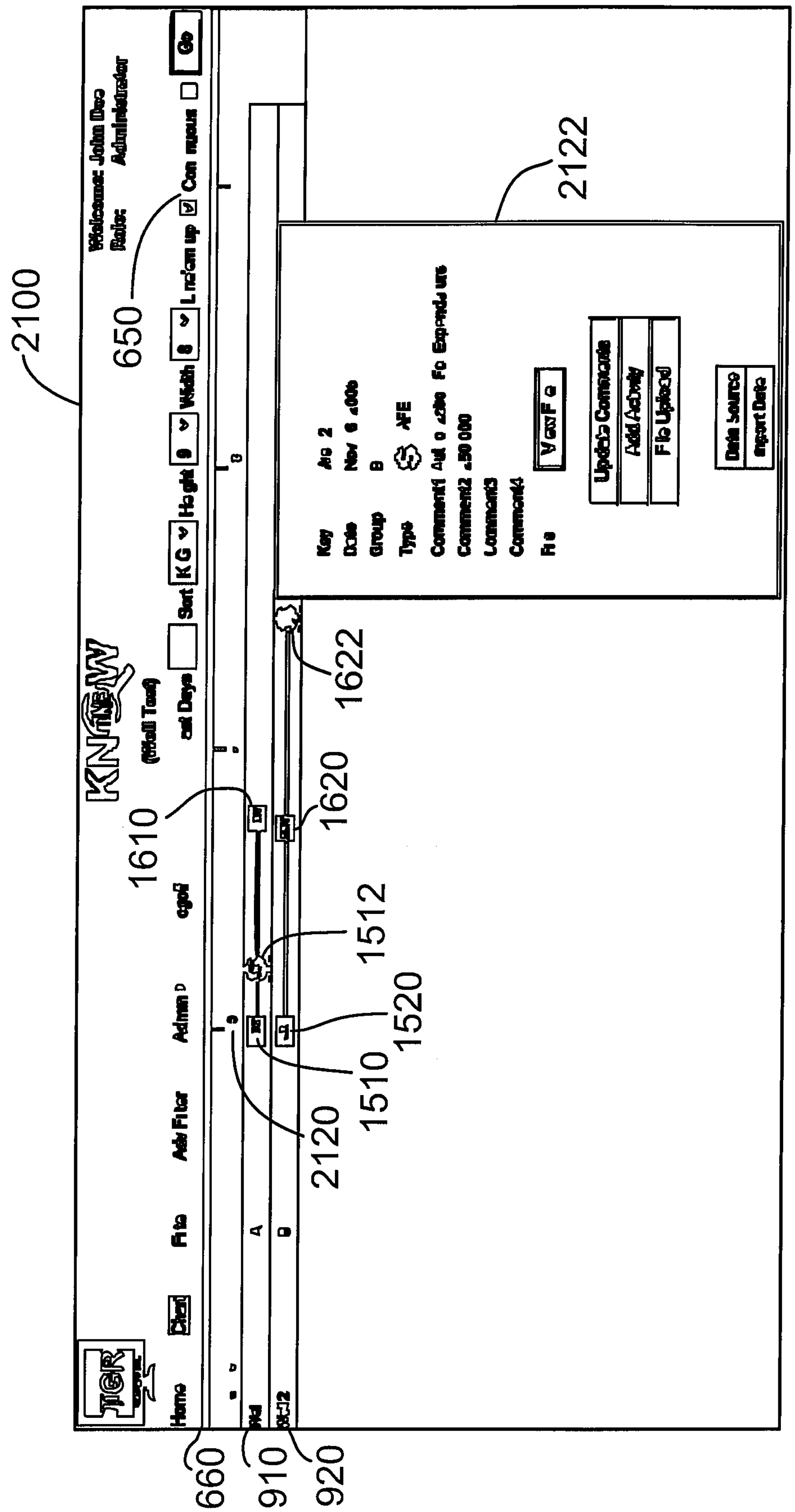
FIG. 21 shows a screen shot of the chart screen for the example of FIG. 16 with the "Line'em up" function activated.

Reference is next made to FIG. 21, which shows the Chart screen of FIG. 16 with the "Line'em up" function activated, i.e., the check box 650 is "clicked". In the "Line'em up" mode, the start of the Well 1 instance 910 and the start of the Well 2 instance 920 are lined up at point "Wk 0" indicated by reference 2120 on the time scale 660. As also shown, a display box indicated by reference 2122 has been activated for the AFE icon 1622.

Figure 22:
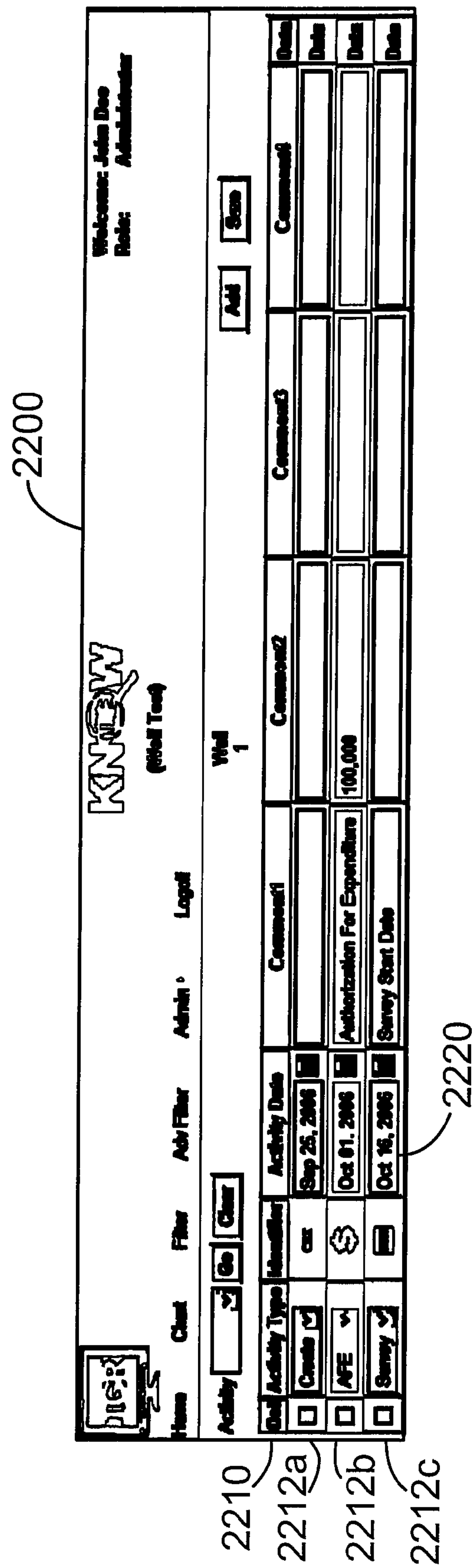
FIG. 22 shows a screen shot of an Activity Screen according to an embodiment.

Reference is next made to FIG. 22, which shows an Activity screen 2200 according to an embodiment of the invention. The Activity screen 2200 provides a display in a tabular form 2210 the activity information for an instance timeline sorted by "Date" as indicated by column 2220. The data in each row 2212, indicated individually as 2212*a*, 2212*b* and 2212*c* in FIG. 22, corresponds to the data displayed in the activity Display box. The user is also given the capability to add or modify activity information and when completed the chart is redrawn to reflect the new or modified data. According to an embodiment, the Activity screen 2200 is invoked in response to the links on the "Instance Keys" screen FIG. 2(*d*).

Reference is next made to FIGS. 23 to 26, which show other display configurations and functions according to embodiments of the present invention.

Figure 23:
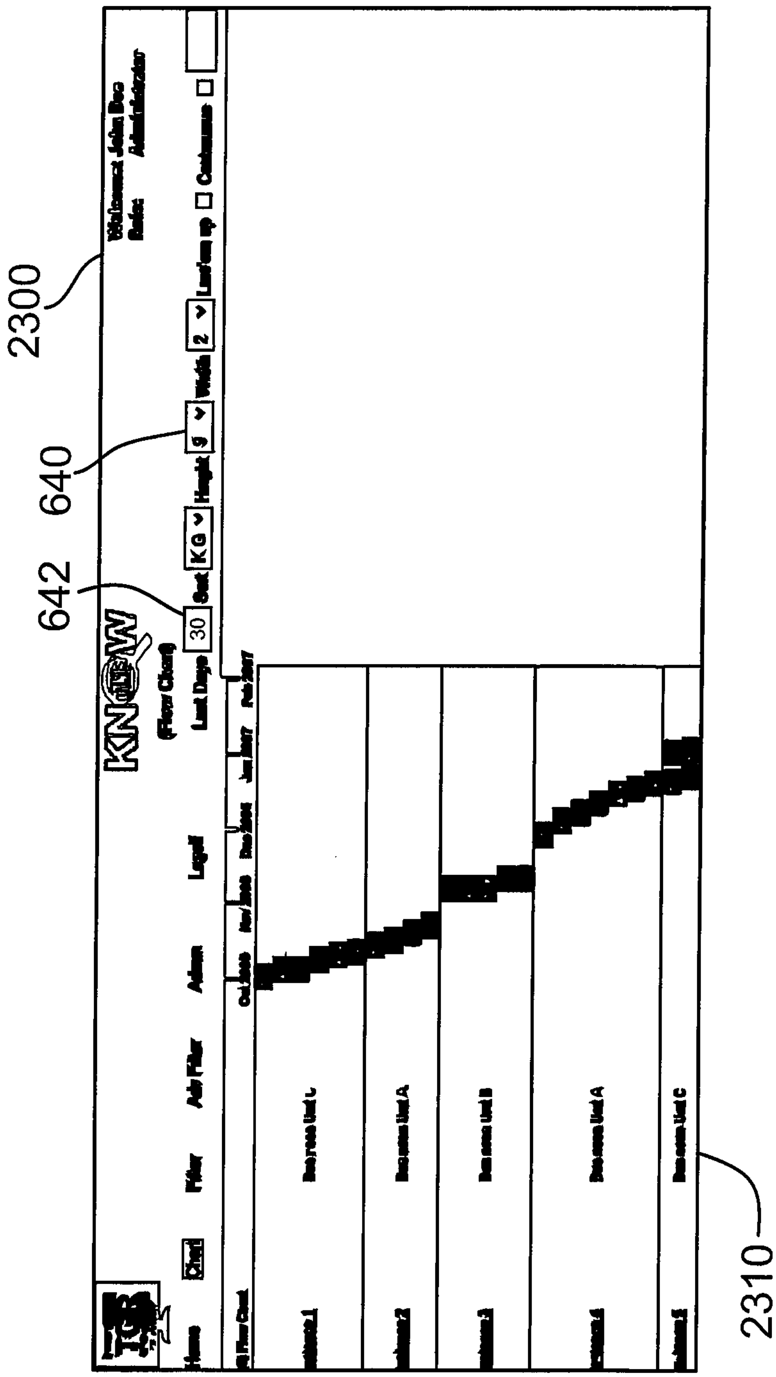
FIG. 23 shows a screen shot of a chart screen generated for another exemplary Business Process having five instances and associated activities.

FIG. 23 depicts a Chart screen 2300 with a chart display 2310 comprising five instances, "Instance 1", "Instance 2", "Instance 3", "Instance 4" and "Instance 5". In the chart display 2310, instances 2 and 4 belong to "Business Unit A". Instance 3 belongs to "Business Unit B". Instances 1 and 5 belong to "Business Unit C". The display mode depicted in FIG. 23 is generated by utilizing the Quick Filter menu 640 in screen 600, as described above with reference to FIG. 6. For the configuration depicted in FIG. 23, the Last Days field 642 is shown in dull grey indicating that the field is inactive. The Last Days field 642 is inactive or disabled as a result of the function not being enabled in the Advance Filter screen.

Figure 24:
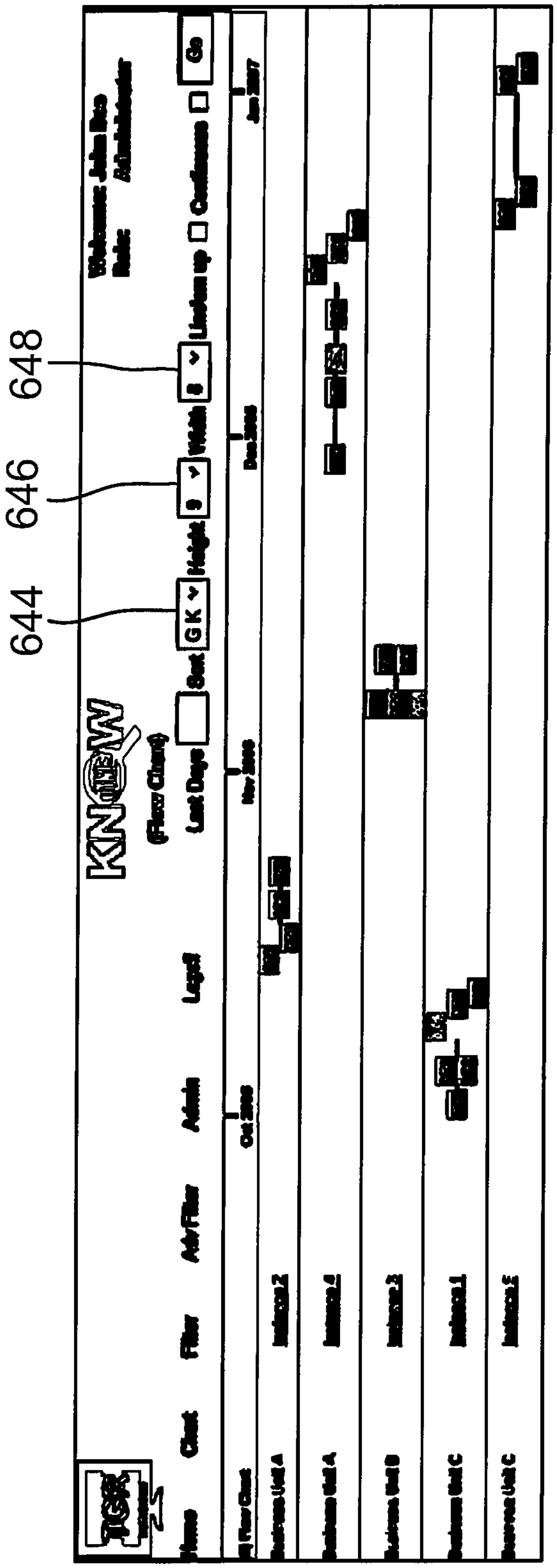
FIG. 24 shows a screen shot of the chart screen of FIG. 23 with another sort order and display width being entered.

FIG. 24 depicts the chart display 2310 of FIG. 23 modified and regenerated by changing the "Sort" order from "K,G" to "G,K" in box 644 (i.e. as described above with reference to FIG. 6) and changing the "Width" from "2" to "8" in box 648.

Figure 25:
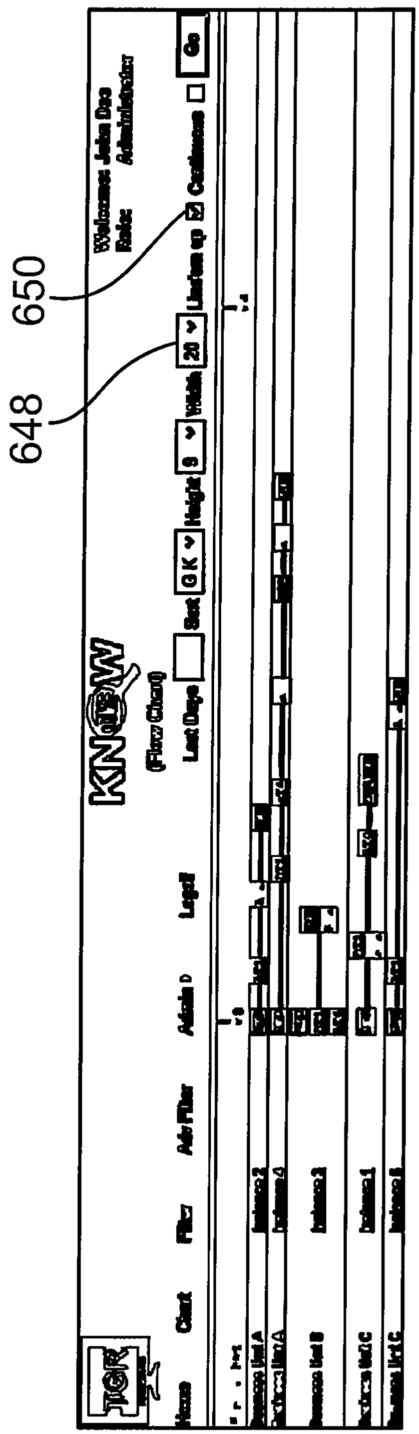
FIG. 25 shows a screen shot of the chart screen of FIG. 23 with the "Line'em up" function activated.

FIG. 25 depicts the chart display of FIG. 24 with the "Line'em up" function activated in check box 650. As shown, the "Width" has also been changed from "8" to "20" in box 648.

Figure 26:
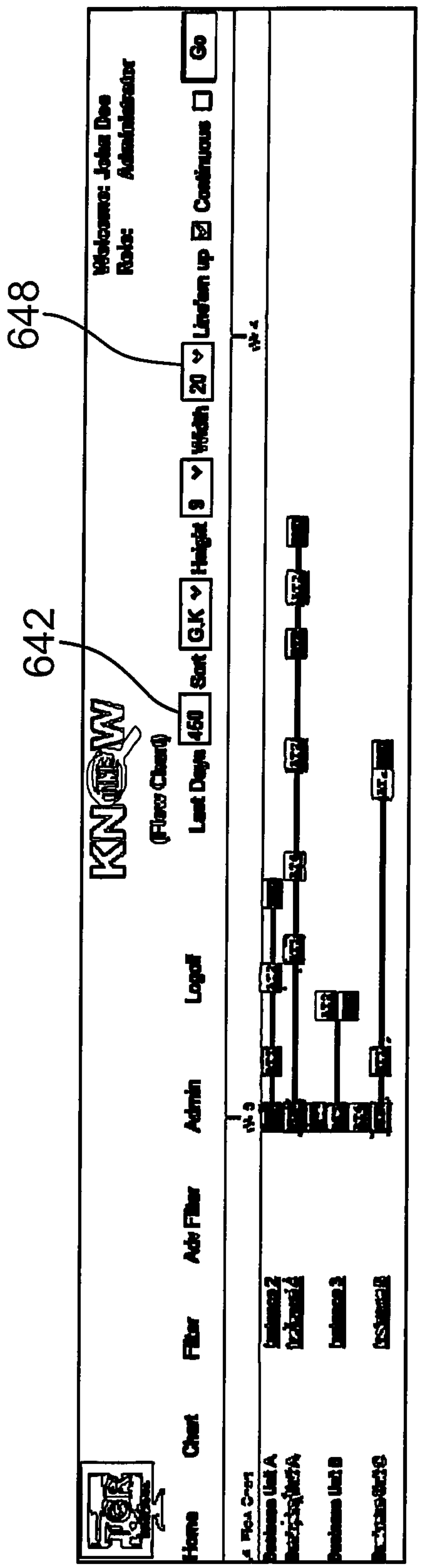
FIG. 26 shows a screen shot of the chart screen of FIG. 23 with the "Last Days" parameter being changed.

Reference is next made to FIG. 26, which shows the chart display of FIG. 25 with the "Last Days" field 642 enabled. The Last Days parameter was enabled in the Advance Filter screen and the number 450 was entered. As depicted the chart display is generated on Jan. 15, 2008, and as a result, instances that had at least one activity occur between "450 days before Jan. 15, 2008" and "Jan. 15, 2008" are displayed on the chart. According to this example, 4 instances are displayed on the chart, and the fifth instance is not displayed because it did not satisfy the criteria.

Figure 27:
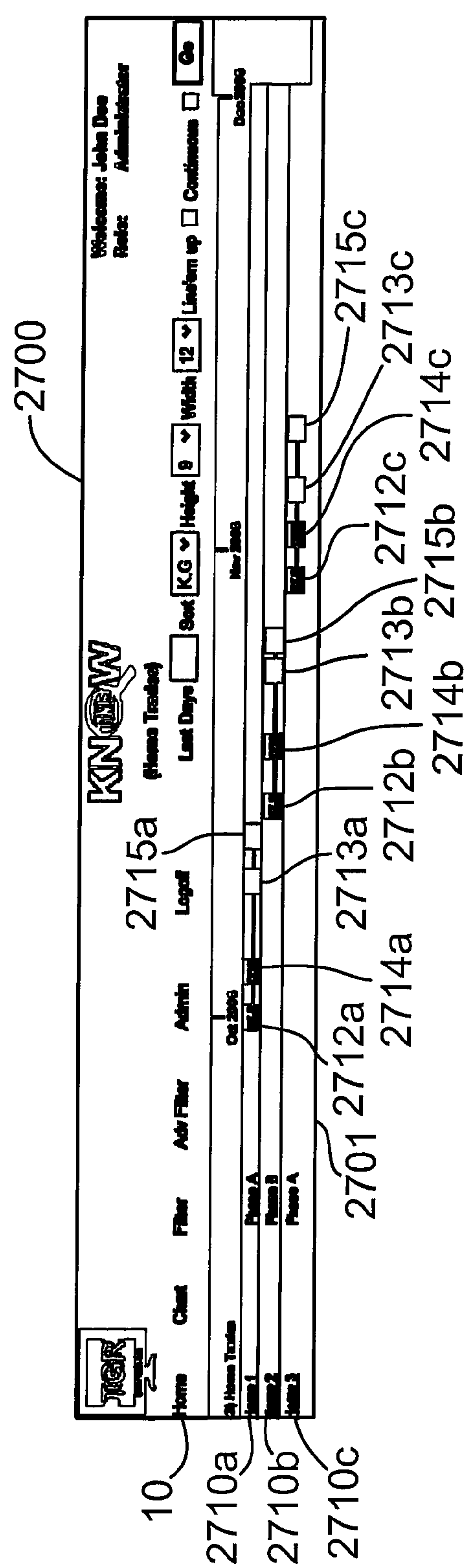
FIG. 27 shows a screen shot of a chart screen generated for a "Home Trades" Business Process having three instances and associated activities.
Figure 28:
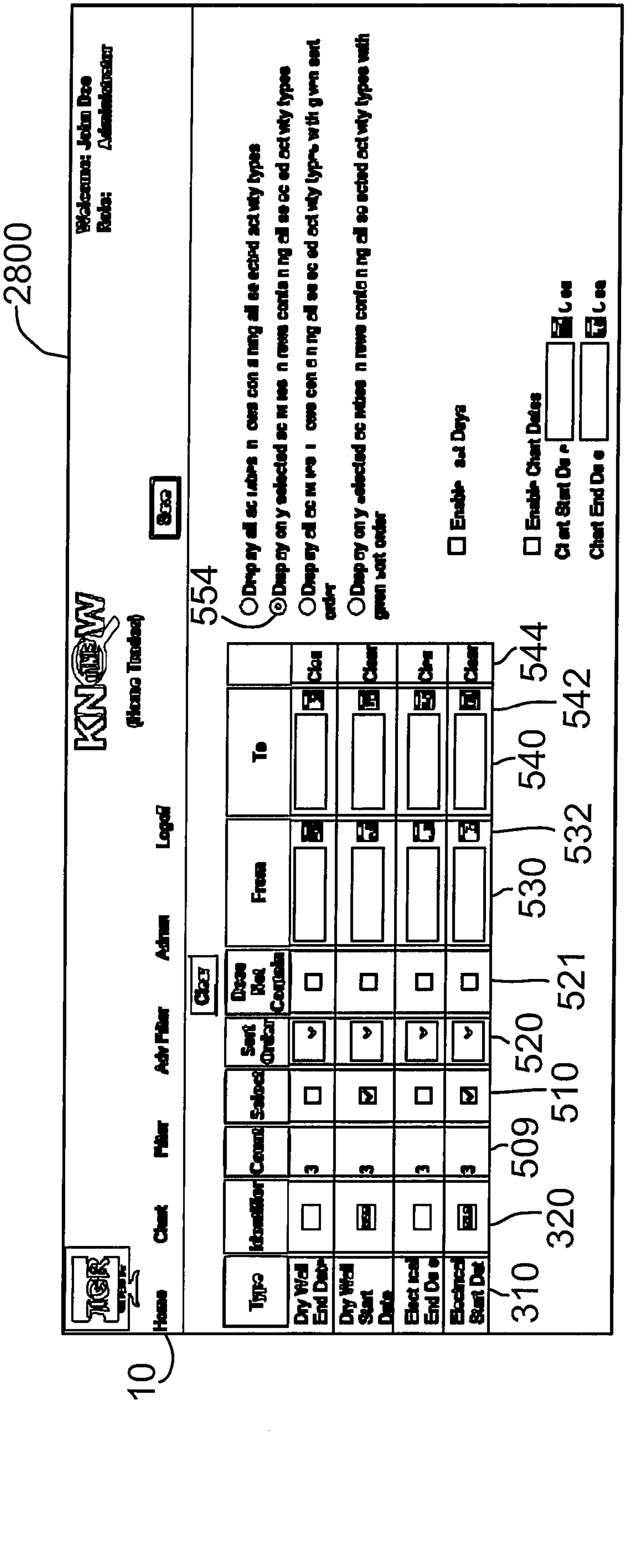
FIG. 28 shows a screen shot of an Advanced Filter Screen for the example of FIG. 27 with the selection of the display option.
Figure 29:
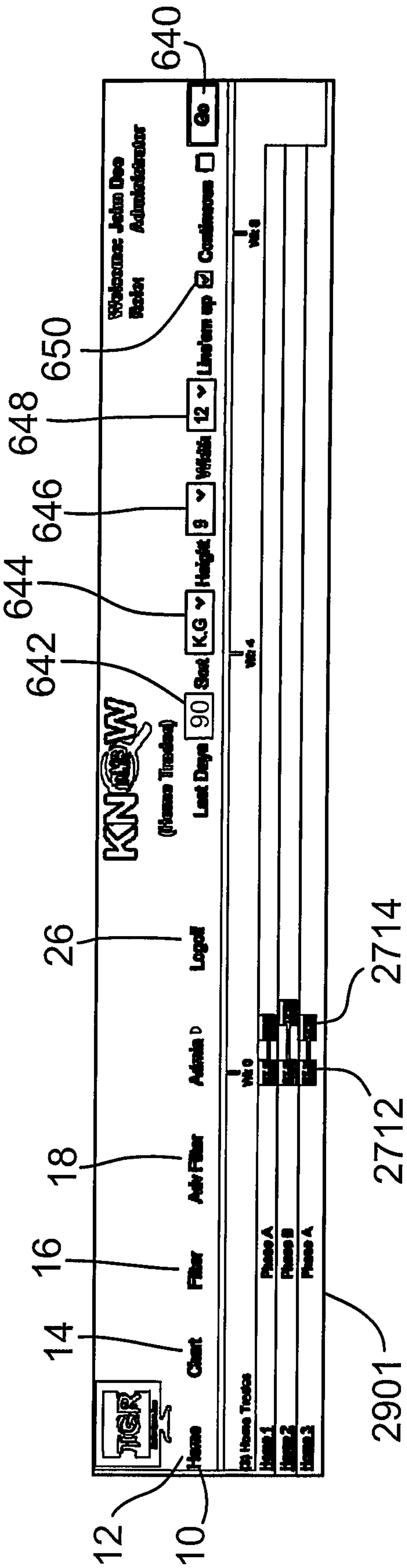
FIG. 29 shows a screen shot of the chart screen generated in response to the filter settings of FIG. 28.

Reference is next made to FIGS. 27 to 29, which illustrate another exemplary business process implemented in the context of the present invention. The business process comprises the building of homes and is titled "Home Trades".

FIG. 27 depicts a Chart screen 2700 with a display chart 2701 generated for the Home Trades process. The display chart 2701 for the Homes Trades process in FIG. 27 comprises three instances, "Home 1" indicated by reference 2710*a*, "Home 2" indicated by reference 2710*b*, and "Home 3" indicated by reference 2710*c*. Each instance in turn comprises four activities, Electrical Start, Electrical End, Drywall Start and Drywall End. As shown in FIG. 27, the Electrical activity is defined with an Electrician Start Date abbreviated as "ELS" and represented by icon 2712, indicated individually by references 2712*a*, 2712*b* and 2712*c* in FIG. 27, and an Electrician End Date abbreviated as "ELE" and represented by icon 2713, indicated individually by references 2713*a*, 2713*b* and 2713*c* in FIG. 27. Similarly, the Drywall activity is defined with a Drywall Start Date abbreviated as "DWS" and represented by icon 2714, indicated individually by references 2714*a*, 2714*b* and 2714*c* in FIG. 27, and a Drywall End Date abbreviated as "DWE" and represented by icon 2715, indicated individually by references 2715*a*, 2715*b* and 2715*c* in FIG. 27.

For this Home Trades example, the instances, i.e. Home 1, Home 2 and Home 3, may comprise two-storey houses and the defined activities, i.e. Electrical and Drywall, are performed on a floor-by-floor basis. For example, the electrician(s) complete the electrical installation for the first floor and then move to the second floor. The dry-wall installers start dry-walling the first floor after the electrical work is finished.

The same sequence is repeated for the second floor. It will be appreciated that these two activities proceed in parallel. By creating a business process (instance) comprising an Electrician start date and a Dry Wall start date creates a process where the dry-waller(s) have to wait until the electrician(s) are done before they can start dry-walling. The display chart 2701 generated in the Chart screen 2700 defines the cycle and allows the progress of the activities to be monitored and managed for each instance (e.g. home) and also for all the homes in the project.

Reference is next made to FIG. 29, which shows a display chart 2901 for the Homes Trade in FIG. 27 modified according to the parameter settings in the Advanced Filter screen 2800 of FIG. 28. As shown in FIG. 28, the Select column 510 has been configured and the "Display only selected activities in rows containing all selected activity types" radio button 554 has been activated to show only the Electrical start dates, represented by the ELS icons 2712, and the Dry Wall start dates, represented by the DWS icons 2714.

As shown in FIG. 29, the "Line'em up" function has also been activated for the display chart 2901, i.e. selected by checking the "Line'em up" check box 650. The activation of this feature in the display chart 2901 provides a visual comparison of the wait time for the dry-wallers for each of the three homes under construction.

According to another aspect, the present invention provides cycle time analysis. Cycle time analysis involves monitoring and analyzing timelines for business processes. As described in more detail below, timelines can be extracted from part of an instance, a complete instance or a cross-section of multiple instances. The timelines of an instance can be compared to the timelines of another instance for example to do predictive analysis. According to another aspect, the timelines can be analyzed to uncover and correct inefficiencies.

For the Well Test example described above with reference to FIGS. 9 to 22, a common thread links the individual wells drilled by an oil company. Using the techniques described above, for example, the Filter 400 and Advanced Filter 500 screens, the instances of the wells can be configured to provide cycle time analysis with respect to the following activities:

(1) when the well prospect was first entered into the system;
(2) when funding was first authorized, i.e. received from the accounting system;
(3) when other supplemental funding was authorized. For example, different phases of well life cycle will have different funding types in place;
(4) when the well survey was started. There is typically a high correlation between the survey start date and the initial authorized funding;
(5) when the drill rig started drilling, i.e. obtained from the drilling system;
(6) when well production started, i.e. obtained from the well data capture system.

As described, the embodiments of system and methods according to the present invention are suitable for continuous and finite business processes. The concepts of continuous and finite business processes are described in further detail in the context of the home builders and the well chilling (i.e. oil companies) examples given above.

In the context of the home builders example, the process involving the building and selling of homes can be characterized as a continuous process, and the process of assigning a unique identifier to each home can be characterized as a finite process.

In the context of the oil companies example (i.e. well drilling), the process involving the drilling of wells can be characterized as a continuous process, and the process of assigning a unique identifier to each well can be characterized as a finite process.

For the home builders and the oil companies, each instance of a business process typically takes place over many months and/or years. For example, different phases of each instance require different Subject Matter Experts to help complete the instance. The analysis of instances may involve completion of tasks such as auditing, forecasting, etc. One reason to analyze the individual processes is to assist with optimizing the continuous process. For example, this could lead to building more homes in a year or drilling more wells in a year, or reducing the costs of completing the same number of instances. As described, the system according to the present invention provides the capability to assist in analyzing the finite processes for the home builders and well drillings examples.

The system according to the present invention is also suitable for the analysis of continuous processes such as those described above. For example of an oil company drilling wells, a decision to move forward with the development of a well is typically made after much analysis, requirements gathering, meetings, etc. The "Official" start date of a well may be designated by different indicators. In the context of the present example, the start date of the well (i.e. instance) is designated by the Authorization For Expenditure or AFE approval date. By using existing functionality (such as the continuous check box, line'em up check box and the Adv Filter screen), the system can be configured for analysis of a continuous business process to provide features as follows:

- Provides all Official well start dates on one time line, showing the elapsed time between each Official Well Start.
- Enables a user to compare start dates from one year with start dates from another year. For example, if "first AFE approvals" are entered into the system from Year 2000 to 2006, then the chart will show 7 instance lines (i.e. Year 2000 to Year 2006) and plot each respective well official start date in the correct place.

Changing the "Official Start" activity to an "On Production" activity could demonstrate successful wells and compare frequency of success across several years, etc.

The operation of the system and methods in the context of continuous processes are illustrated in FIGS. 30 to 41.

Figure 30:
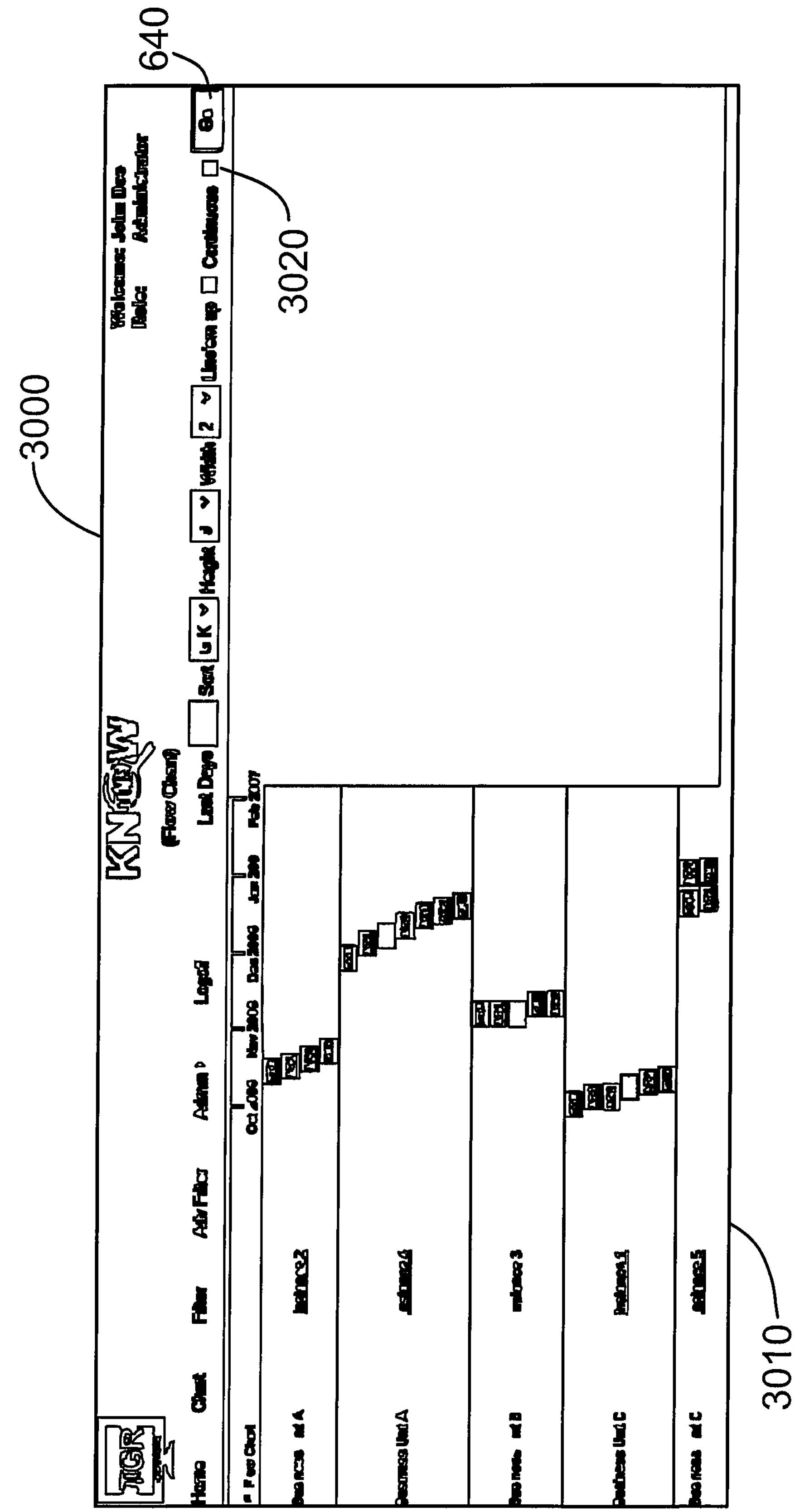
FIGS. 30 to 41 show screen shots for exemplary business processes rendered or generated based on continuous function mechanism according to an embodiment of the invention.
Figure 31:
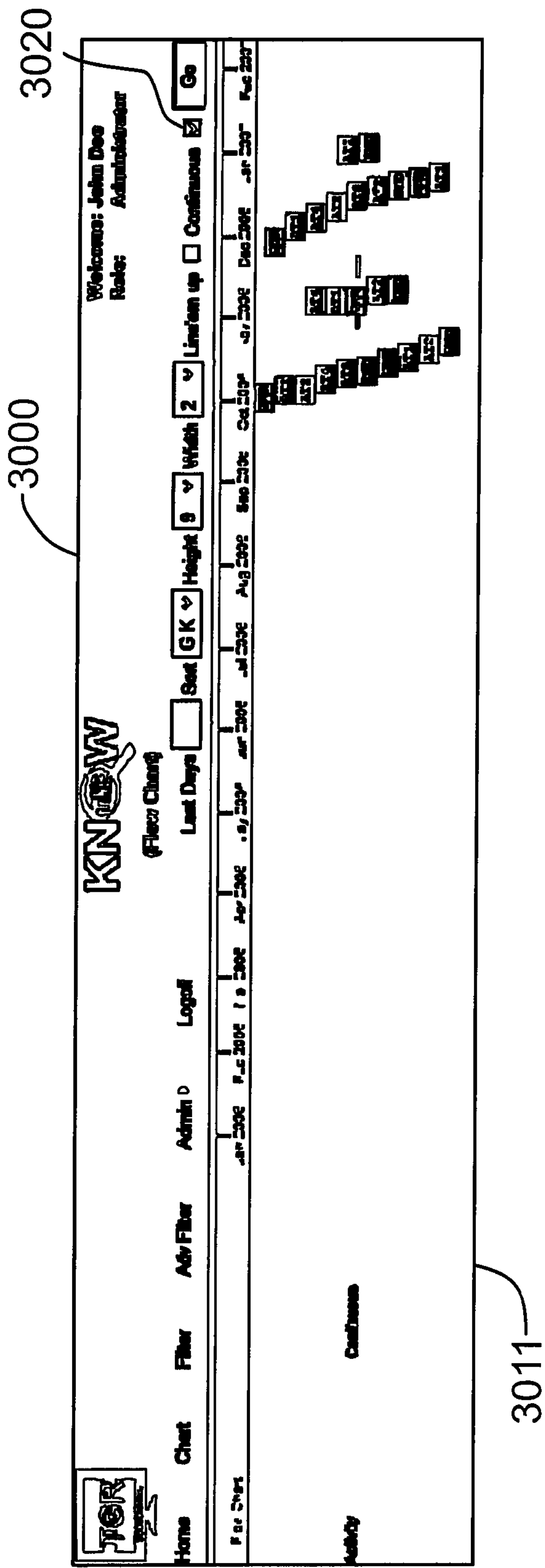

Reference is made to FIG. 30, which shows a screen shot of a Chart screen 3000 according to another embodiment of the invention. The Chart screen 3000 has rendered a chart display indicated generally by reference 3010, which corresponds generally to the chart display 2310 described above with reference to FIG. 23, e.g. Sort Order is "G,K" and there are 26 Activities. According to the embodiment, the Chart screen 3000 includes a Continuous function check box indicated by reference 3020. Activating the continuous function, i.e. clicking the Continuous function box 3020, results in the system generating a chart display as displayed in FIG. 31 and indicated generally by reference 3011. The Activities in FIG. 31 are plotted by time when the Continuous function was selected, i.e. there is no common thread linking them together.

Figure 32:
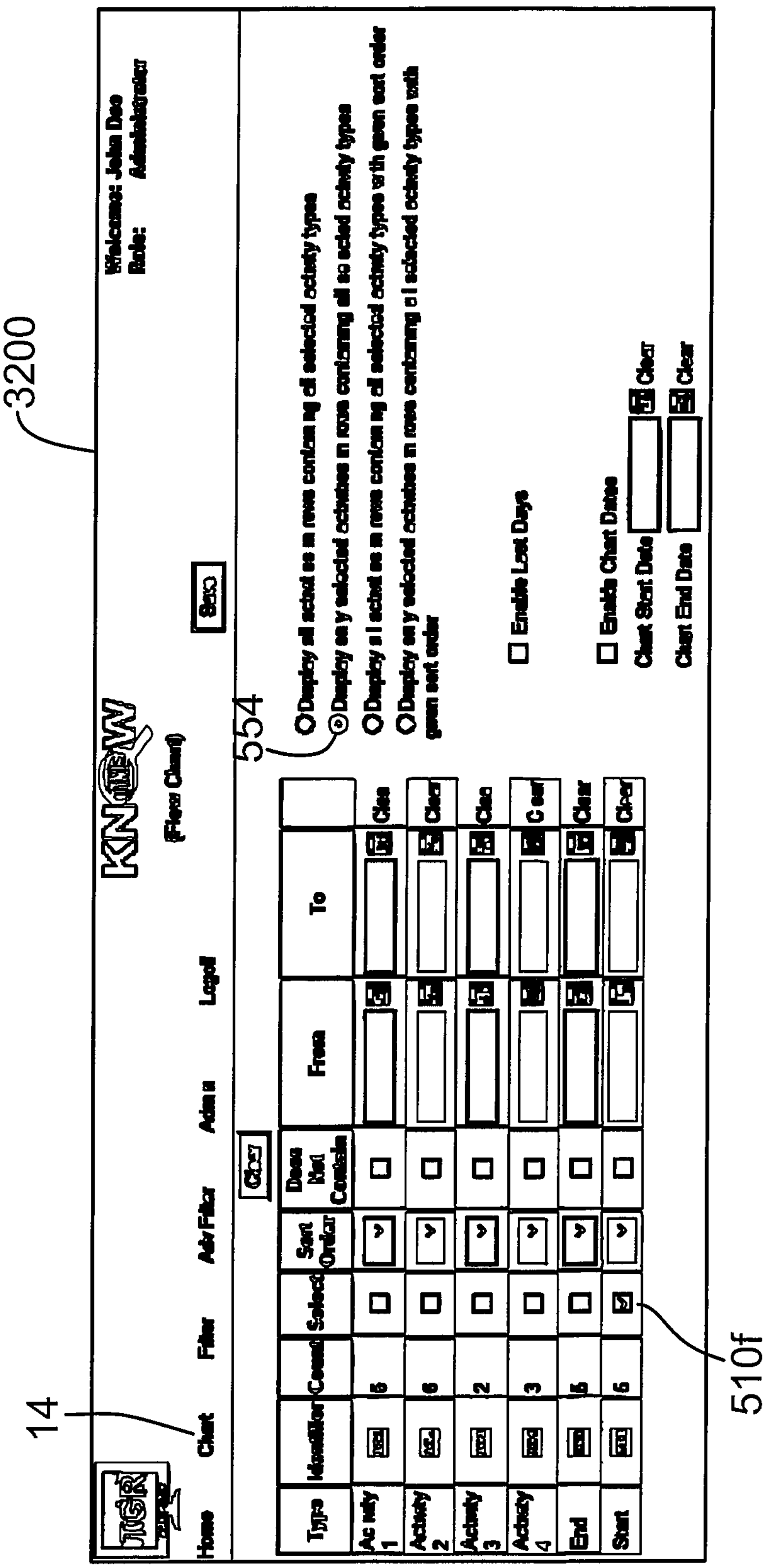
Figure 33:
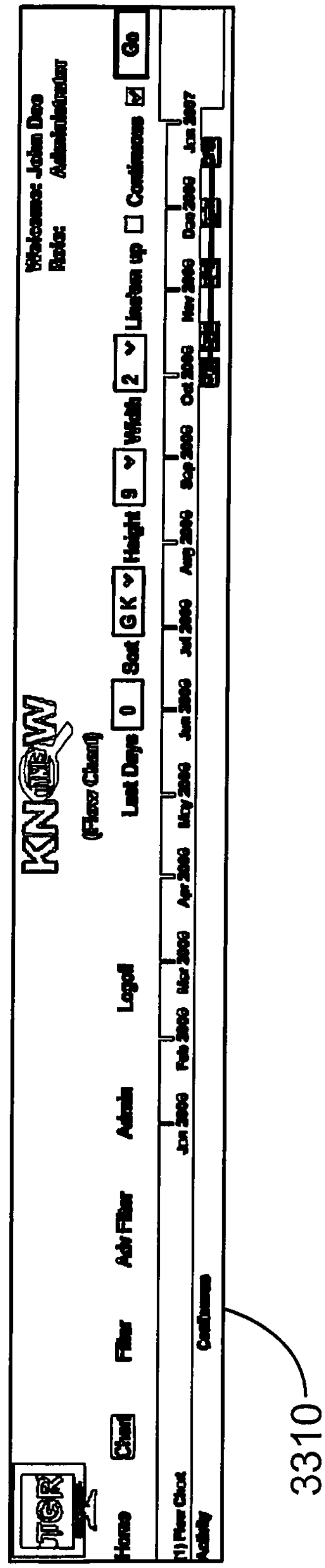

Reference is next made to the Advanced Filter screen depicted in FIG. 32 and indicated generally by reference 3200. As shown, the second radio button 554 (i.e. "Display only selected activities in rows containing all selected activity types") along with the Select check box 510*f* for the "Start" activity. In response to the Chart menu option 14 being clicked, the system generates a chart display 3310 as depicted in FIG. 33. The rendered chart display 3310 shows the "Start" activity of each of the five instances and the elapsed time between each start date (i.e. "STR") on the same timeline.

The Electrician/Drywall example described above with reference to FIGS. 27 to 29 presented a finite business process and provided a mechanism for determining when the Electricians were completing their jobs, so that the start date for drywallers to start their jobs could be determined. The continuous process function as described above provides a mechanism for determining, for example, when the Electricians are finishing, so that the Electrician can move to their next job. It will also be appreciated that there can be a relationship between a finite process and a continuous business process. For example, in the oil industry, the physical drilling activity is nested in an instance of a drilling workflow. Because well drilling rigs are expensive, an oil or exploration company will typically use one drilling rig to drill several wells with minimal downtime. By utilizing the system as described above, the oil or exploration company is provided with the capability to forecast drilling dates in a continuous mode (i.e. across several well prospects), which then allows all prior and later activities in the finite process timeline to be extrapolated based on the forecasted drill date.

Figure 34:
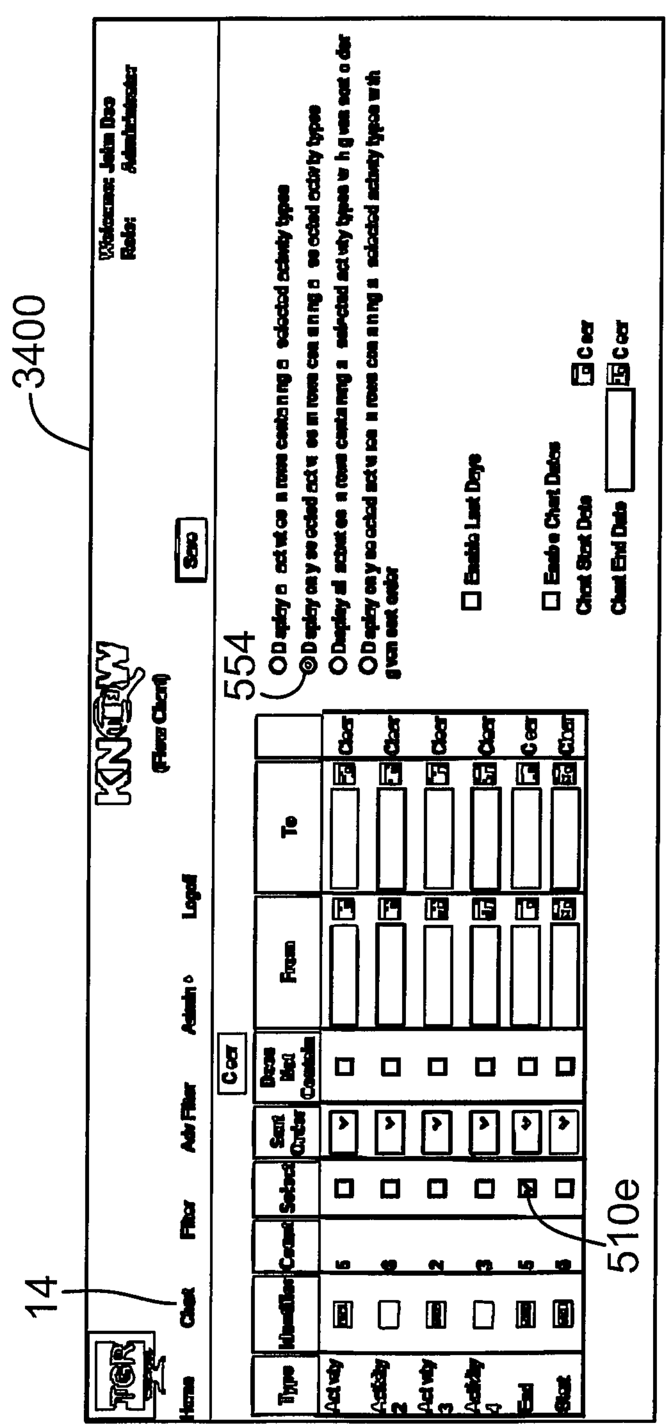
Figure 35:
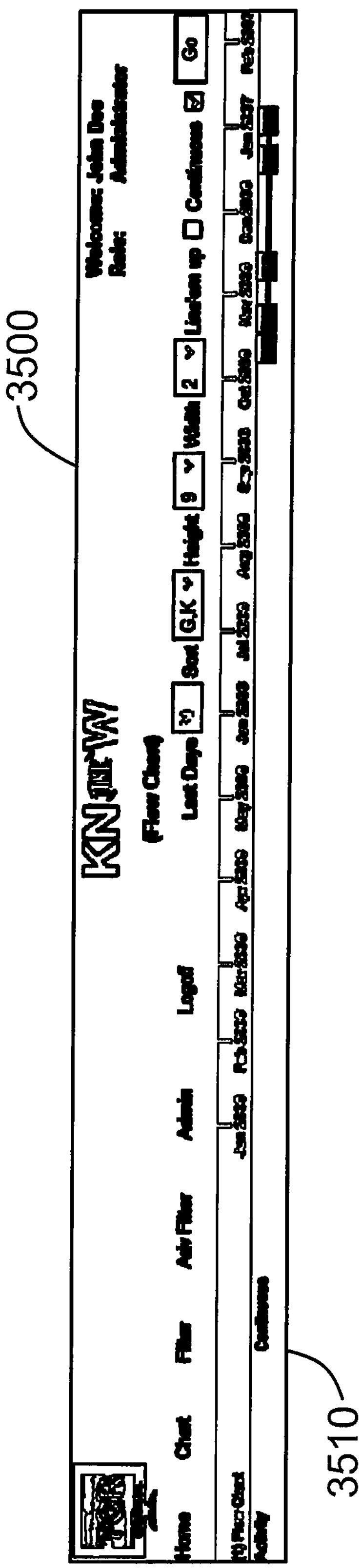

Reference is next made to FIG. 34, which shows an Advanced Filter screen 3400 configured in accordance with another aspect of the present invention. As shown, the second radio button 554 (i.e. "Display only selected activities in rows containing all selected activity types") along with the Select check box 510*e* for the "End" activity. In response to the Chart menu option 14 being clicked, the system generates a chart display 3510 for a chart screen 3500 as depicted in FIG. 35. The rendered chart display 3510 shows the "End" activity of each of the five instances and the elapsed time between each end date (i.e. "END") on the same timeline.

Figure 36:
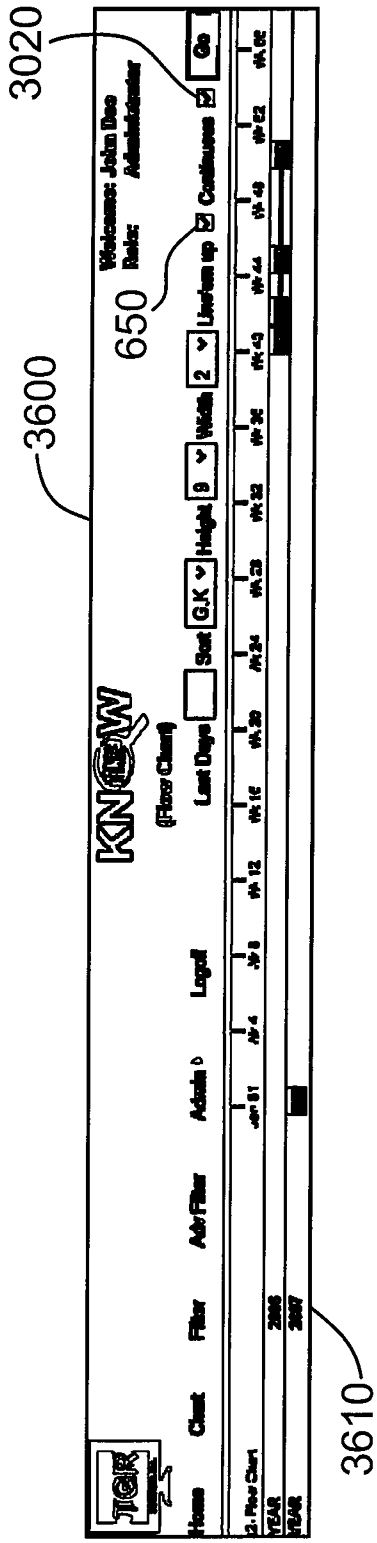

Reference is next made to FIG. 36, which shows a Chart screen 3600 generated in accordance with another aspect of the present invention. The Chart screen 3600 has rendered a chart display 3610 generated in response to the Continuous function checkbox 3020 and the Line'em UP checkbox 650 being activated. According to this embodiment, the chart display 3610 provides a YEAR comparison. Additional functions or code objects may be included to generate monthly, quarterly, bi-annual comparisons, in response to the Line'em Up and Continuous functions being simultaneously selected.

Figure 37A:
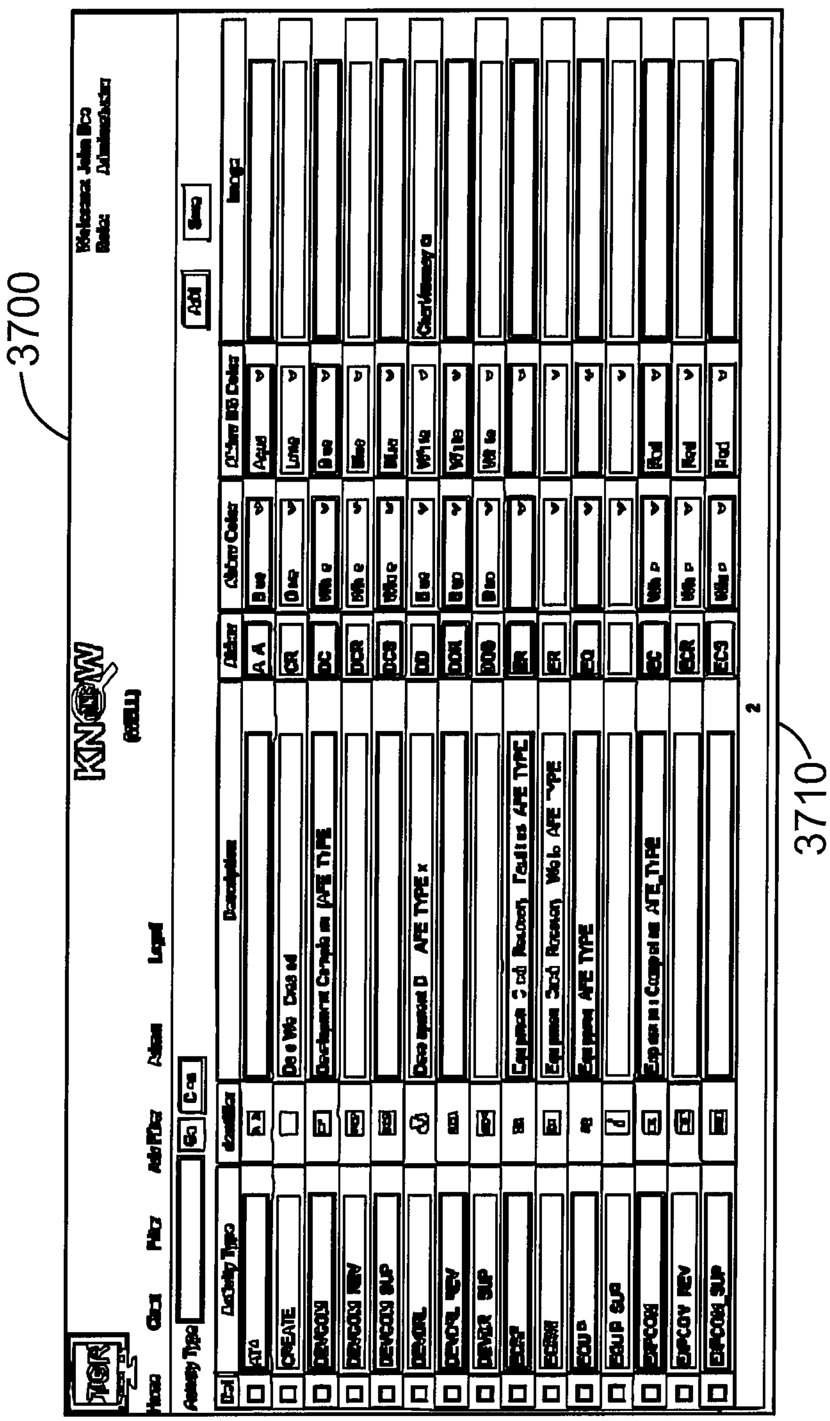
Figure 37B:
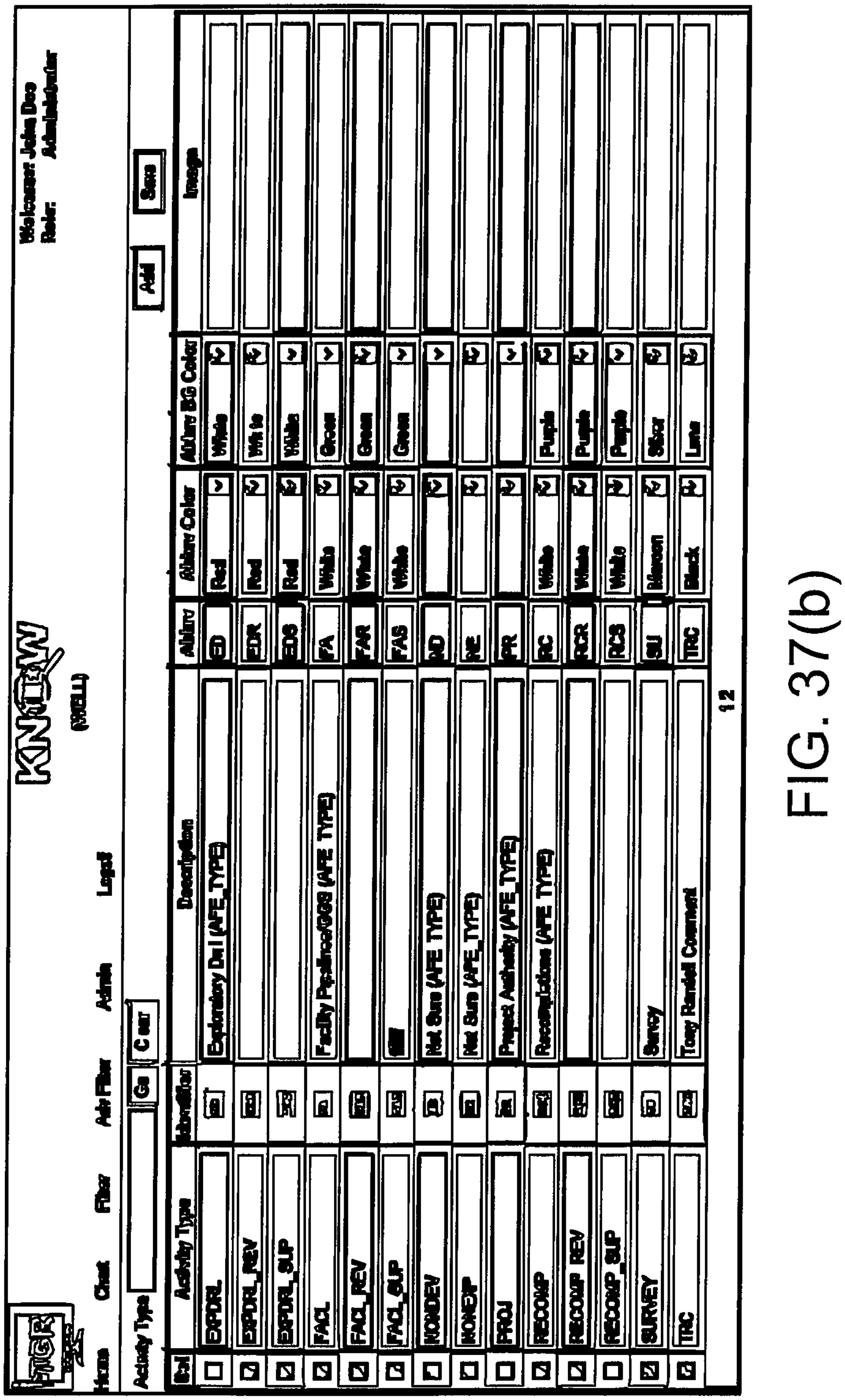

Reference is next made to FIG. 37, which shows a screen shot of an Activity Types screen 3700 depicting the activities for a Business Process "Well". The chart display of FIG. 37 comprises one or more pages, and is configured with a page control 3710. According to an embodiment, the Activity type page is configured to display 14 rows, therefore, (number of Activity Types)/14=(number of pages). The number 14 is currently "hard coded" but could easily be turned into a global or user-defined parameter. In accordance with this example, the page control 3710 is configured to toggle between page 1 in FIG. 37(*a*) and page 2 in FIG. 37(*b*).

Figure 38:
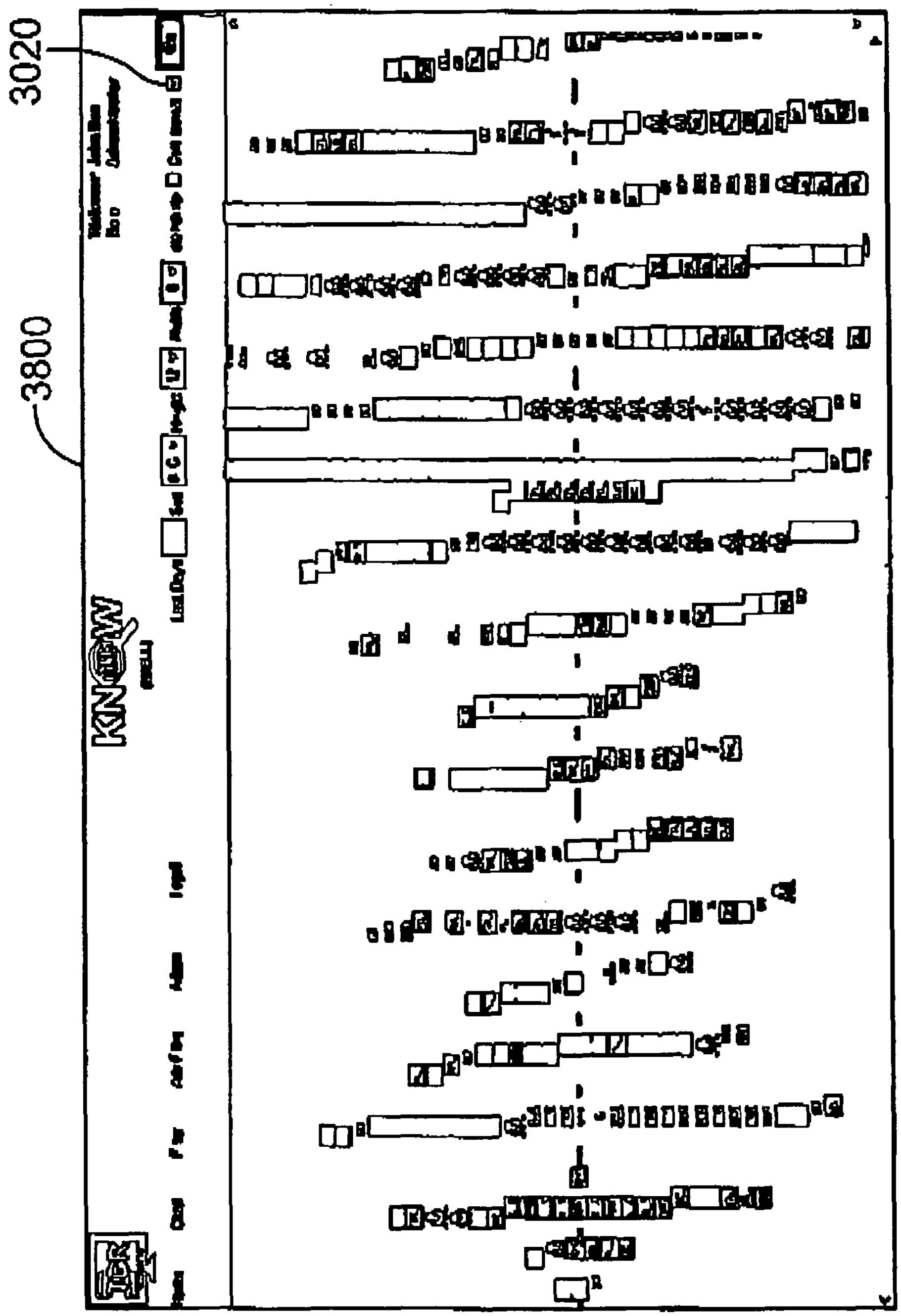

FIG. 38 is a screen shot 3800 of the Business Process "Well" with the Continuous function checkbox 3020 activated. To prevent activity indicators from overlapping when they occur on the same date (or dates that are close together), the system includes the capability to vertical stack and center the indicators on the time line.

Figure 39:
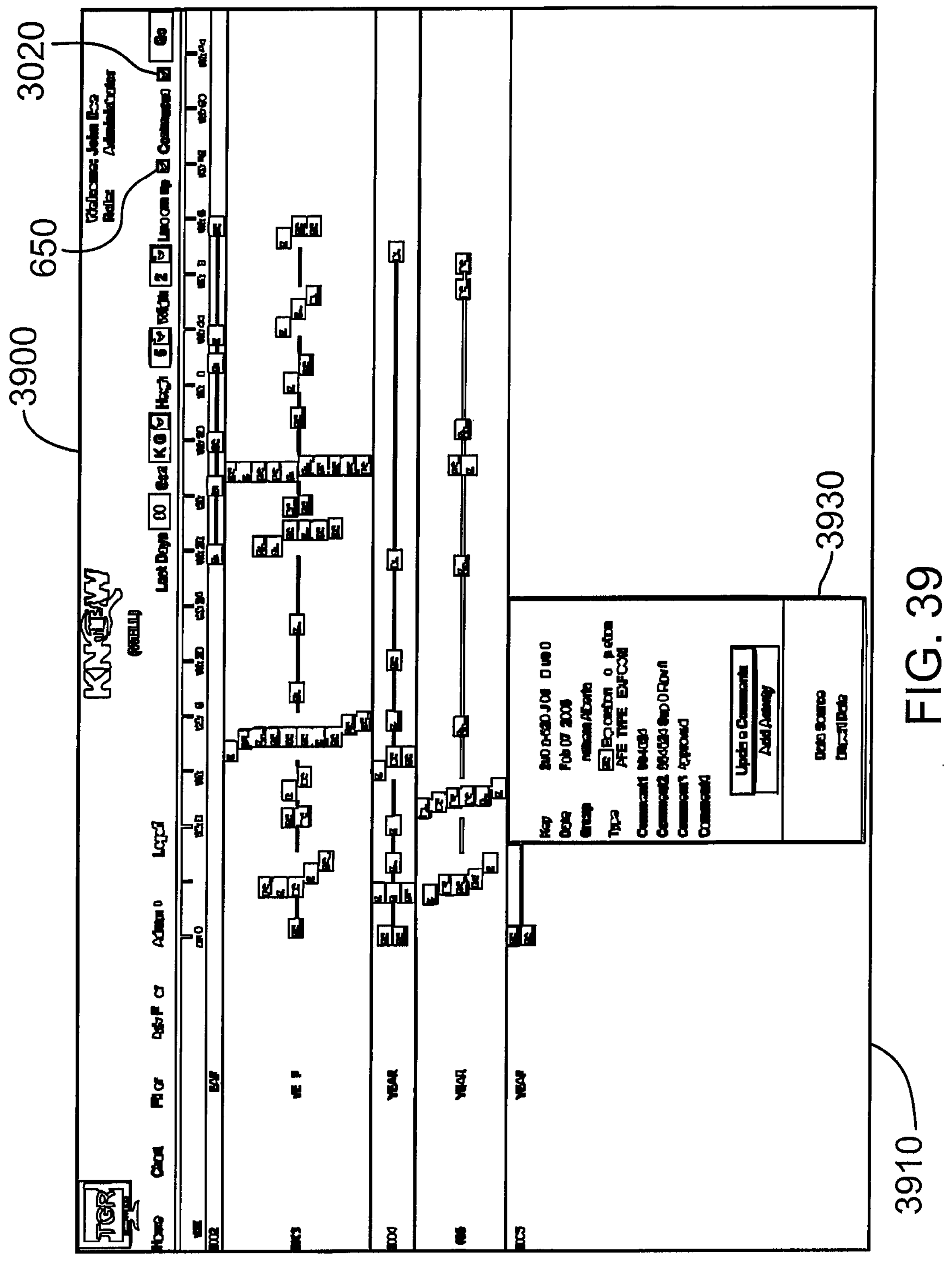

Reference is next made to FIG. 39, which shows a Chart screen 3900 having rendered a chart display 3910 in accordance with another aspect of the present invention. The chart display 3910 is generated as a result of the Advanced Filter screen being configured to select an "EC" activity and the "Line'em Up" 650 and Continuous function 3020 menu options being selected. The chart display 3910 allows a user to compare the frequency of "EC" activities across a period of 5 years. As also shown in FIG. 39, a pop-up box 3930 has been activated (e.g. by clicking on the Activity icon, or by dragging a mouse over the icon) to provide details about the associated well. According to another aspect, a "time between activities" display is generated in response to a "mouse over" action on a timeline.

Figure 40:
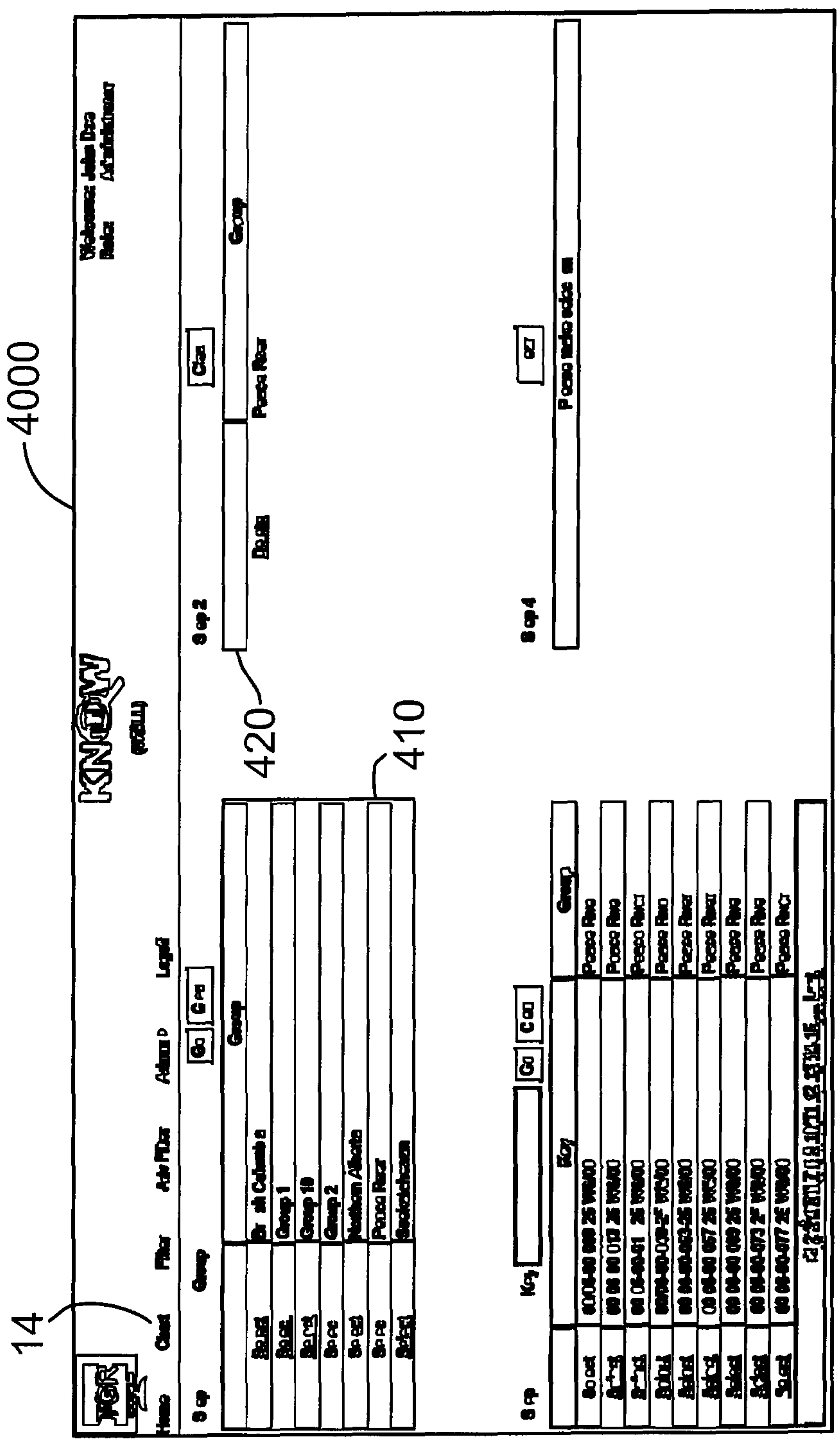
Figure 41:
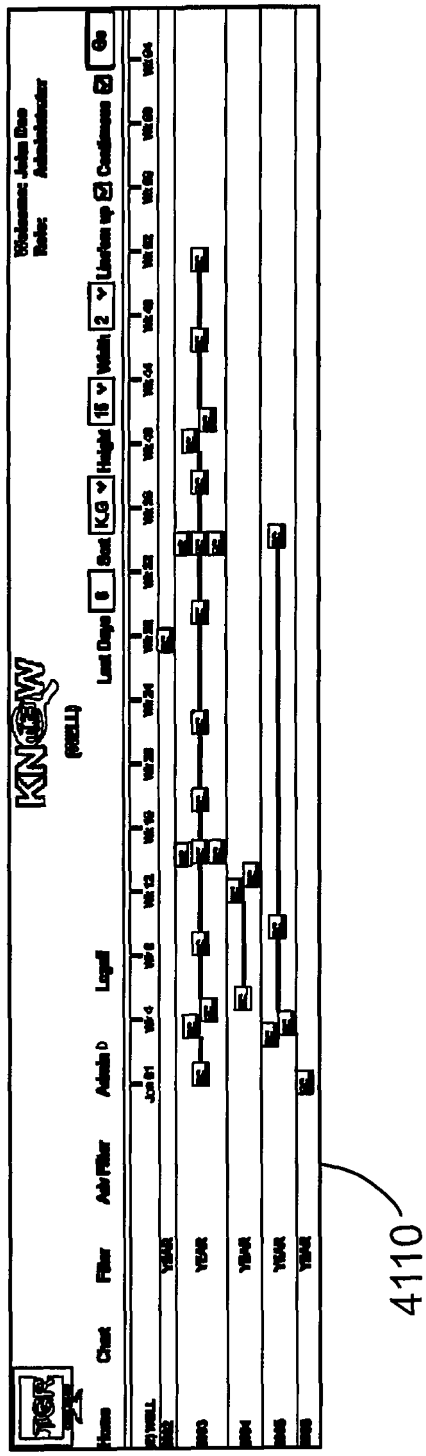

Reference is next made to FIG. 40, which shows a Filter screen 4000 configured to select the Business Unit (i.e. Group) "Peace River", i.e. using the first 410 and second 420 panels as described above with reference to FIG. 4. In response to the Chart menu option 14 being clicked in the Filter screen 4000, the system generates a chart display 4110 as depicted in the Chart screen of FIG. 41. As shown, the Continuous function and the "Line'em UP" checkboxes have been activated in the Chart screen, and the chart display 4110 shows the "EC" activities on yearly comparison basis.

Figure 43:
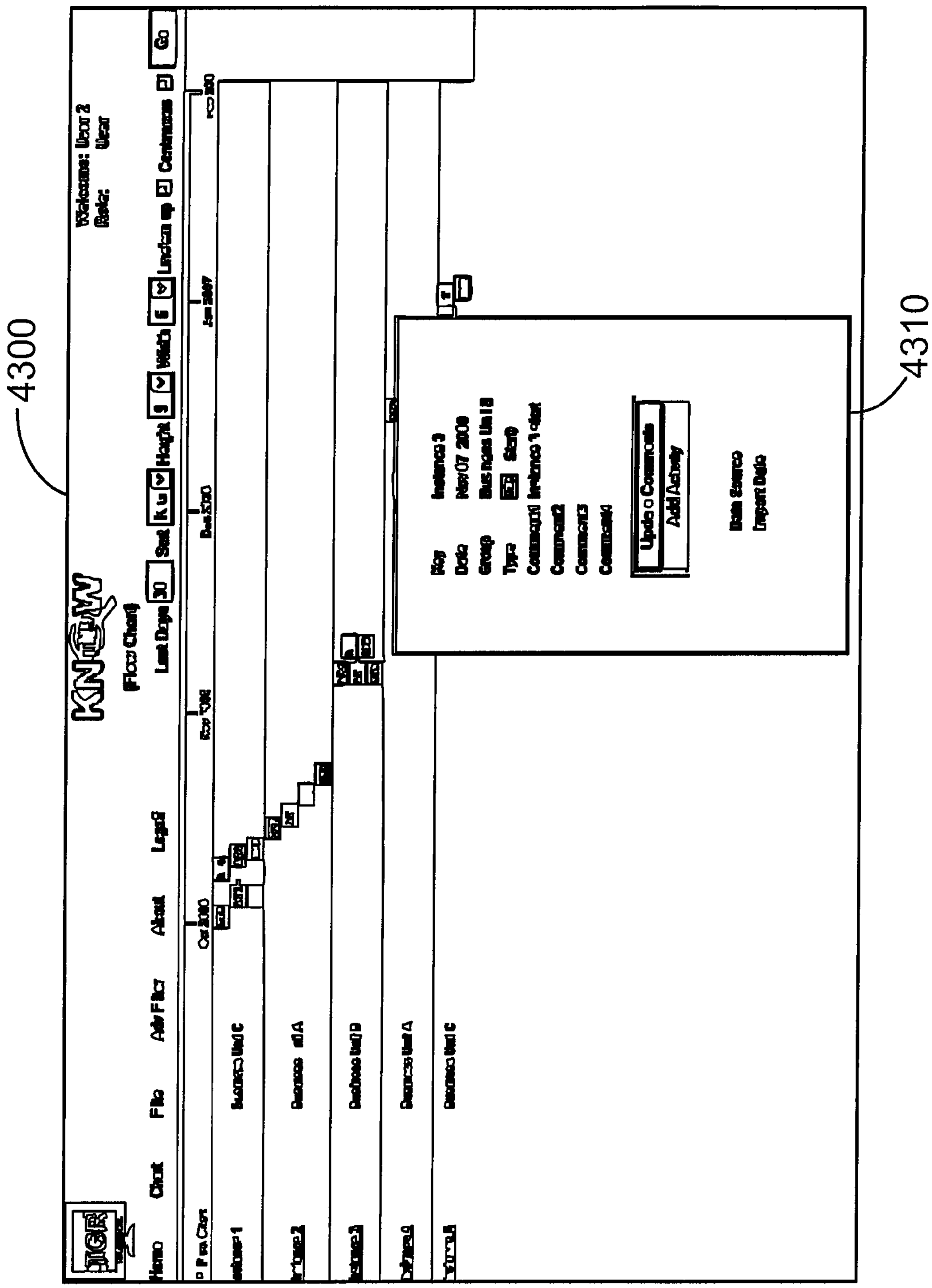
FIG. 43 shows a screen shot of a chart screen configured for a user with non-administrator privileges.
Figure 44:
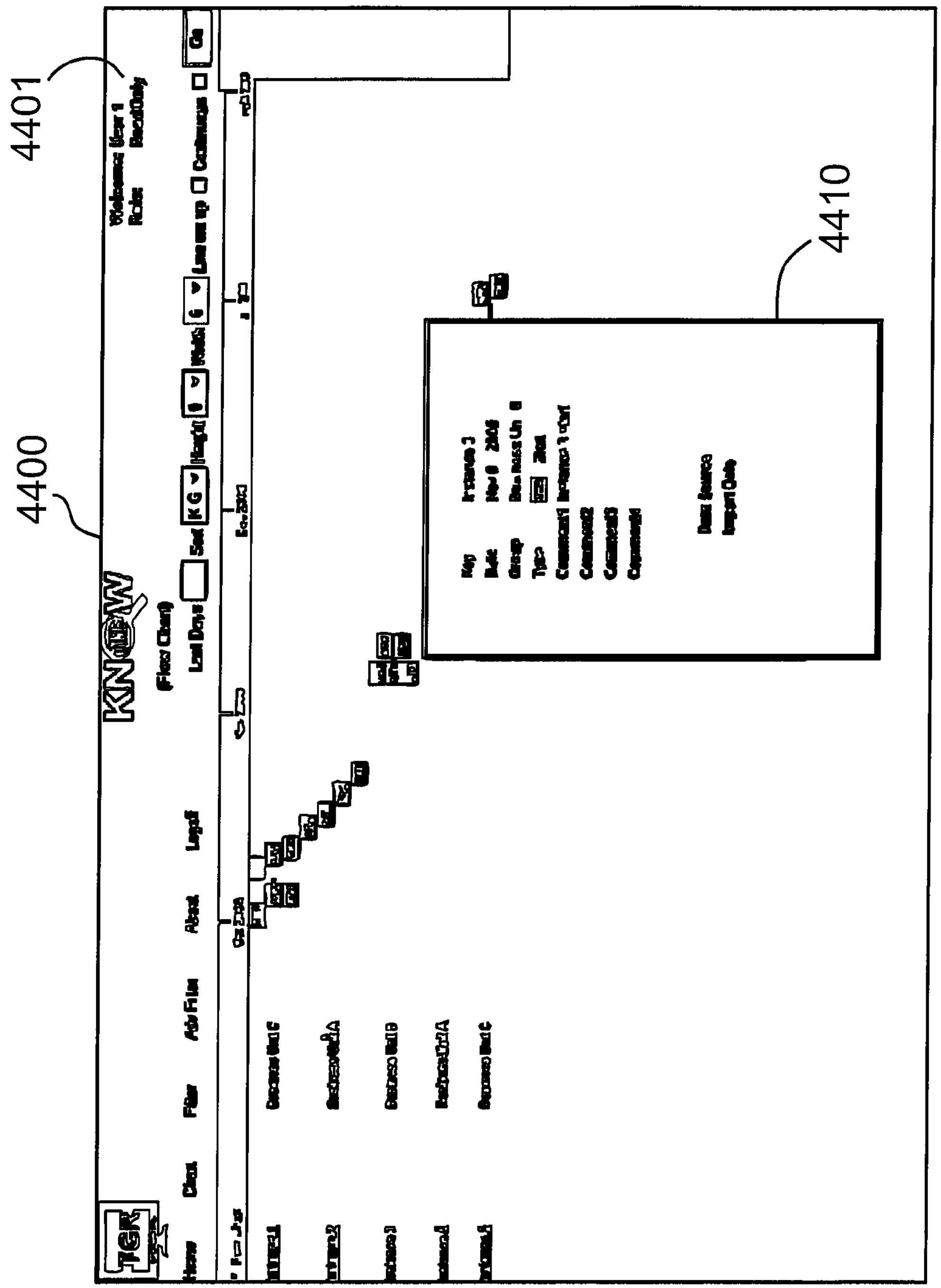
FIG. 44 shows a screen shot of a chart screen configured for a read only mode.

Reference is next made to FIG. 42, which shows a screen shot of a Security screen according to an embodiment and indicated generally by reference 4200. The Security screen 4200 is configured to maintain data in the T_User data block or table in FIG. 7. The Security screen 4200 is accessed or invoked through the Security menu option 23 in the Admin dropdown menu 19 in FIG. 2(*a*). According to an embodiment, the Security screen 4200 is configured to provide the following functionality:

- "administrator role or mode"—in an administrator role, an "administrator" is provided or given access to all functionality in the system; for example, the Administrator has access to the "Admin" dropdown menu;
- "user role or mode"—in a user role, a user does not have access to the Admin dropdown menu, and the system is configured to allow the user to maintain activity data through menu buttons on an activity popup window 4310 on a Chart screen 4300 as depicted in FIG. 43. As shown in FIG. 43, the activity popup window 4310 comprises an "Add Activity" button and an "Update Comments" button. As also shown in FIG. 43, a user is logged in "user mode" and the Admin menu dropdown 19 (FIG. 2(*a*)) is replaced with an "About" menu dropdown. The activity popup window 4310 also includes an "Upload File" button. However, for the configuration shown in FIG. 43, the Upload File button is not displayed or active because this business process does not have data in the "File Upload Extensions" column (FIG. 2(*b*)) on the business process screen;
- "read only mode or role"—in read only mode, a user is not allowed to modify any data in the system; the user is given access to the Filter and the Advanced Filter screens to assist with creating analysis charts as described above. In read only mode, a ReadOnly indicator on a screen for example as indicated by reference 4401 in the screen 4400 in FIG. 44. As also shown in FIG. 44, the activity popup window 4410 does not include any menu buttons which would allow a user to modify data.

Figure 45:
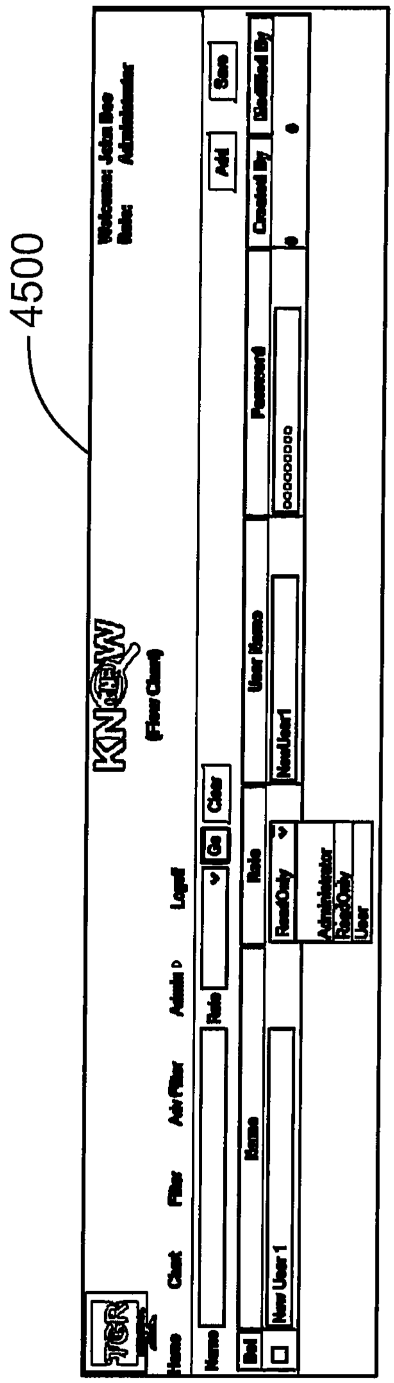
FIG. 45 shows a screen shot of a security screen configured for an administrator.
Figure 46:
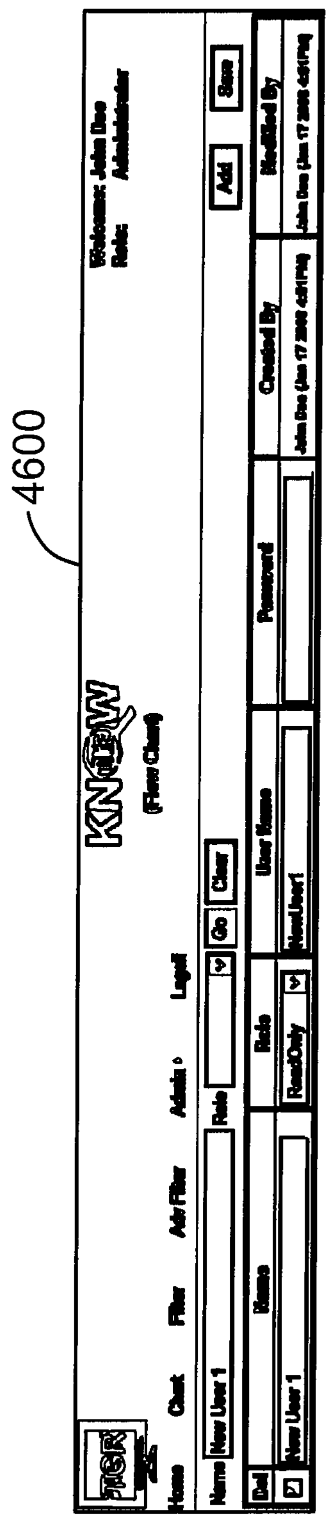
FIG. 46 shows a screen shot of the security screen of FIG. 45 generated in response to the "Save" button being clicked.

Reference is next made to FIG. 45, which shows a screen shot of a security screen 4500 configured for an administrator. Clicking the Add button on the Security screen 4200 in FIG. 42 results in the rows being displayed as a blank row. As depicted in FIG. 45, the Add button is disabled. In response to a user populating one or more of the fields and clicking the Save button results in the following operations:

- the data is validated and saved to the T_USER table (FIG. 7); according to an embodiment, validation includes checking to ensure password contains at least 8 characters and at least one character is a number the Filter screen is sot or configured, for example, according to data from the T_USER table the display table in FIG. 45 is populated based on the Filter set the "Add" button is enabled FIG. 46 shows a security screen 4600 generated in response to the Save button in the screen 4500 of FIG. 5 being clicked by the user.

Figure 47:
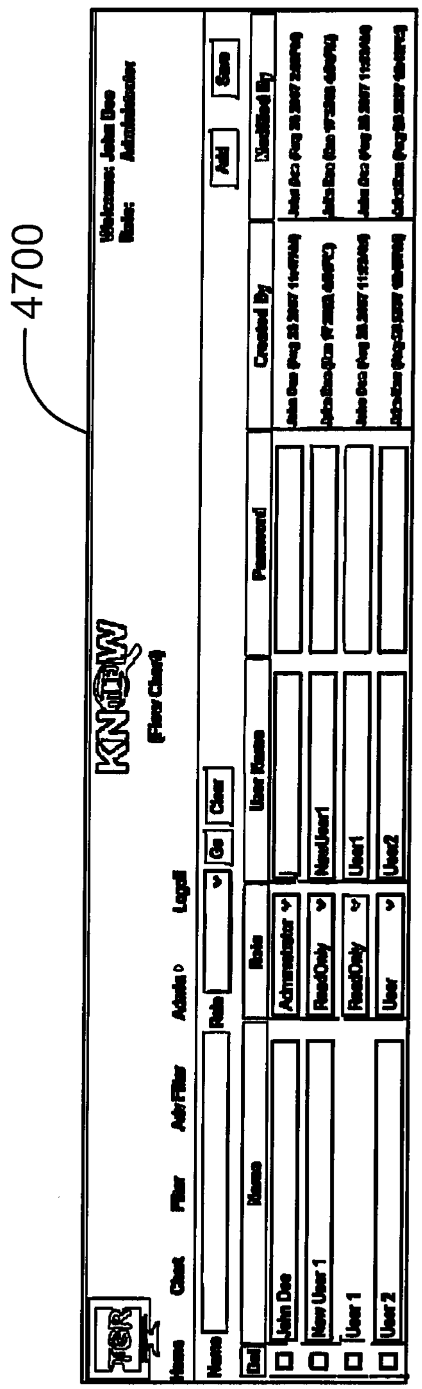
FIG. 47 shows a screen shot of the security screen of FIG. 46 generated in response to the "Clear" button being clicked.

Reference is next made to FIG. 47, which shows a Security screen 4700 generated in response to the "Clear" button in FIG. 46 being clicked by a user. The Clear button is configured to remove the filter parameters that were being applied.

Figure 48:
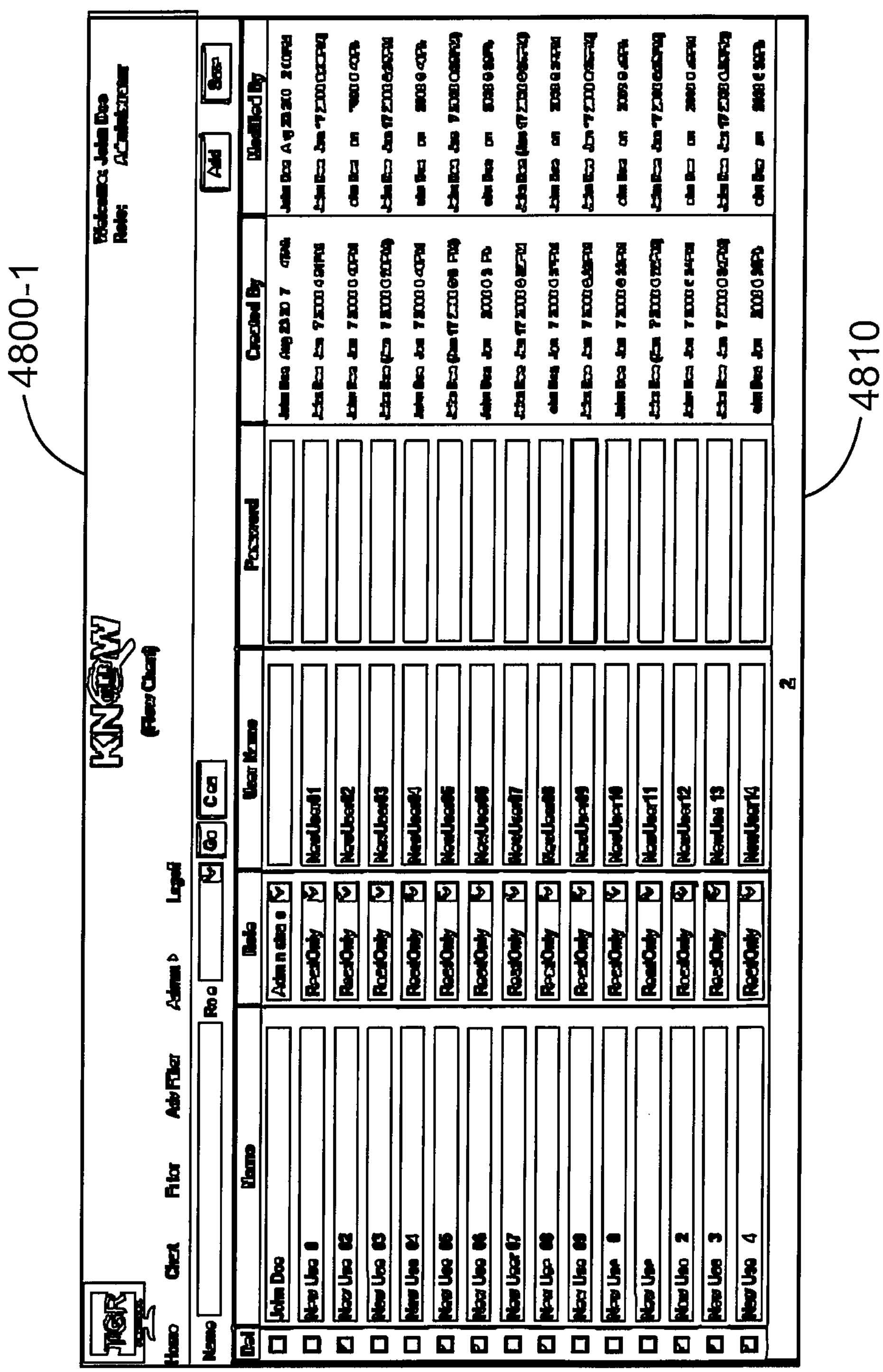
FIG. 48 shows a screen shot of a screen generated from the security screen of FIG. 47 with additional rows.
Figure 49:
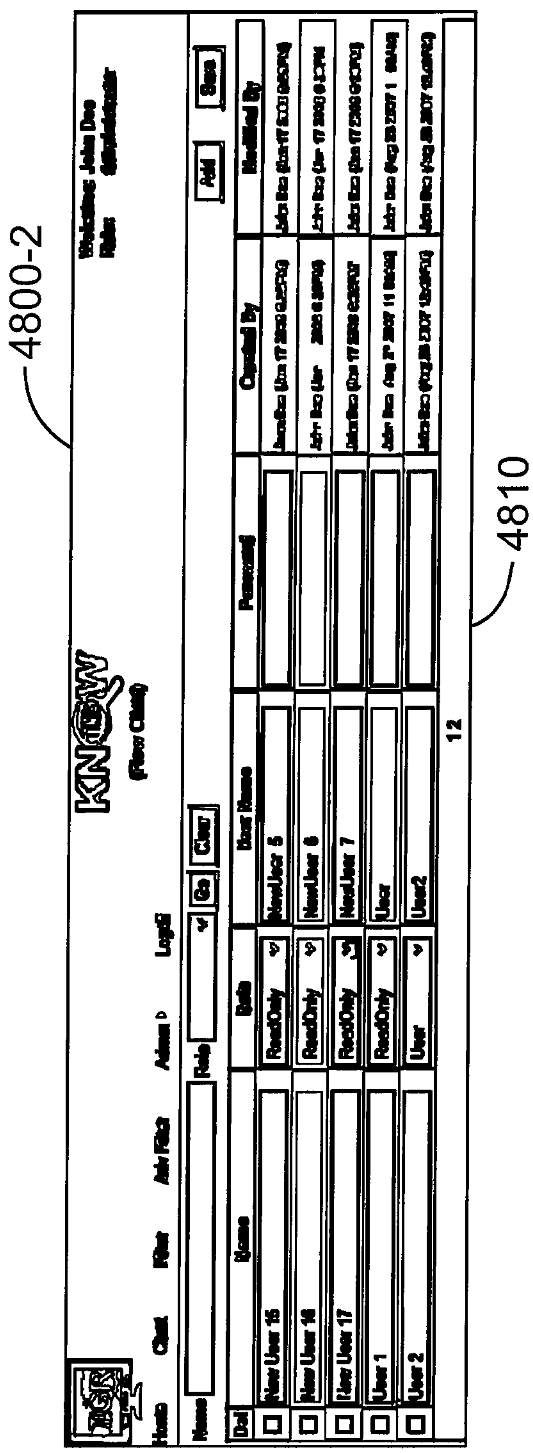
FIG. 49 shows a screen shot of the second page for the security screen of FIG. 48.

Reference is next made to FIGS. 48 and 49. FIG. 48 shows a first page 4800-1 of a Security screen generated from the Security screen 4700 of FIG. 47, i.e. by adding rows. FIG. 49 shows a second page 4800-2 for the Security screen. According to an embodiment, if the number of rows to be displayed exceeds a certain predetermined number, then a paging menu 4810 appears in the footer to indicate there is more than one page for the screen. The paging menu 4810 enables a user to "page" through the rows by clicking on the paging numbers.

Figure 50:
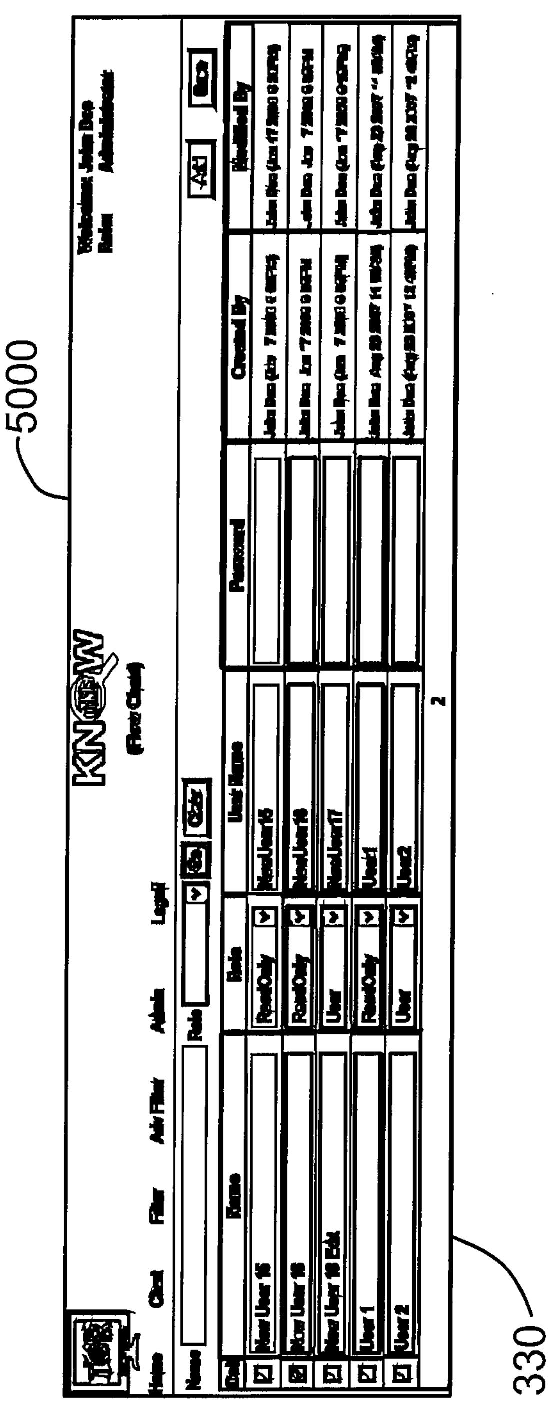
FIG. 50 shows a screen shot of a security screen configured for editing by a user.
Figure 51:
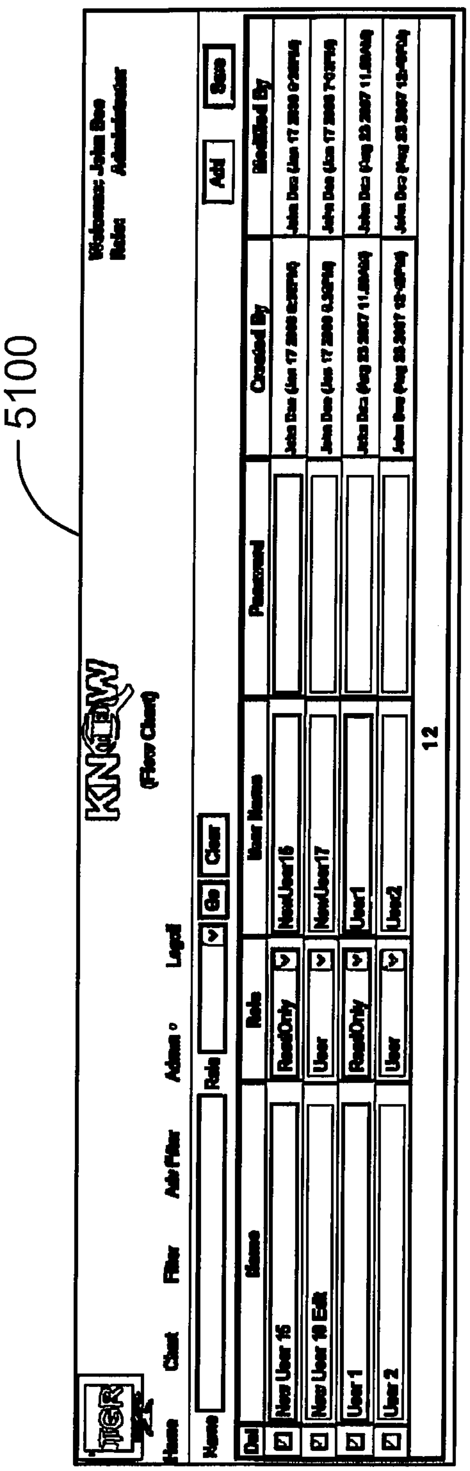
FIG. 51 shows a screen shot of the security screen of FIG. 50 in response to the "Save" button being clicked.

Reference is next made to FIG. 50, which shows a Security screen 5000 configured for editing by a user. In FIG. 50, the second row (i.e. "New User 16") is configured for deletion using the Delete column 330. As also shown in FIG. 50, the third row (i.e. "New User 17") is changed to "New User 18 Edit" and the role (i.e. mode) is changed to "User". In response to the user clicking the "Save" button in the screen 5000, a screen 5100 as shown in FIG. 51 is generated, i.e. "New User 16" is deleted and the edits are saved.

Figure 52:
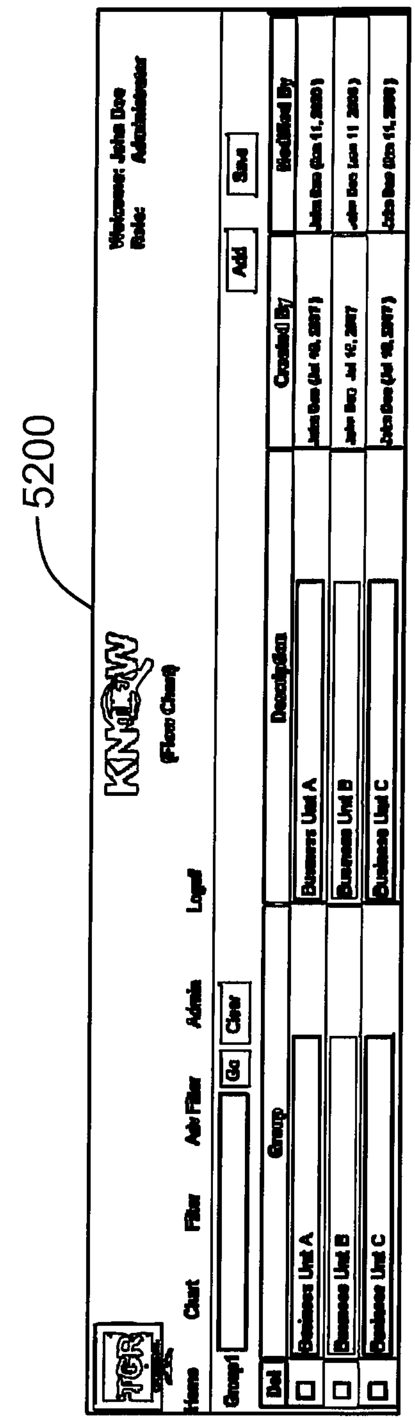
FIG. 52 shows a screen shot of a Group1 chart screen according to an embodiment of the invention.

Reference is next made to FIG. 52, which shows a Group1 screen 5200 according to an embodiment. The Group1 screen 5200 is displayed in response to clicking the Group1 menu option 24 from the Admin menu 19 in FIG. 2(*a*). Data entered in this screen 5200 is saved in the T_Group1 data table 705*a* (FIG. 7) and used by the system to populate Group1 dropdown boxes. In addition, Group1 data is used to populate Step1 and Step 2 frames in the Filter screen. The Group2 (reference 25 in FIG. 2(*a*)), Group3 (reference 26 in FIG. 2(*a*)) and Group4 (reference 27 in FIG. 2(*a*)) menu options are configured and operate in a similar fashion.

Figure 53A:
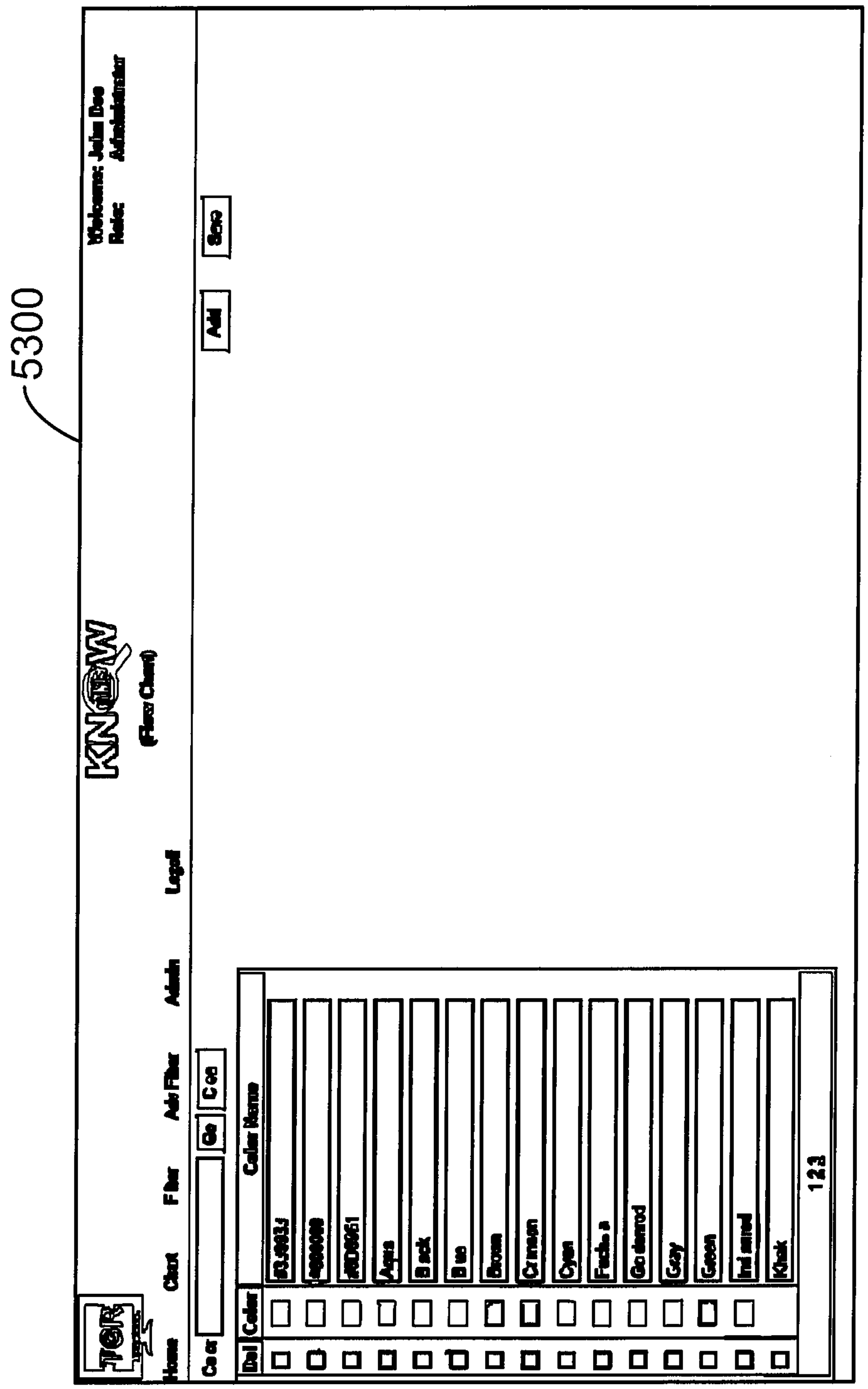
FIG. 53(a) shows a screen shot of a Color screen according to an embodiment of the invention.
Figure 53B:
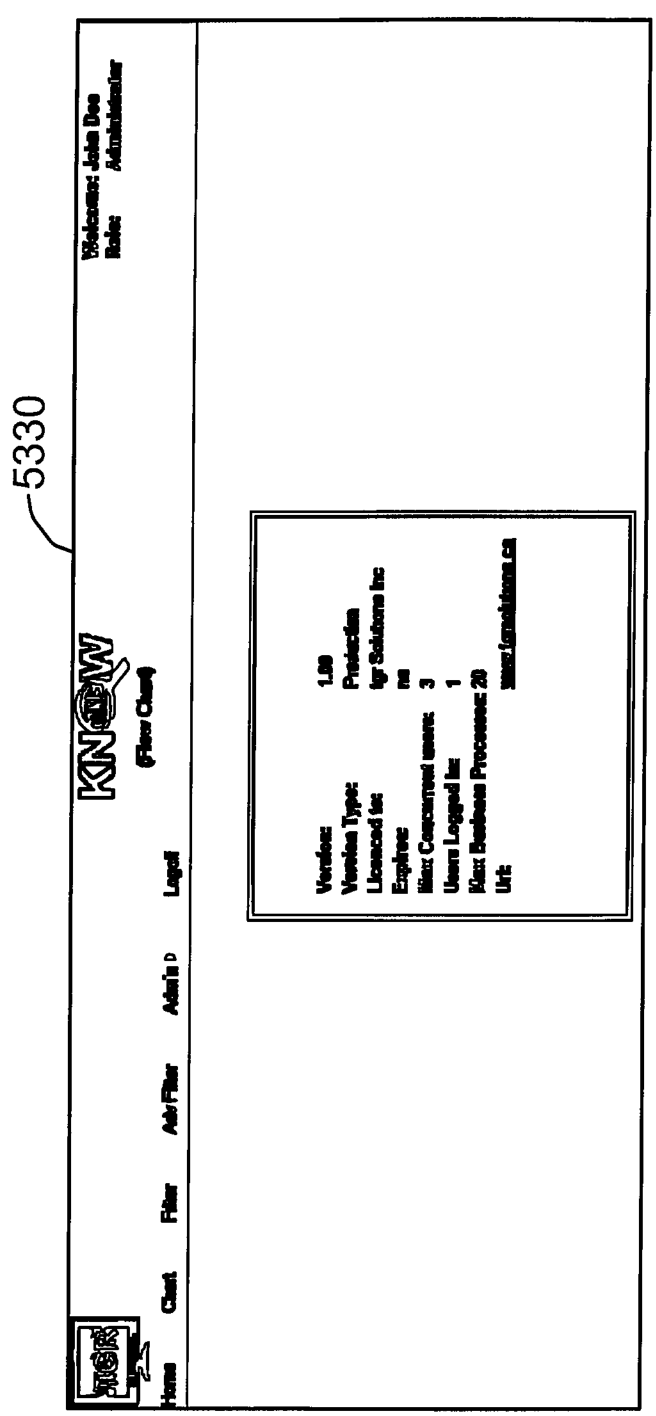
FIG. 53(b) shows a screen shot of a screen generated in response to an "About" menu option.

Reference is next made to FIG. 53(*a*), which shows a Color screen 5300 according to an embodiment. The Color screen 5300 is displayed in response to clicking the Colors menu option 29 from the Admin menu 19 in FIG. 2(*a*). The Color screen 5300 is configured to allow a user to enter HTML colors in the system. Data entered in this screen is stored in the T_COLOR data table 709 (FIG. 7) and used to populate color dropdown boxes. The color dropdown boxes are found, for instance, in the Activity Type and the business process screens. FIG. 53(*b*) shows an About screen 5330 which is generated in response to the About menu option being clicked (FIG. 2(*a*)). Information displayed on the About screen 5330 includes data from a license file.

Figure 54:
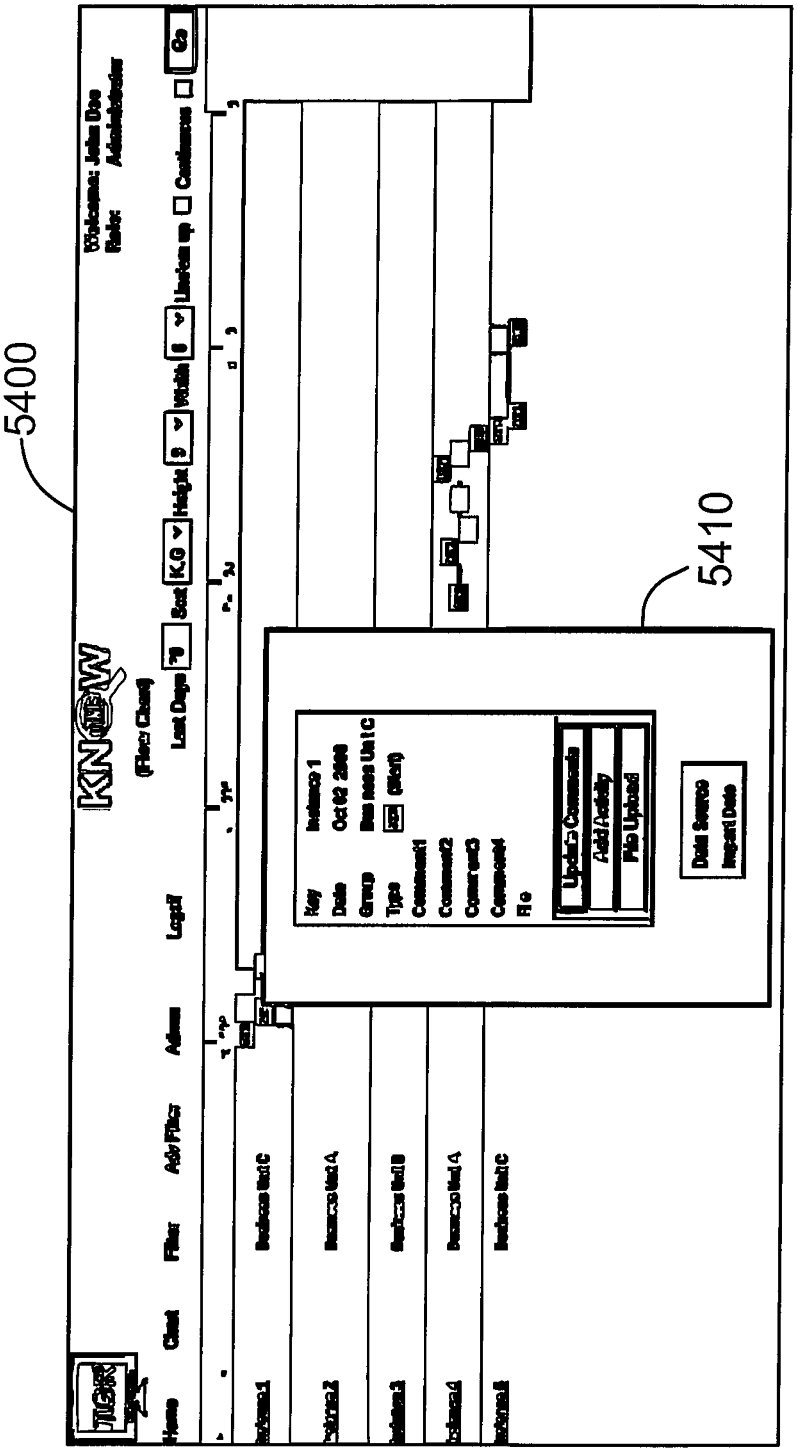
FIG. 54 shows a screen shot of a chart screen with an activity icon popup window displayed.
Figure 55:
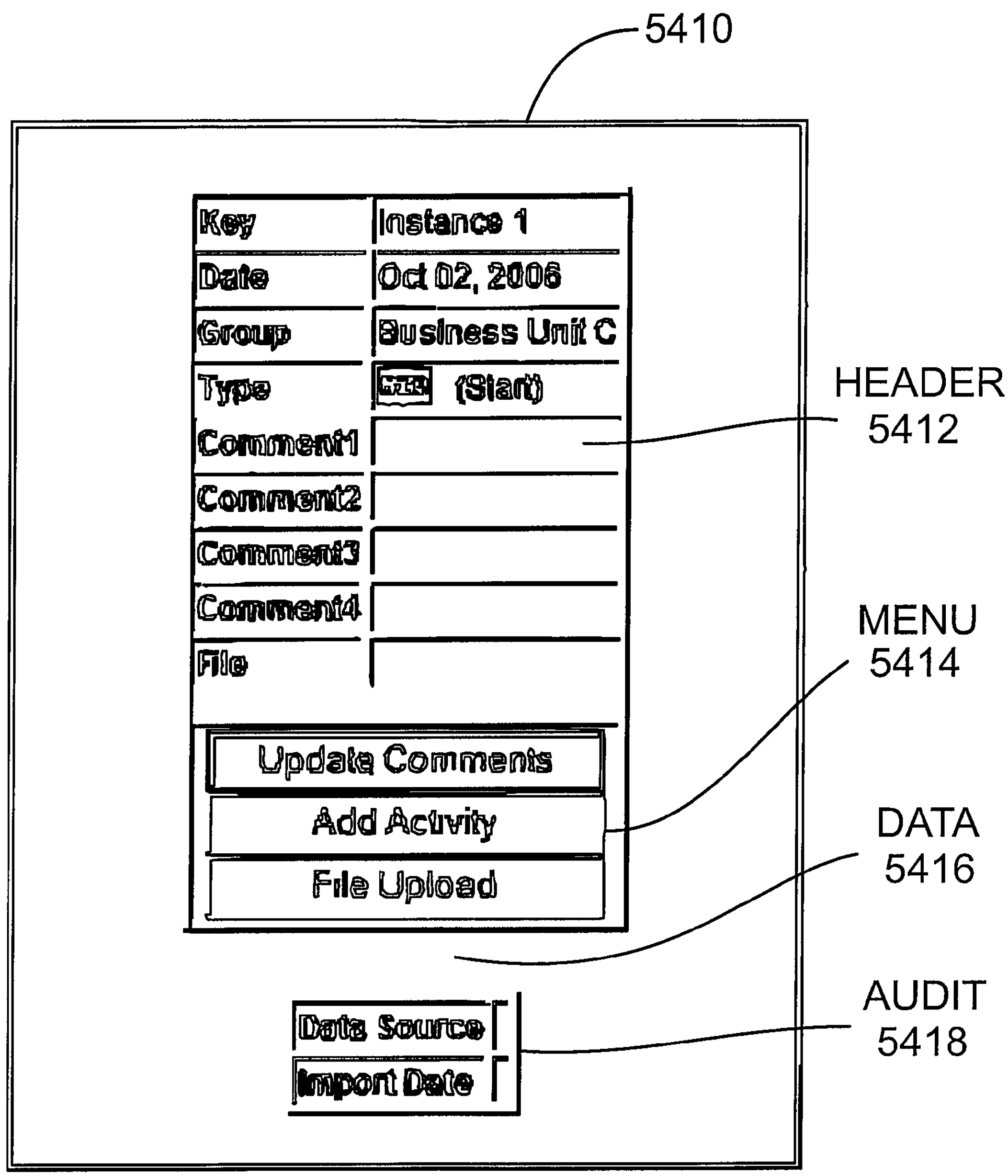
FIG. 55 shows the activity icon popup window of FIG. 54 in more detail.
Figure 56:
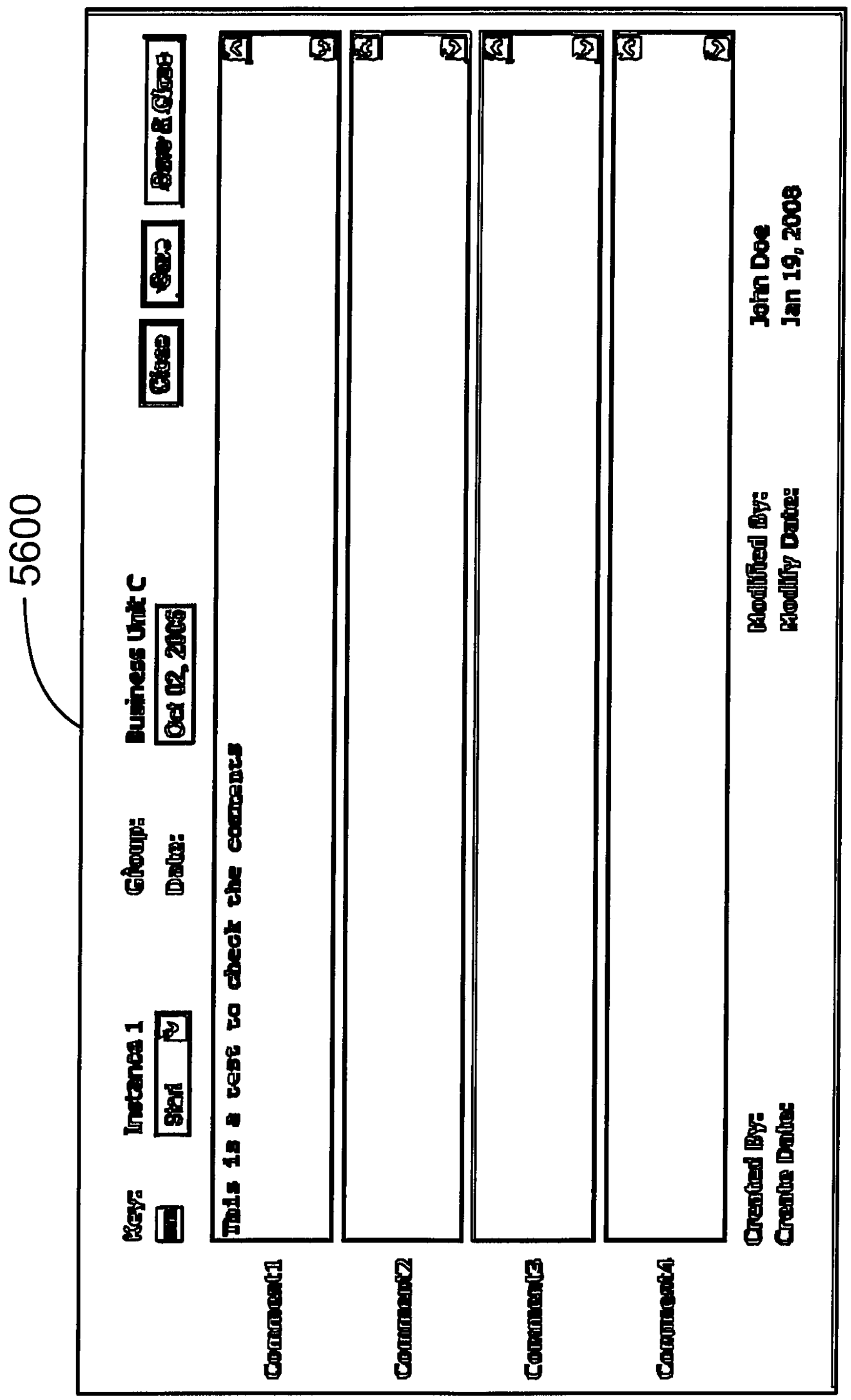
FIG. 56 shows a screen shot of an Update Comments screen according to an embodiment of the invention.
Figure 57:
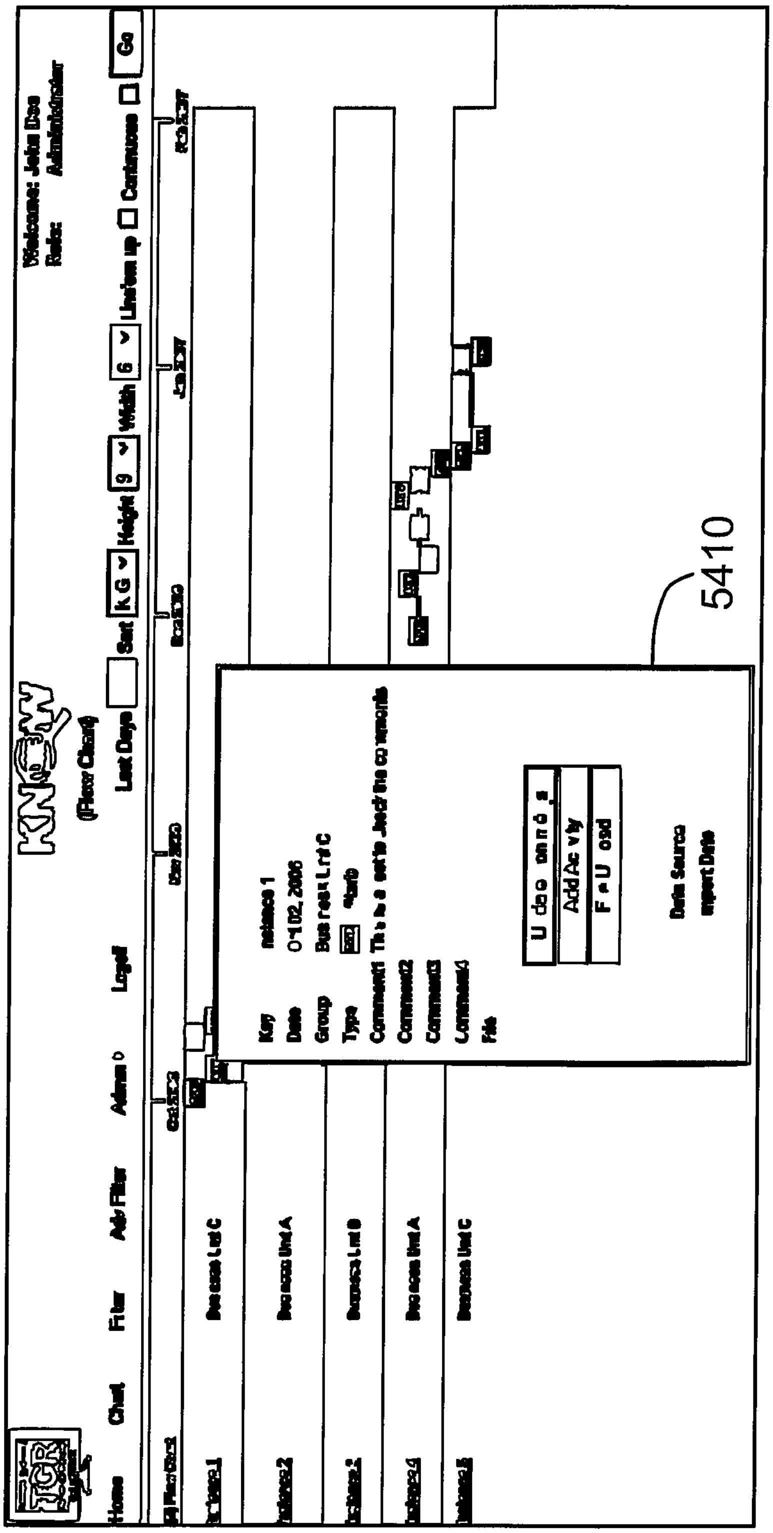
FIG. 57 shows a screen shot of a chart screen with a popup window displayed according to an embodiment of the invention.
Figure 58:
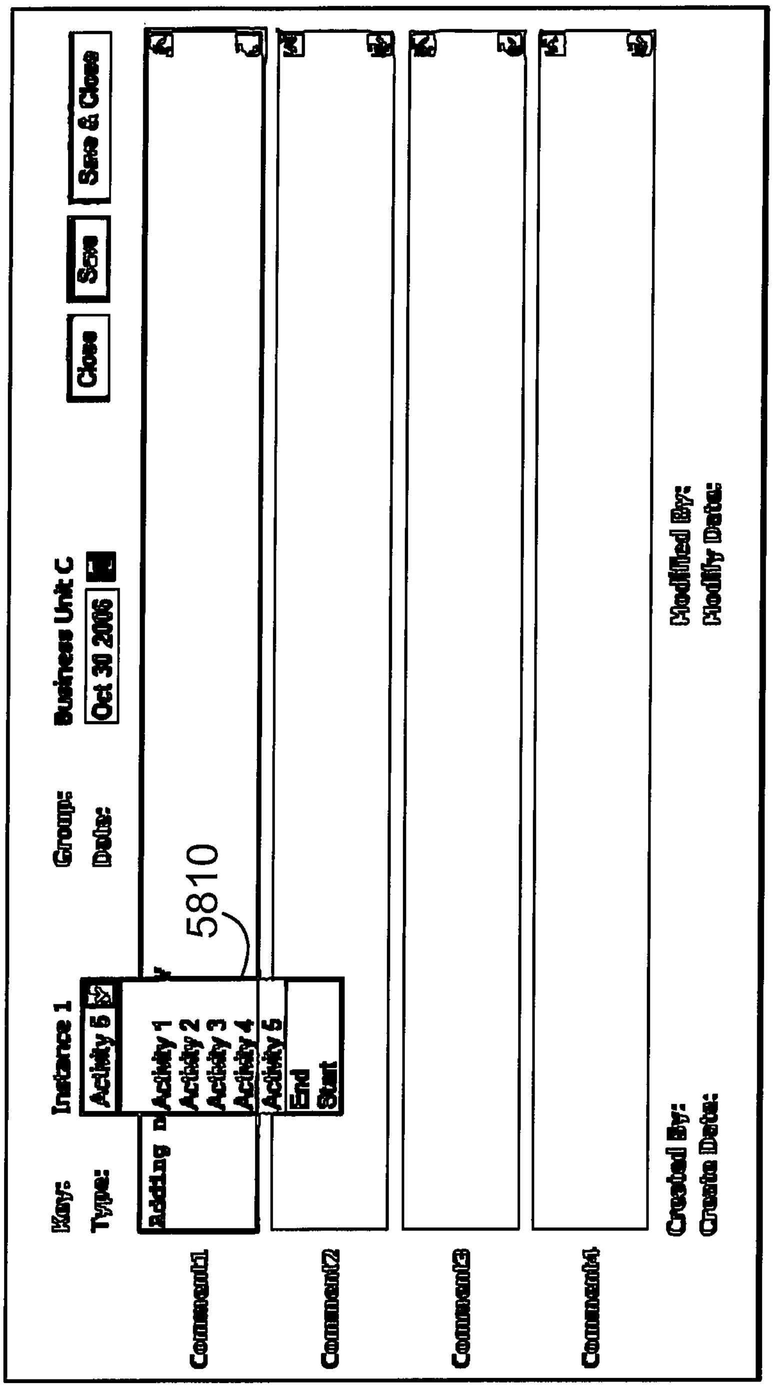
FIG. 58 shows the popup window of FIG. 57 with a comment edit feature.

Reference is next made to FIGS. 54 to 63 which show a Popup window according to embodiments of the invention. FIG. 54 shows a Chart screen 5400 with an Activity Popup window 5410. The Activity Popup window 5410 is displayed in response to the clicking of the first activity icon (i.e. "Start activity") in the first timeline in the chart screen 5400. The Popup window 5410 is shown in more detail in FIG. 55 and according to an embodiment comprises the following elements/functional components: a header 5412, a menu 5414, an activity data component 5416 and a data audit component 5418. The header 5412 comprises rows containing information about the activity, e.g. "Key", "Date", "Group", "Type". The header 5412 also includes fields "Comment1", "Comment2", "Comment3", "Comment4" for user comments, and a "File" button to launch and view a file (if file attached to the icon). The menu 5414 comprises three menu buttons: an "Update Comments" button, an "Add Activity" button, and a "File Upload" button. The Update Comments button allows a user to add/modify user comments displayed in the Header. Clicking the Update Comments button results in an Update Comments screen 5600 as shown in FIG. 56 being displayed. FIG. 57 shows the Popup window 5410 updated according to the comment added in FIG. 56. The Add Activity button allows a user to add a new Activity to the current instance timeline. Clicking the Add Activity button results in an Add Activity screen with an Activity Type dropdown box 5810 being displayed as shown in FIG. 58. The File Upload button allows a user to attach a file to the current activity. The Activity Data component or field 5416 displays Activity Data (if available). The Data Audit component 5418 displays the data source and import date for Activity data. The Data Audit component 5418 may be used data is obtained from multiple data sources.

Reference is next made to FIG. 57, which shows the Popup window 5410 updated according to the comment added in FIG. 56.

Figure 59:
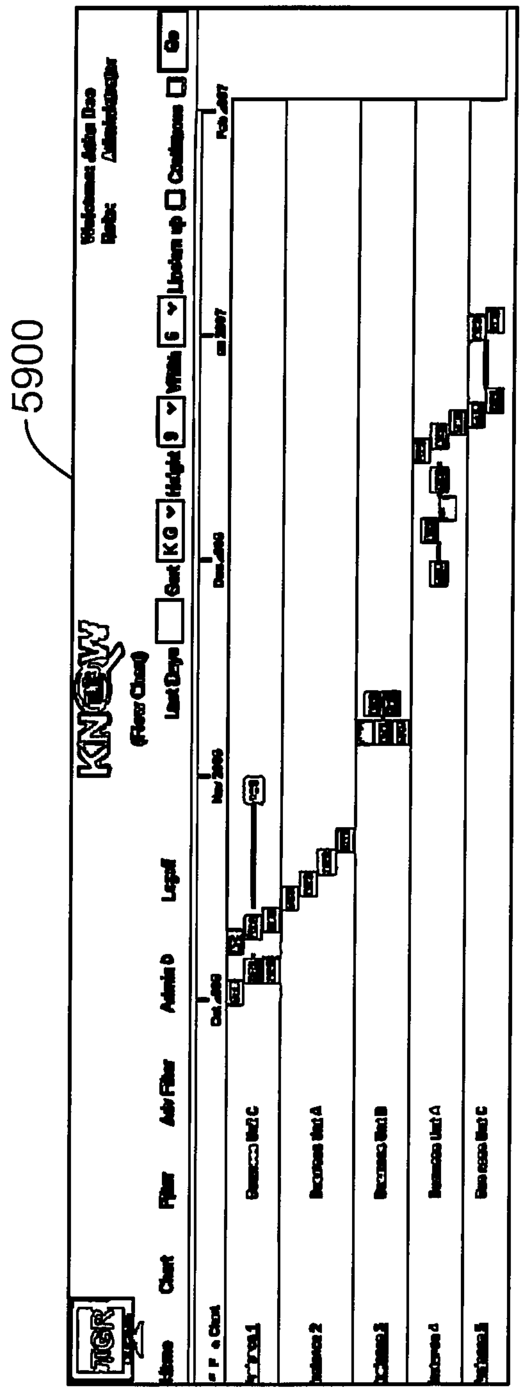
FIG. 59 shows a screen shot of a chart screen configured with a new activity icon in the popup window of FIG. 57.

FIG. 59 shows a screen shot of the chart screen with a new activity icon (i.e. yellow AT5) added in FIG. 58 and indicated generally by reference 5900.

Figure 60:
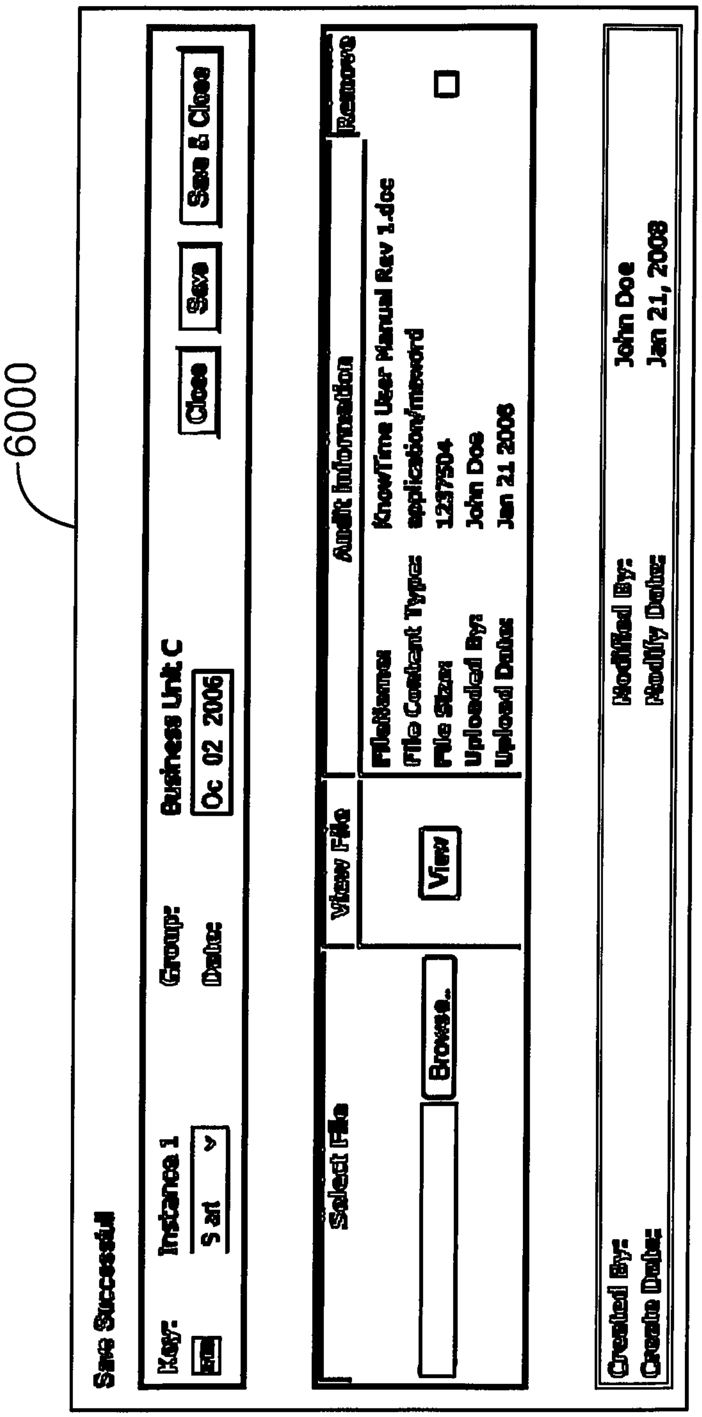
FIG. 60 shows a screen shot of a file upload screen according to an embodiment of the invention.

FIG. 60 shows a File Upload screen 6000, which is displayed in response to the File Upload button 5414 being clicked in the Popup window 5410 (FIG. 55). The Browse button lets users browse to a file. Clicking the Save button uploads the file to a location on a web server and saves the path and filename in the database 700 (FIG. 7). For the example shown in FIG. 60, the save button was clicked and the file information is displayed in the Audit column.

Figure 61:
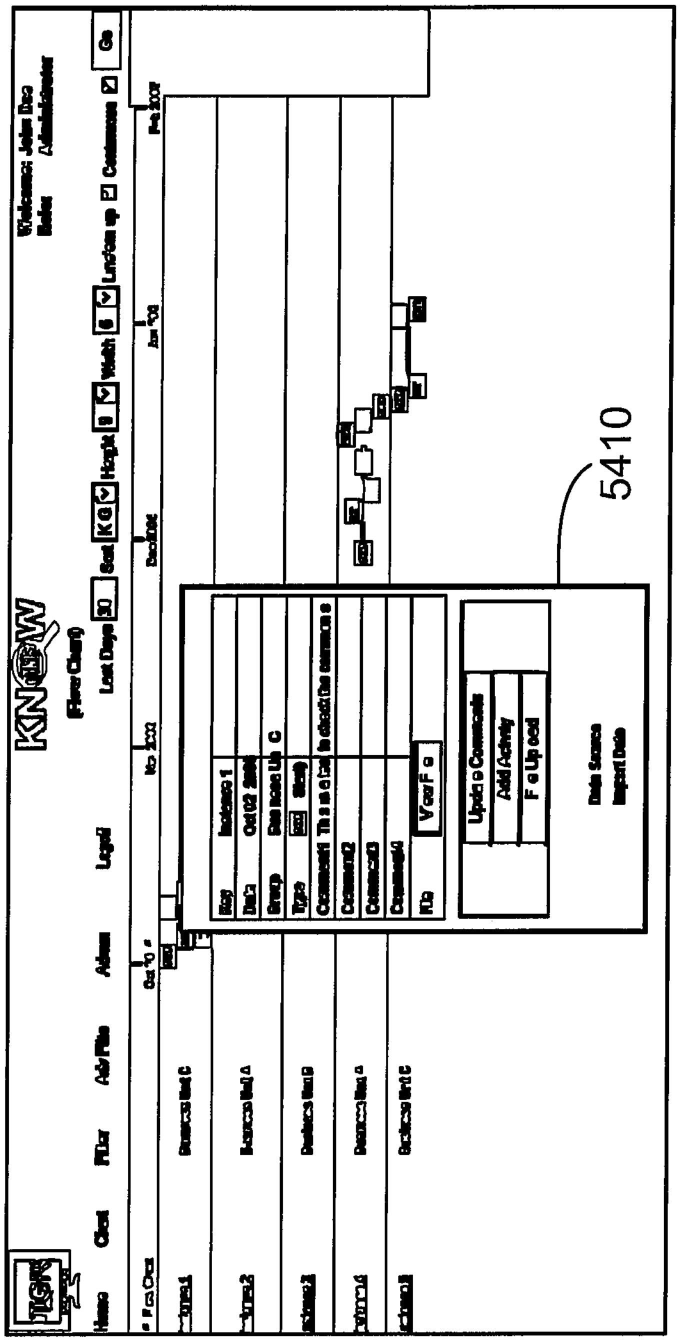
FIG. 61 shows a screen shot of a chart screen with a popup window configured in response to a file upload.
Figure 62:
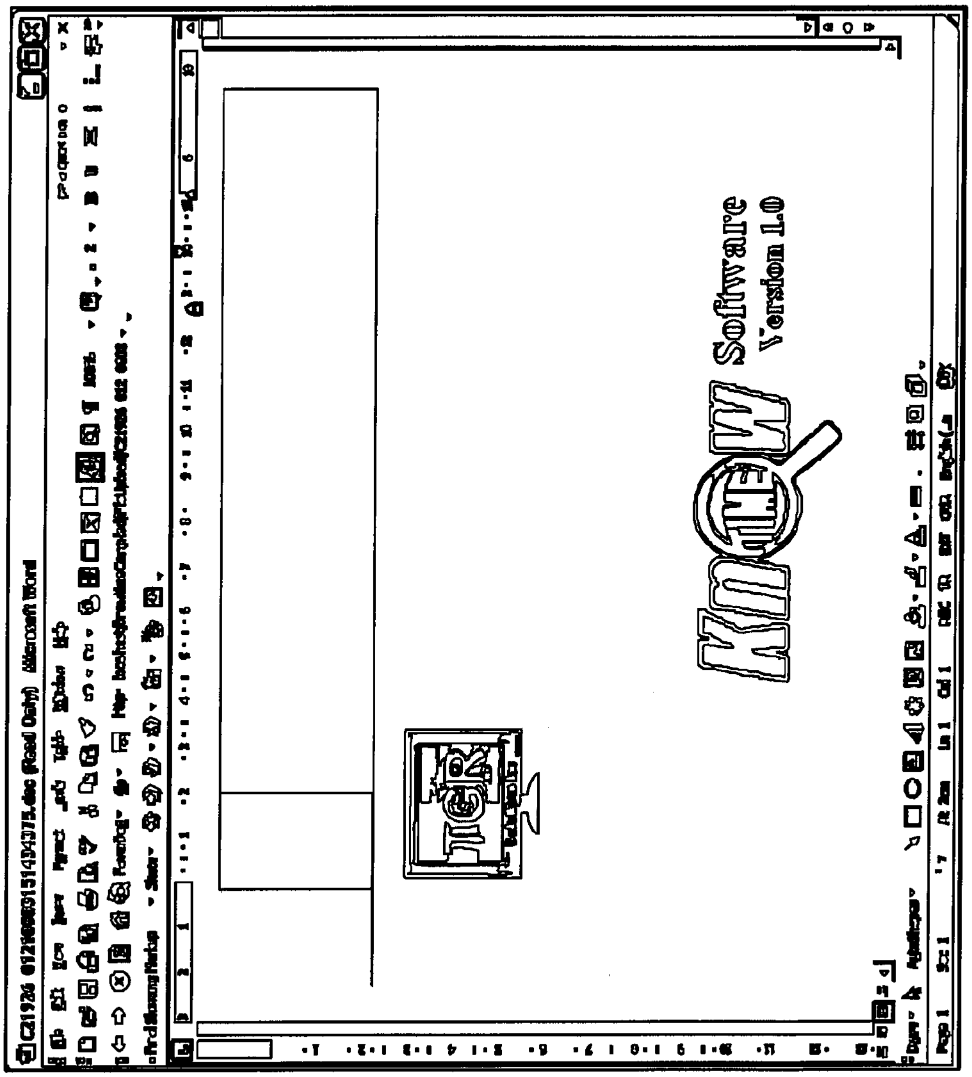
FIG. 62 shows a screen shot of a screen generated in response to the "View File" button being clicked in the popup window of FIG. 61.

FIG. 61 shows the Popup window 5410 configured with a "View File" button in the Header 5412. FIG. 62 shows an Uploaded file screen which is displayed in response to the "View File" button being clicked. In FIG. 62, the uploaded file comprises a Microsoft word document, KnowTime User Manual. The Popup window 5410 in FIG. 63 shows the "Activity Data" field 5416 and the "Audit Data" field 5418 displaying associated data, i.e. after a data load.

Figure 63A:
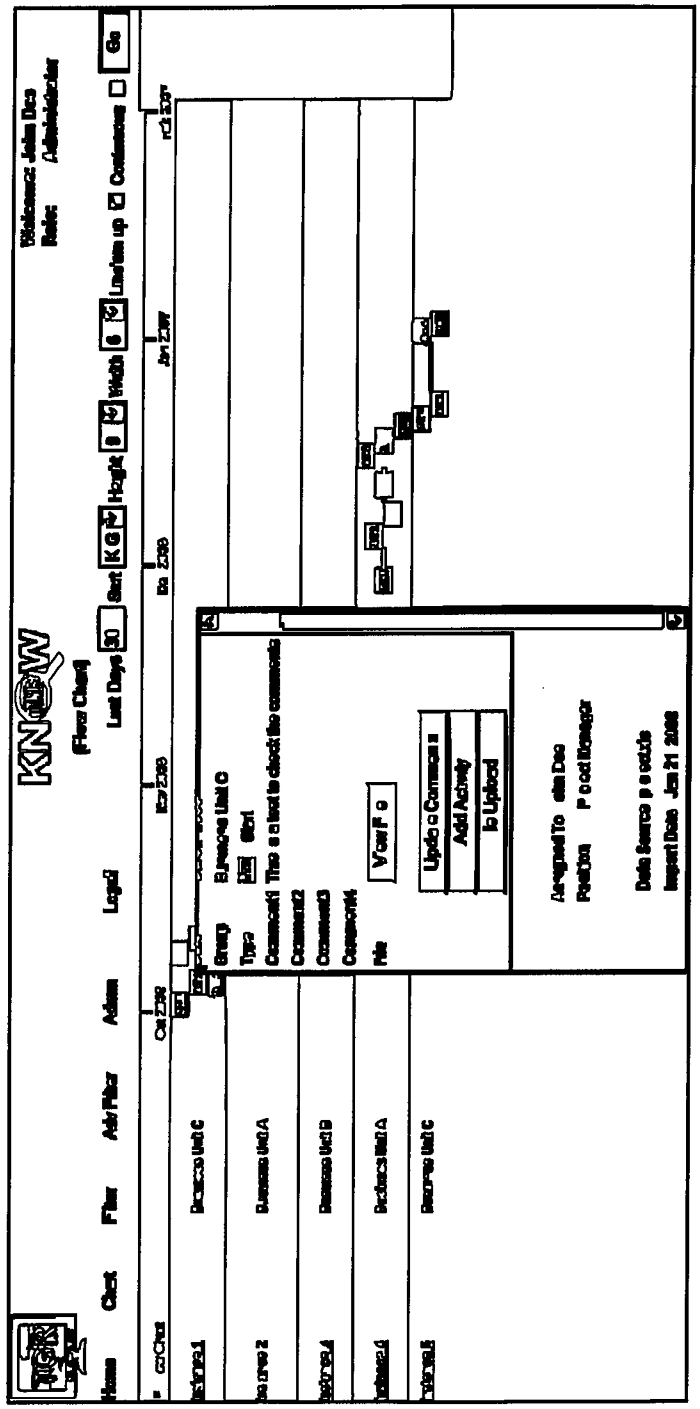
FIG. 63(a) shows a screen shot of the popup window of FIG. 61 configured in response to a data load operation.
Figure 63B:
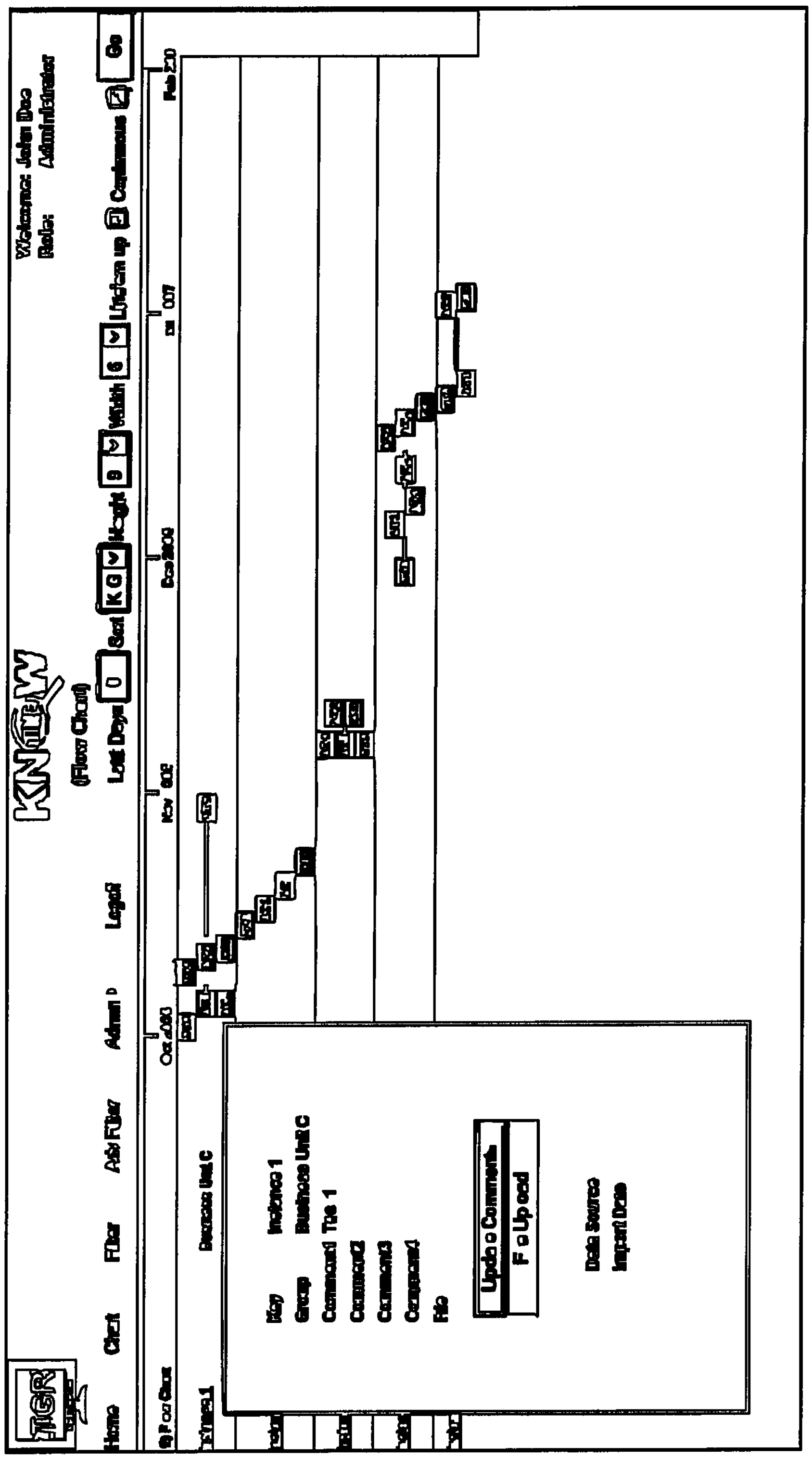
FIG. 63(b) shows a screen shot of a popup window configured in response to clicking of an instance key.

Reference is made back to FIG. 1. According to an embodiment, the functional block 142 creates the HTML, each HTML component that represents an "Activity Icon" gets an "Onclick=PopUp(X,Y)" event assigned to it. The X value is a flag that represents either Instance or Activity. The Y value comprises a unique database key that maps to more data that pertains to the data required for the popup (i.e. comments, File Upload information, Data for the data window, etc). When a user clicks on the Activity Icon, the "onclick event" executes and PopUp(X,Y) is executed. The PopUP(X,Y) logic is responsible for managing logic that performs the following operations:

retrieves data from the database based on the X,Y values.

creating an HTML string using the retrieved data loading the HTML string into a popup and activating the popup The X value is used to differentiate between instance and activity because each HTML key component also has an "Onclick=PopUp(X,Y)" event assigned to it and clicking on the Key value in the Chart will create a popup window, for example, as shown in FIG. 63(*b*). The Instance Key data is stored in the T_INSTANCE table 704 in FIG. 7 and Activity Data is stored in the T_ACTIVITY table 706 (FIG. 7).

According to another aspect, activity data for the Popup is retrieved from the DESCR columns in either the T_INSTANCE table or T_ACTIVITY table (FIG. 7). The DESCR columns comprise a large column configured to store large amounts of data, including data structures such as XML and/or preformatted HTML. This provides the capability to configure each Popup data area on its own or uniquely According to another aspect, when a file is uploaded, the file is copied to the web server and saved on the file system. A path to the uploaded filename is saved in the database. (column FILE_UPLOAD1 in both T_ACTIVITY and T_INSTANCE). When a user clicks "View File" the browser knows what file to load because the view file button contains information that points to the file. The browser then downloads the file and opens the file with its correct application (uses the file extension to determine what program opens the file). A user that does not have Microsoft Excel (or some compatible program) would not be able to view an XLS file. In another embodiment of this application, the uploaded files could be saved in the database, document control system, or the like.

Reference is next made to FIGS. 64 to 73. As described above, if "Enable Last Days" is not checked then the "last days" value on the quick menu is disabled and the last days value is not used to filter the chart data. If the "Enable Last Days" check box is checked, then the "last days" text box on the quick menu 640 (FIG. 6) is enabled and data entry into this box is permitted. If the "Last Days" textbox contains a non-zero positive number, clicking the go button will return all Instance timelines that have at least one activity between the current date and the given number of days before the current date. (i.e. where current date is the system date when the "go" button was clicked). If the number is a non-zero negative number, then the chart will display all timelines that have at least one activity that occurs between the current date and the entered number of days in the future. It will be appreciated that a negative number is useful for finding future activities like expiry dates, etc)

Figure 64A:
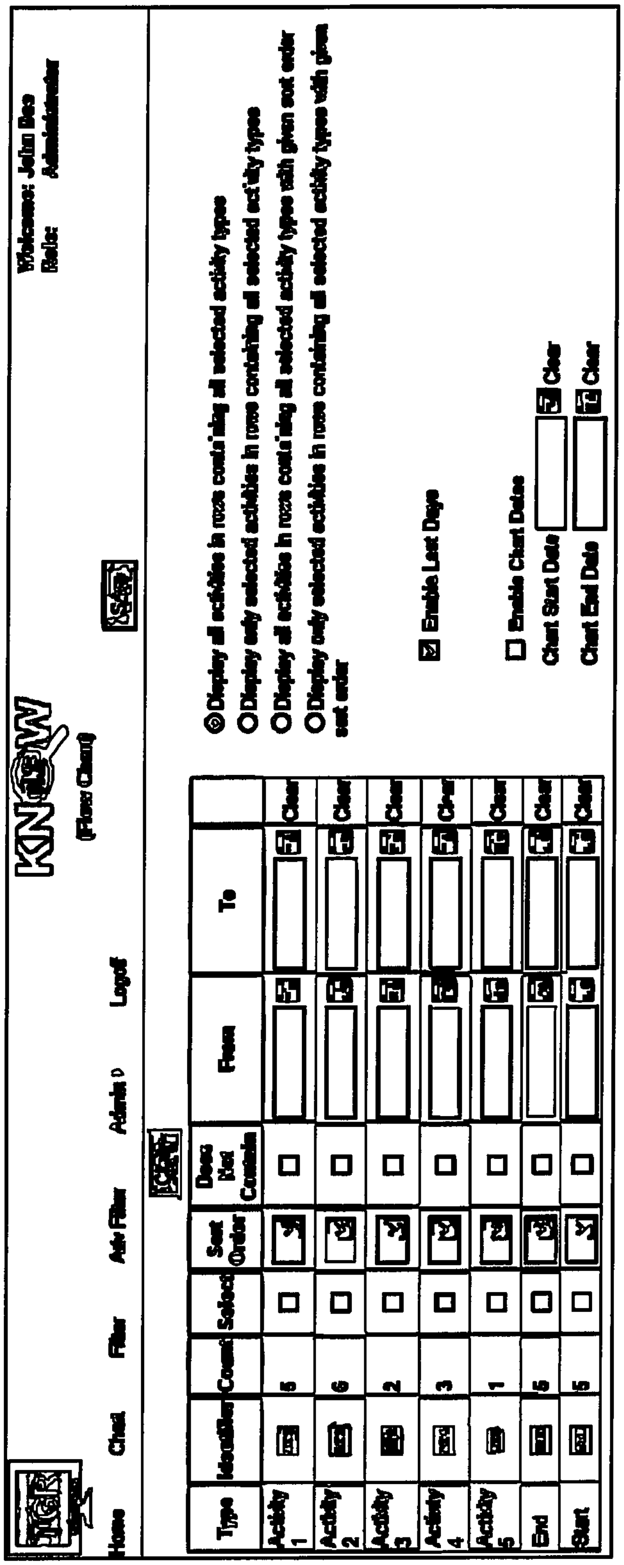
FIG. 64(a) shows a screen shot of an Advance Filter screen according to an embodiment of the invention.
Figure 64B:
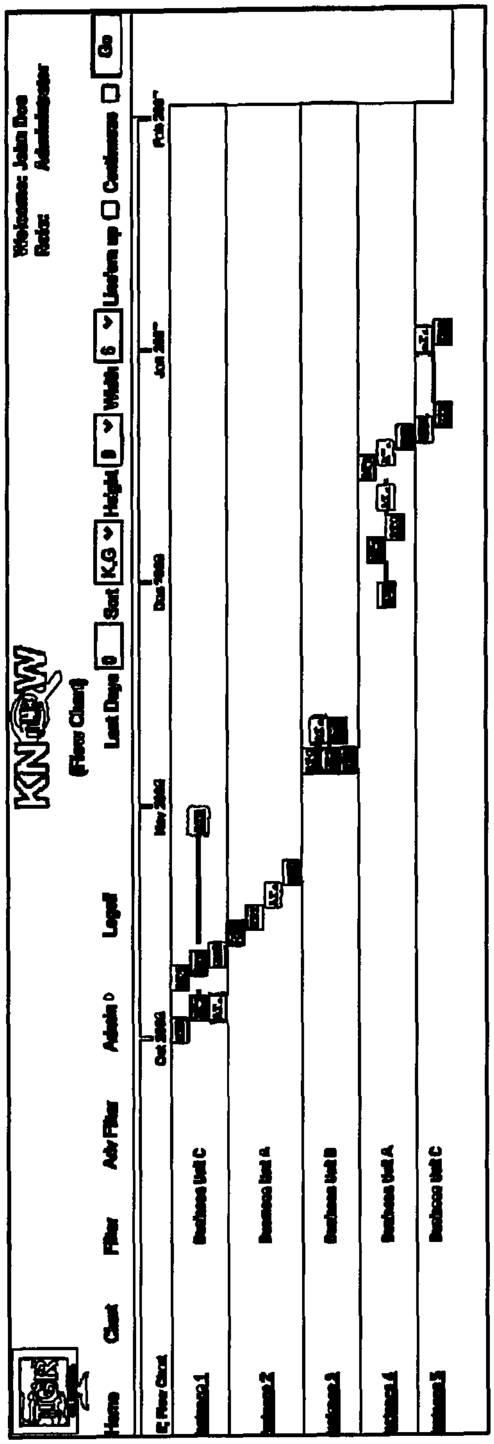
FIG. 64(b) shows a screen shot of a chart screen generated in response to the settings of Advance Filter screen of FIG. 64(a)
Figure 65:
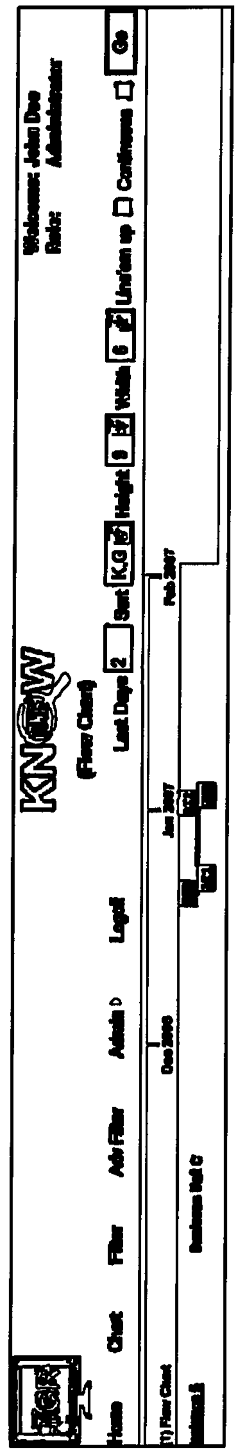
FIG. 65 shows a screen shot of the chart screen of FIG. 64(b) configured with a "Last Days Value"

FIG. 64(*a*) shows a screen shot of the Advance Filter screen with the "Enable Last Days" function selected. FIG. 64(*b*) shows a screen where "Enable Last Days" has been checked in Advance Filter screen and "Last Days" value set to 0. Setting this to 0 means the last days logic is not used, so all Instances are displayed in the Chart. It should be noted that the last two activities (AT2 and END) in Instance 5 have dates Jan. 2, 2007 and Jan. 3, 2007 respectively. FIG. 65 shows a screen shot with the system date set to Jan. 5, 2007 and the Last Days Value is 2. Therefore, clicking "go" returns instances that have an activity between Jan. 3, 2007 and Jan. 5, 2007. Only Instance 5 fits into this category and is the only instance displayed in the chart.

According to another aspect, the Enable Chart Dates function allows a user to choose the chart start date and chart end date. If these values are not selected or "enable chart dates" is not checked, then the chart start and end dates are dynamically configured based on the data to be displayed. If the "Enabled Chart Dates" is checked then the logic is configured to function as follows:

- if Chart Start Date textbox contains a date, then use this date as the chart start date, otherwise, use the minimum date in the data set;
- if the chart end date textbox contains a date, then use this date as the chart end date, otherwise, use the maximum date in the data set According to another aspect, the chart starts at the first day of the month of the selected chart start date and the chart ends at the first day of the following month of the selected end date.

Figure 66:
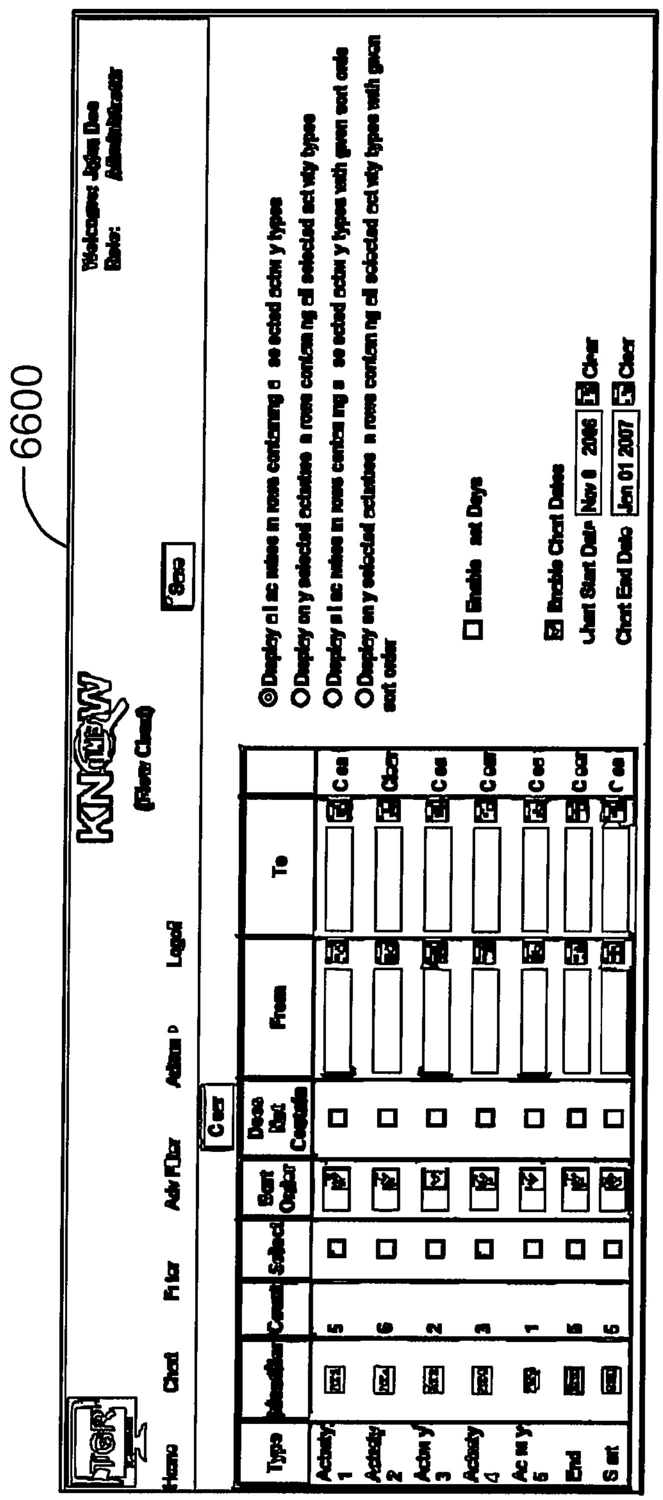
FIG. 66 shows a screen shot of the Advance Filter screen being configured for chart start and end dates.
Figure 67:
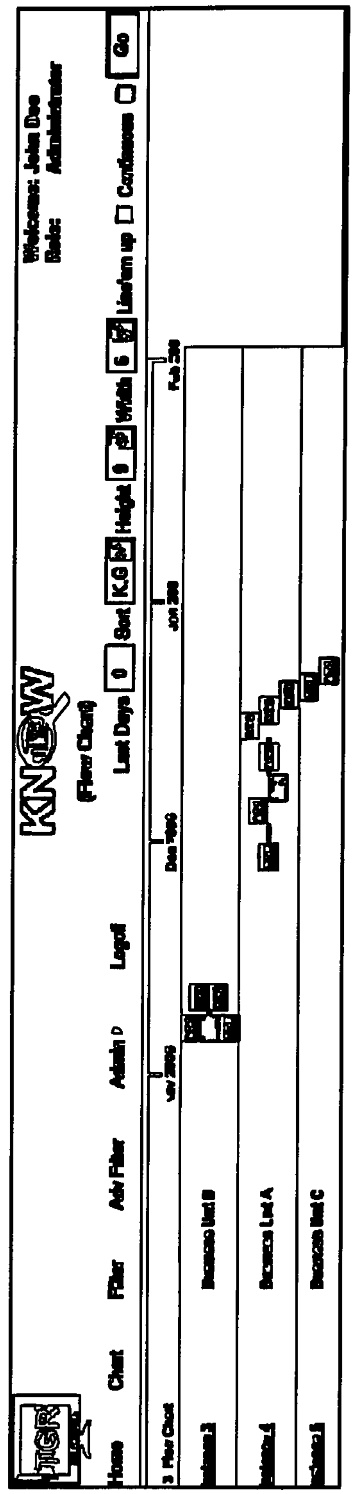
FIG. 67 shows a screen shot of a chart screen generated in response to the user entered dates in the Advance Filter screen of FIG. 66.
Figure 68:
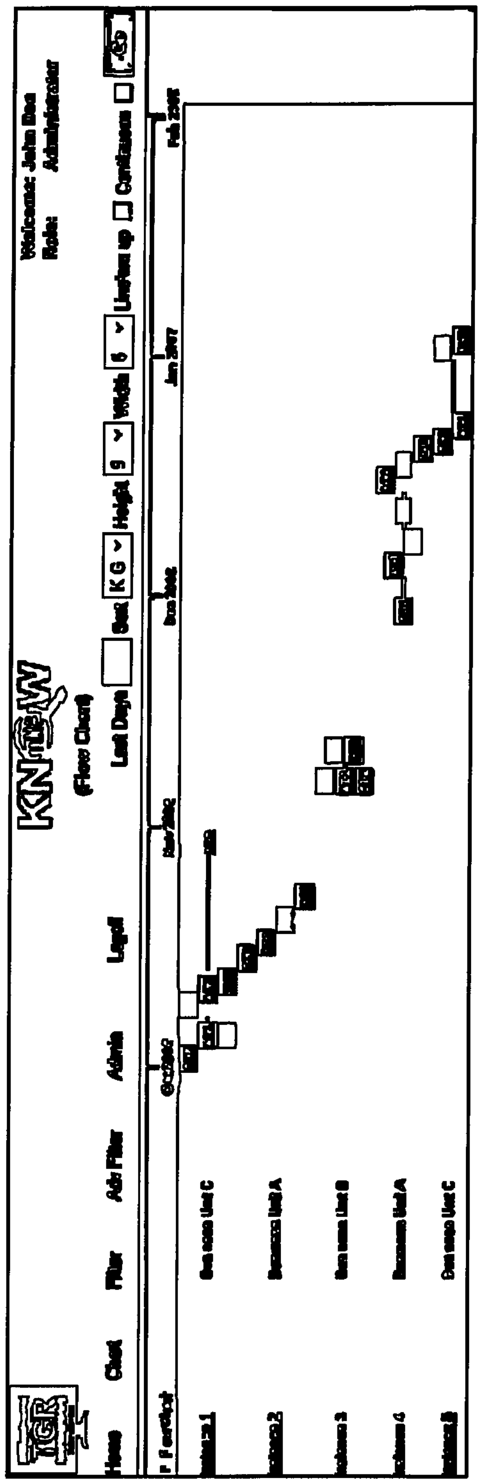
FIG. 68 shows a screen shot of a chart screen generated with no filters being applied or selected.
Figure 69:
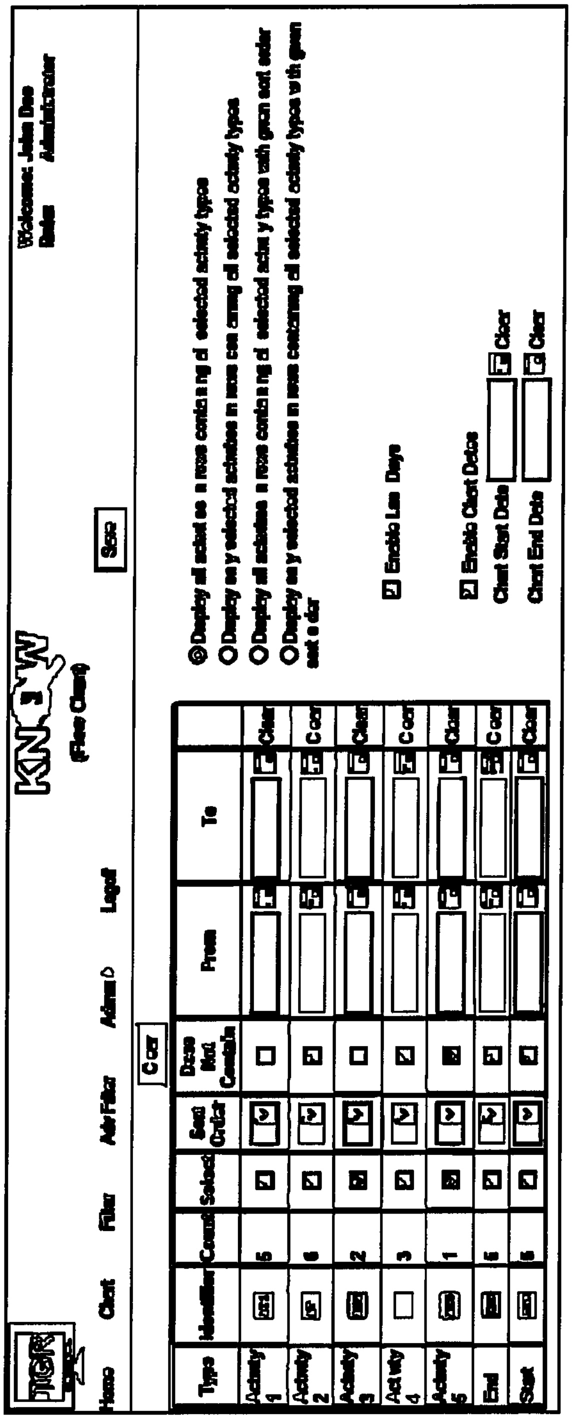
FIG. 69 shows a screen shot of an Advance Filter screen with user settings for "Activity 3" and "Activity 5"
Figure 70:
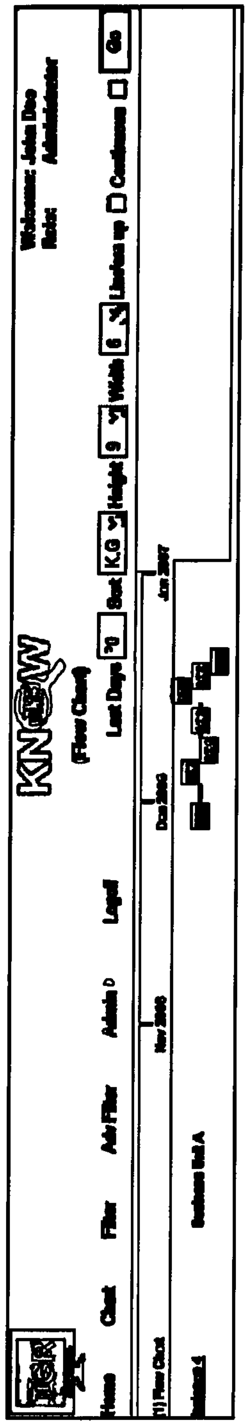
FIG. 70 shows a screen shot of a chart screen configured in accordance with the settings of FIG. 69.

Reference is next made to FIG. 66 which shows a Chart screen 6600 with the Chart start date enabled and the Chart Start and end dates selected. FIG. 67 shows the Chart screen configured according to the dates entered as depicted in FIG. 66. FIG. 68 shows the chart screen with no filters applied. FIG. 69 shows the Advanced Filter screen with Activity 3 selected, Activity 5 selected with the "Does Not Contain" column selected. This configuration represents a situation where the user wants to see all instances that have an activity 3, but not an Activity 5. FIG. 70 shows a Chart screen generated according to the settings applied to the Filter screen in FIG. 69.

Figure 71:
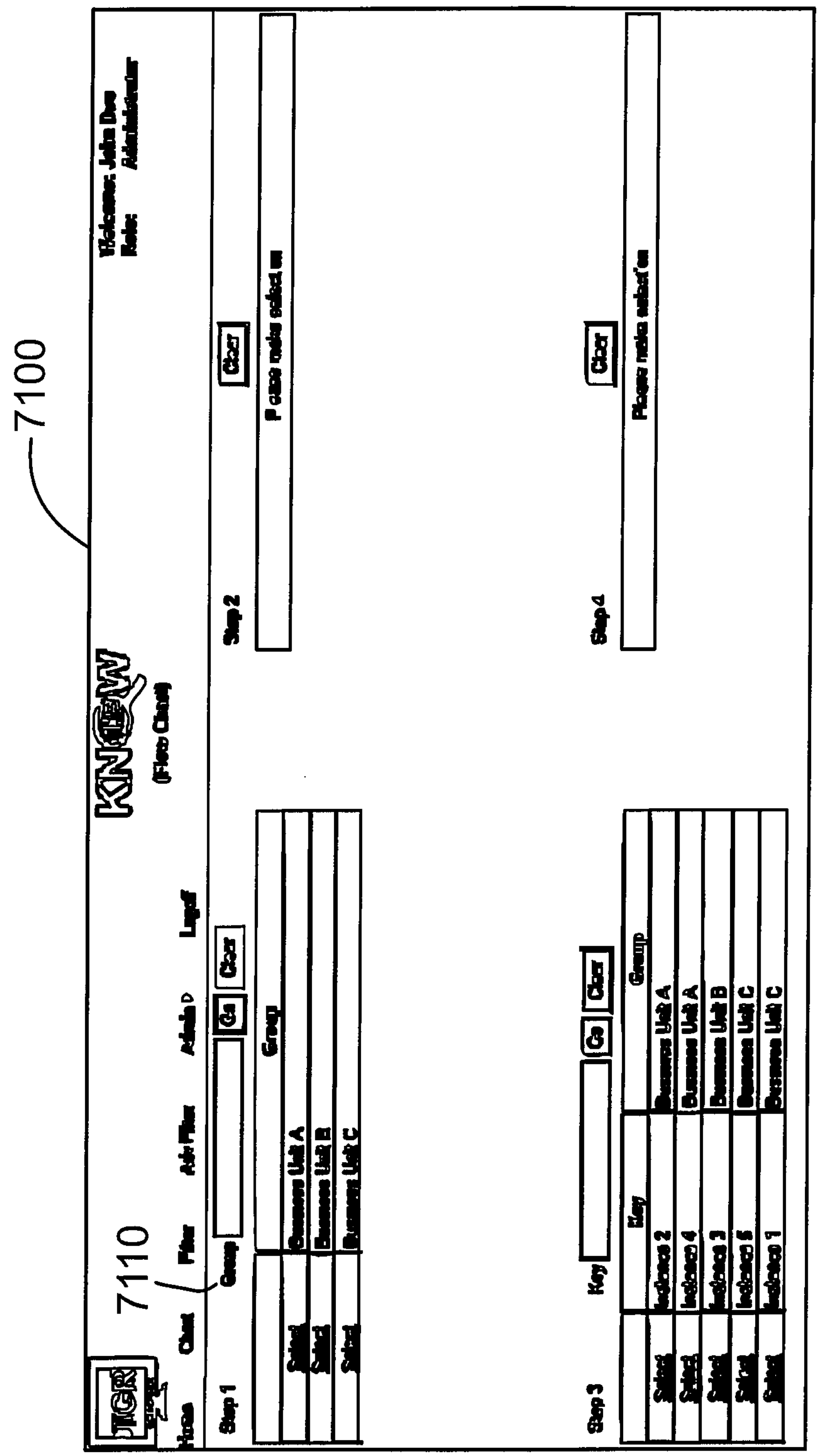
FIG. 71 shows a screen shot of a Filter screen with exemplary user settings.
Figure 72:
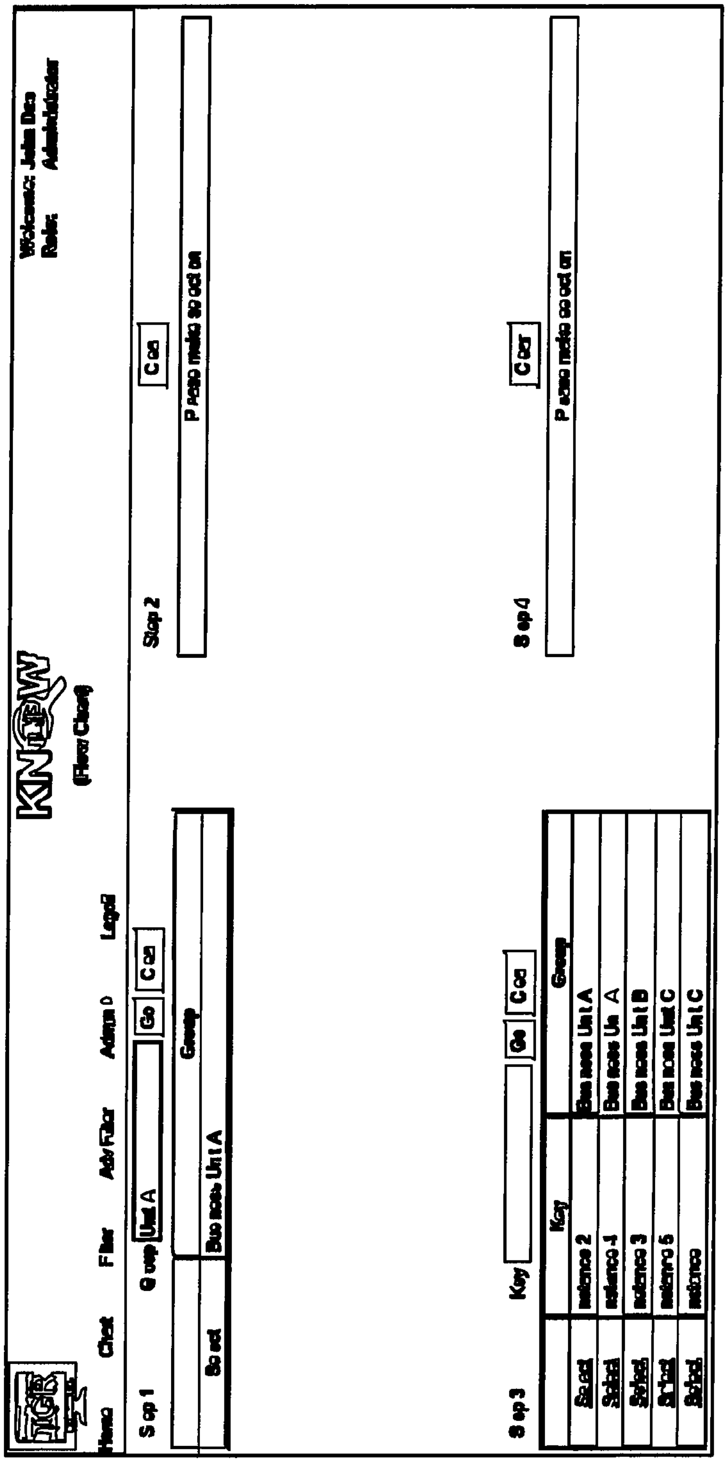
FIG. 72 shows a screen shot of the Filter screen of FIG. 71 with the search feature.

Reference is next made to FIG. 71, which shows a screen shot 7100 of the Filter screen configured with the Frame in step 1 with a search feature indicated generally by reference 7110. The operation of the search feature 7110 is illustrated further in FIG. 72.

Reference is made back to FIG. 7 and the staging table. The staging table is configured for importing data into the system. Data is loaded into this table and logic (in the current application it is a SQL server stored procedure) executed to move this data into the tables used by the software embodied in the system 100. The staging table is not utilized by the system 100, it is used to simplify data loading. According to an embodiment, data is loaded into the T_ACTIVITY table 706 (FIG. 7) as follows:

- via the Activity screen (accessed by clicking a link on the "Instance Key screen"
- by clicking Add Activity from the Activity popup on the Chart screen
- by using the staging table.

Figure 73:
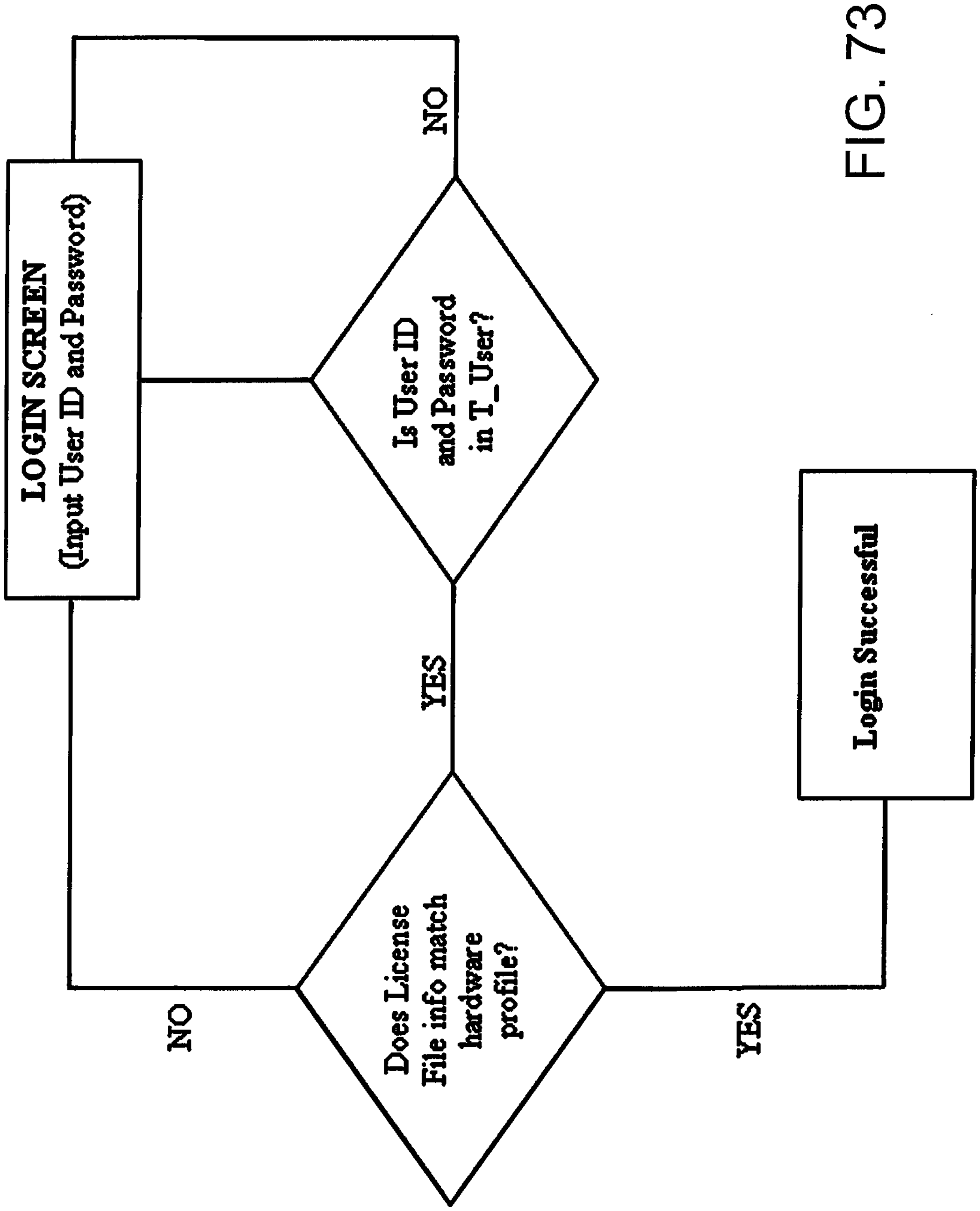
FIG. 73 shows in flowchart form a process for access logic to KnowTime.

Reference is next made to FIG. 73 which shows in flowchart form a process for accessing the system application. As shown, a user is validated against the T_USER table 710 (FIG. 7) and the License file (located on file system) must contain information about the hardware on which it is running. The license file also contains information displayed on the screen when you click the "About" menu option. According to an embodiment, data in the License file is encrypted.

Figure 74:
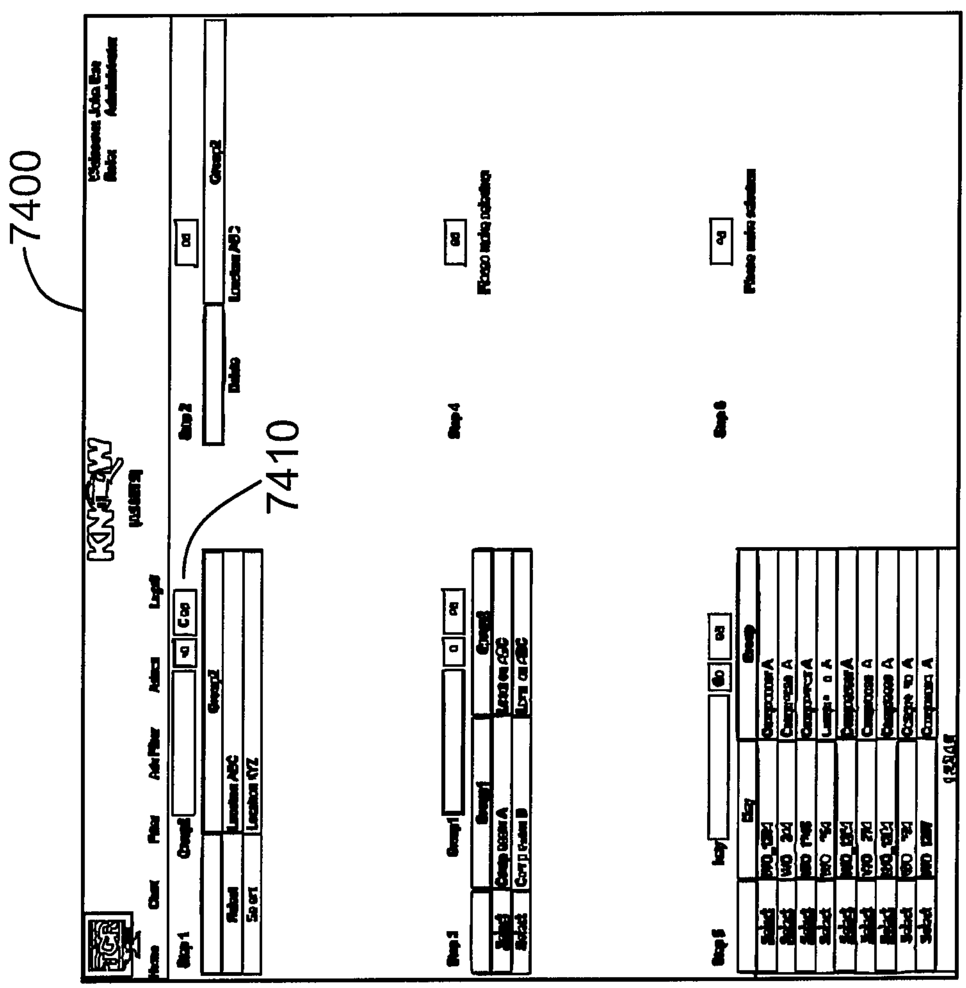
FIG. 74 shows a screen shot of a Filter screen according to an embodiment of the invention.

Reference is next made to FIG. 74, which shows a Filter screen according to another embodiment of the invention and indicated generally by reference 7400. As shown, the Filter screen 7400 includes a "Group2" frame indicated by reference 7410 in the "Step 1" frame. As depicted in FIG. 74, the Group2 frame 7410 is configured to display all Group2's for the "Assets" business process. In response to the selection of a Group2 member from the "Step 1" frame, the selected group is placed in the "Step 2" frame, and in "Step 3" the Group1 frame is filtered to display the Group1's that are assigned to Group2. Furthermore, the selection of a Group1 member in "Step 3" results in the Group1 being added to the frame in "Step 4" and all instances assigned to Group1 being displayed in the frame for "Step 5" as shown in FIG. 74. The selection of instances from "Step 5" results in the selected instances being placed in "Step 6".

Figure 75:
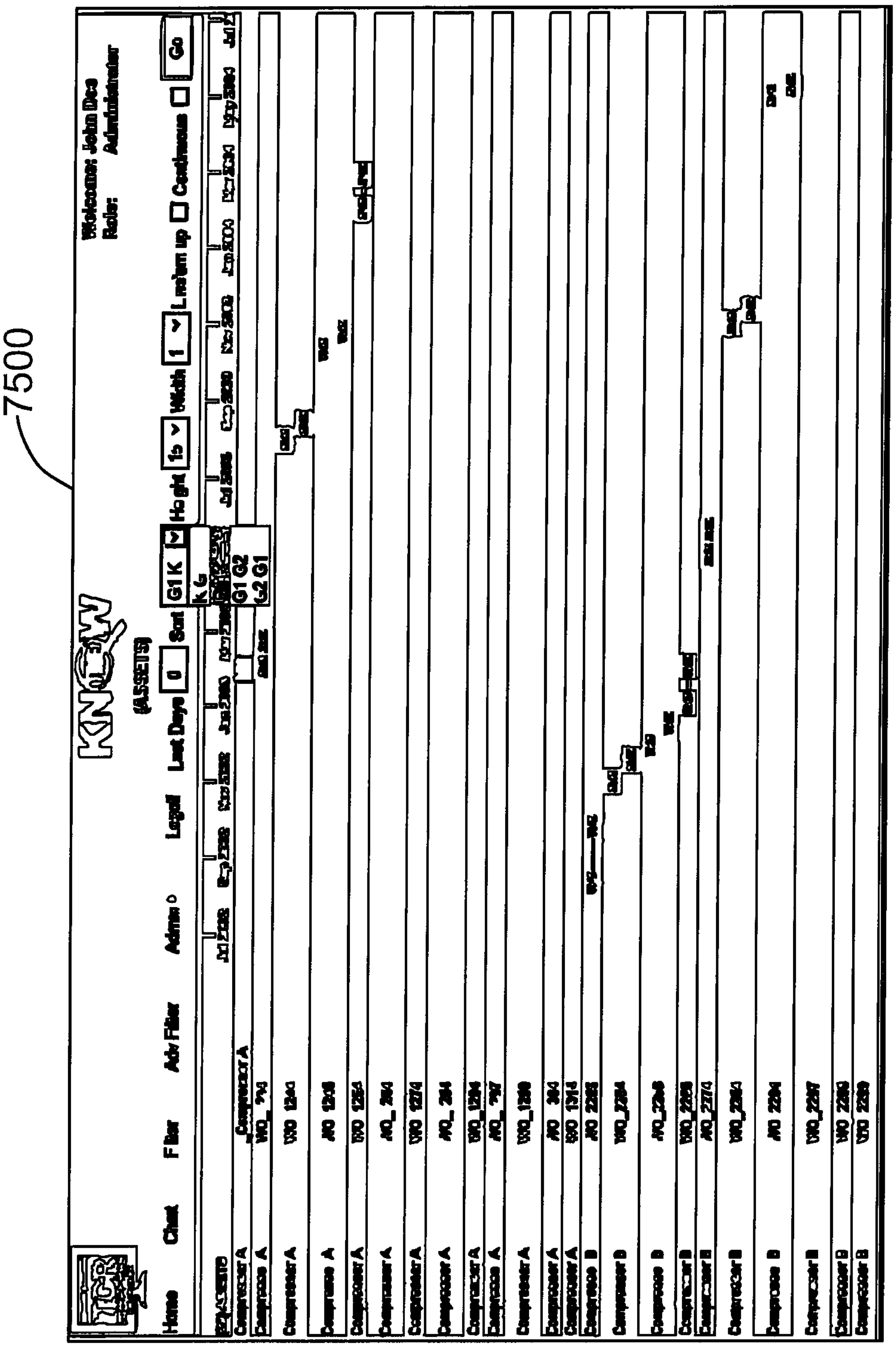
FIG. 75 shows a screen shot of a chart screen configured according to the settings of the Filter screen of FIG. 74.

According to an embodiment, the processing logic for the Filter screen 7400 is configured to execute an SQL algorithm, which includes the following logic operations:

- if data exists in Step 6 then filter by data in Step 6
- else, if no data in Step 6, and there is data in Step 4 then filter by data in Step 4
- else if no data in Step 6 and no data in Step 4, and there is data in Step 2 then filter by data in Step 2
- else no filter operation is applied or executed Reference is next made to FIG. 75, which shows a Chart screen 7500 generated for an equipment time line for a "Compressor A" and a "Compressor B" and comprises several work order timelines for Compressor A and several work order timelines for Compressor B. The Chart screen 7500 is configured according to a sort order "G1, K". As shown the "Sort" order box includes four selections:

- "K, G1"—which provides viewing of data sorted and grouped by the KEY,Group1;
- "G1, K"—which provides viewing of data sorted and grouped by Group1, Key;
- "G1,G2"—which provides viewing of data sorted and grouped by Group1,Group2;
- "G2, G1"—which provides viewing of data sorted and grouped by Group2, Group 1

It will be appreciated that "Group2", "Group1" and the "Key" are associated with the frames in the Filter screen 7400 as shown in FIG. 74.

Figure 76:
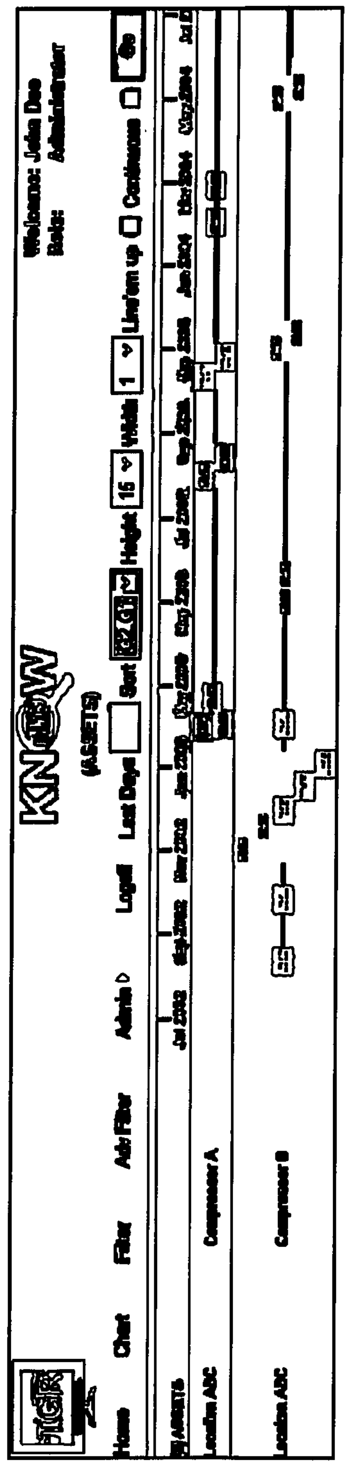
FIG. 76 shows a screen shot of the chart screen of FIG. 75 generated according to another sort setting.

Reference is next made to FIG. 76, which shows the Chart screen of FIG. 75 configured according a time-line sorted by "G2, G1" and indicated generally by reference 7600. As shown in FIG. 76, the activities for each of the compressors A and B are now displayed on compressor timelines.

Figure 77:
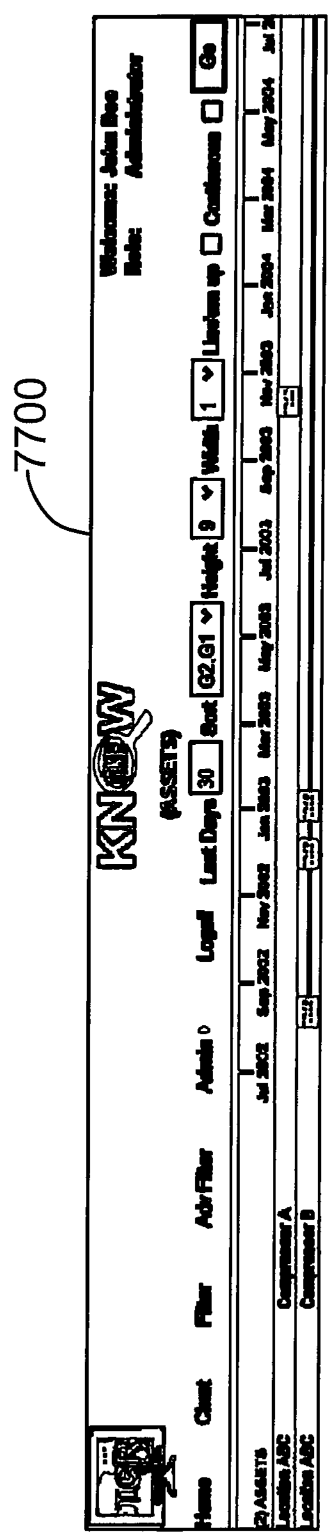
FIG. 77 shows a screen shot of the chart screen of FIG. 76 generated according to another configuration in the Advance Filter screen.

Reference is next made to FIG. 77, which shows a Chart screen 7700 generated according to a filter configuration that is set to show "Unscheduled Maintenance Start" dates or UMS dates. As shown in FIG. 77, the Chart screen 7700 shows the frequency of unscheduled work order start dates and the duration between the start dates for each of the compressors A and B.

Figure 78:
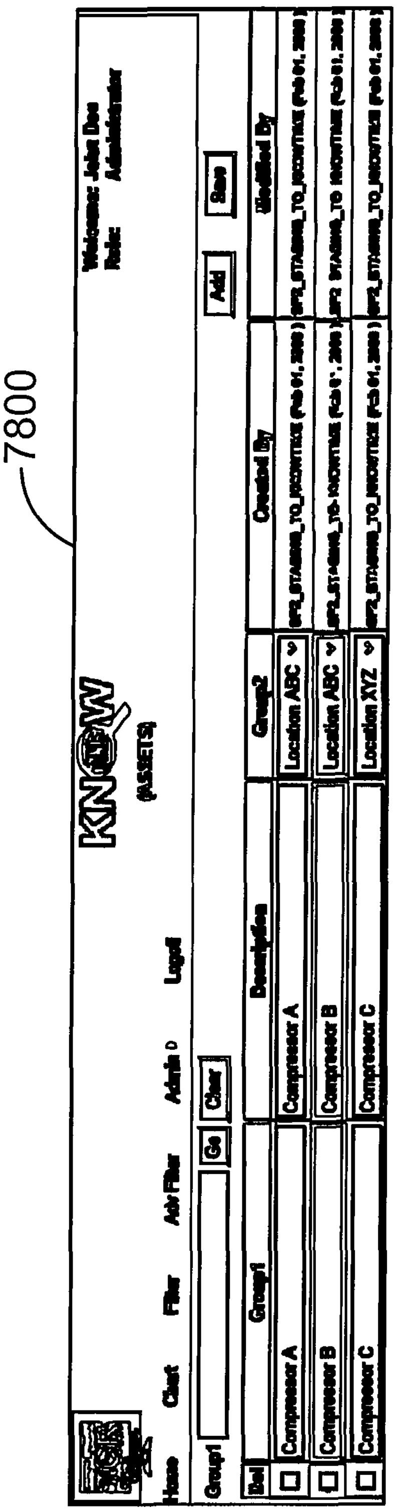
FIG. 78 shows a screen shot of a Group1 screen generated according to another configuration.

Reference is next made to FIG. 78, which shows a Group screen according to an embodiment and indicated generally by reference 7800. In the Group screen 7800 as shown in FIG. 78, the Group2's are assigned to the Group1's (whereas initially the Group2's were assigned to the instance).

Figure 79:
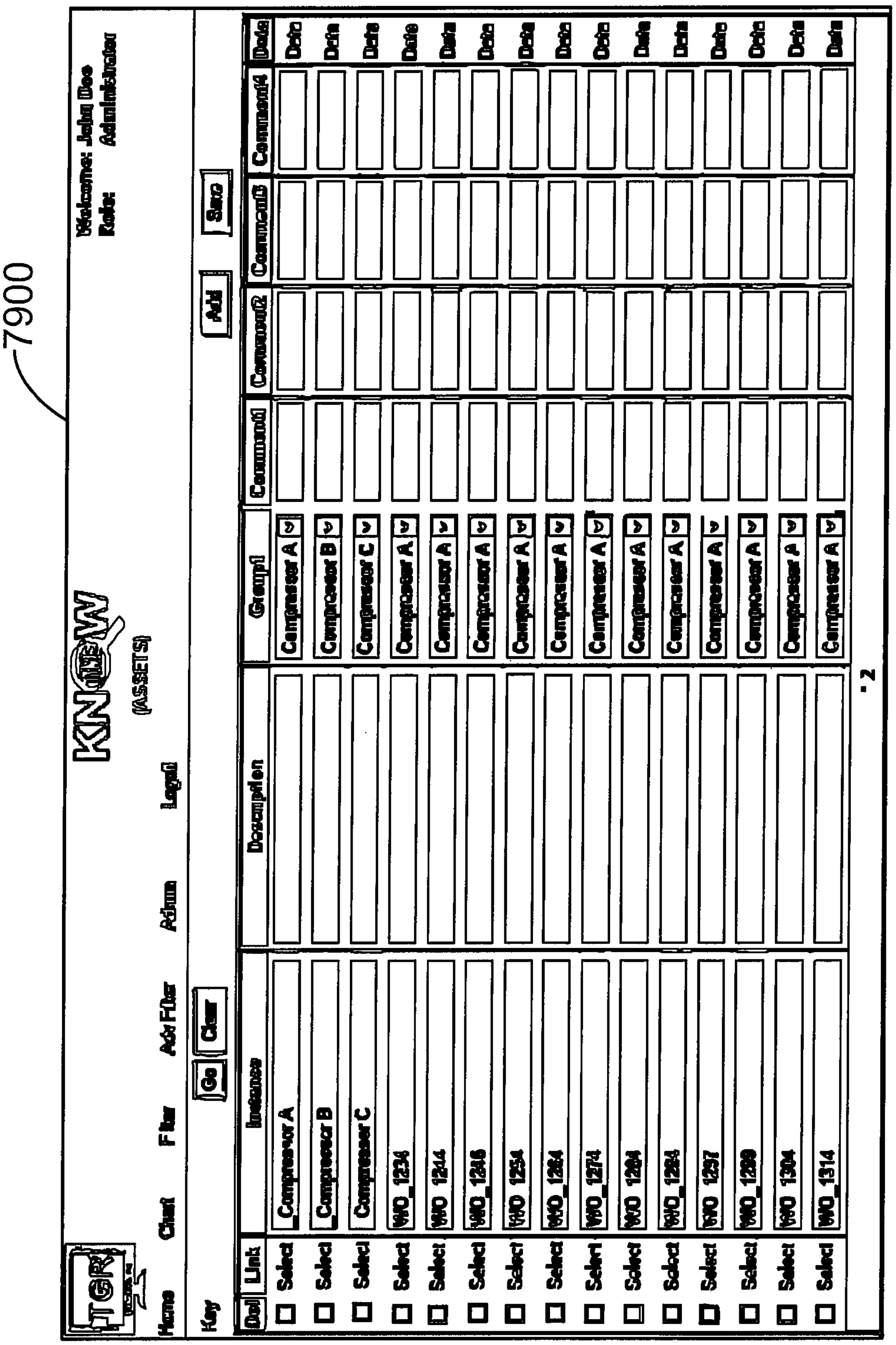
FIG. 79 shows a screen shot of a new instance screen generated according to an embodiment.

Reference is next made to FIG. 79, which shows an Instance (or Key) screen according to an embodiment and indicated generally by reference 7900. In the Instance screen 7900 as shown in FIG. 79, the Group1's are assigned to the instance (whereas initially the screen included Group1's, Group2's, Group3's and Group4's).

While the embodiments of the methods and system have been described in the context of a stand-alone computer program or tool, the system may be implemented as a plug-in or module for a workflow engine with an interface to the workflow-executed activity data. Using such a configuration, the analysis and functionality described above is made available in the workflow engine environment.

The functionality and features associated with the system and method as described above and in accordance with the embodiments may be implemented in the form of one of more software objects, processes, functions, components, or computer programs or program modules. Further, at least some or all of the software objects, processes, functions, components or modules can be hard-coded into processing units and/or read only memories or other non-volatile storage media in the computer system and/or other components or modules depicted in the drawings. The attach Appendix provides exemplary pseudo code listings for some of the processes and functions associated with the system. The specific implementation details of the software objects, processes, functions and/or program modules will be within the understanding and knowledge of one skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive.

What is claimed is:

1. A computer system for displaying a business process comprising a plurality of workflow events, said system comprising:

an interface module comprising a graphical interface configured to be responsive to user actions for inputting and managing data, wherein said data comprises data associated with each of the plurality of workflow events, and said data including a workflow event date for each the plurality of workflow events;

a processor, implemented at least in part in hardware, configured for processing said data and generating a graphical representation for the user comprising a timeline and a graphical element for each of the plurality of workflow events and said processor being configured to generate a single activity date for each of said graphical elements based on said workflow event date said processor being configured to display each of said graphical elements on said timeline based on said activity date for each of said graphical elements; and wherein said processor is configured to be responsive to one or more parameters specified by the user for individually arranging on said timeline one or more of said graphical elements for each of the plurality of workflow events based on said activity date for each of said graphical elements corresponding to the plurality of workflow events, and wherein individually arranging comprises arranging the one or more of said graphical elements based on said one or more specified parameters and without regard to any relationship between the one or more of the plurality of workflow events.

2. The system as claimed in claim 1, wherein said activity date comprises one of an activity start time, an activity status time or an activity end time.

3. The system as claimed in claim 1, wherein said graphical element for each of the workflow events comprises an activity icon, and said processor is configured to expand said timeline and align two or more overlapping graphical elements in a non-overlapping vertical display configuration on said timeline.

4. The system as claimed in claim 3, wherein one or more of said activity icons are configured to be responsive to an input from the user and present additional information for the activity associated with the activity icon.

5. The system as claimed in claim 1, wherein the business process comprises a plurality of business processes and wherein said processor is configured to generate a timeline for each of said business processes and individually arrange said graphical element for each of the plurality of workflow events associated with said business process based on the associated activity date for each of the plurality of workflow events, and said processor being configured to generate a graphical representation comprising said timelines for each of said business processes, and said timelines being arranged in relation to a graph start time.

6. The system as claimed in claim 5, wherein said processor is configured to align each of said timelines to said graph start time, and generate a graphical representation for comparing durations of two or more of the plurality of workflow events.

7. The system as claimed in claim 6, wherein the two or more of said plurality of workflow events belong to two or more of said business processes.

8. The system as claimed in claim 6, wherein said processor is configured to align each of said timelines to said graph start time, and generate a graphical representation for comparing durations of one or more of said plurality of activities belonging to one or more of said instances.

9. The system as claimed in claim 1, wherein the business process comprises a plurality of instances, and each of said instances comprises a plurality of the workflow events wherein said plurality of workflow events are the same for each of said instances, and said processor is configured to process said data and generate a graphical representation for each of said instances comprising a timeline and a graphical element for each of the workflow events associated with said instance, and said processor is further configured to individually arrange each of said graphical elements on said timeline for each of said instances according to the associated activity date for each of the workflow events.

10. The system as claimed in claim 9, wherein the processor is configured to generate a comparative display comprising the timelines for one or more of said instances for the business process.

11. A computer-implemented method for analyzing a plurality of workflow events, said computer-implemented method comprising the steps of:

inputting data comprising data associated with the plurality of workflow events, and said data including a workflow event date for each the plurality of workflow events;

processing said data and generating a graphical representation comprising a graphical timeline and a graphical element for each of the plurality of workflow events and generating a single activity date for each of said graphical elements based on said workflow event date;

independently arranging each of said graphical elements on said graphical timeline in chronological order based on said activity date for each of the graphical elements, and wherein independently arranging comprises arranging one or more of said graphical elements without regard to any relationship between the one or more of the plurality of workflow events; and displaying a time-based graphical representation comprising said graphical elements and said graphical timeline.

12. The computer-implemented method as claimed in claim 11, wherein said graphical element for each of the activities comprises an activity icon, and further including the step of expanding said graphical timeline and aligning two or more overlapping graphical elements in a non-overlapping vertical display configuration on said graphical timeline.

13. The computer-implemented method as claimed in claim 12, wherein said activity date comprises one of an activity start time, an activity status time or an activity end time.

14. A computer-implemented method for generating a time-based graphical representation of a business process, said computer-implemented method comprising the steps of:

inputting data comprising data associated with the business process;

processing said data and determining one or more instances associated with the business process, and each of said one or more instances comprising a subset of a plurality of the activities;

generating a graphical representation for each of said instances comprising a timeline and a graphical element for each of the activities associated with said instance, and wherein said graphical element for each of the activities comprises an activity date;

arranging each of said graphical elements for each of said instances on said associated timeline independently of each other and in a chronological order based on said activity date for each of the activities, and without regard to any relationship between said plurality of the activities; and arranging each of said timelines into a display to generate the time-based graphical representation of the business process.

15. The computer-implemented method as claimed in claim 14, further including a graph start time, and said timelines being arranged in relation to said graph start time.

16. The computer-implemented method as claimed in claim 15, further including the step of aligning each of said timelines to said graph start time, and the time-based graphical representation comprising a comparative representation for comparing durations of one or more of said plurality of activities belonging to two or more of said instances belong to the business process.

17. The computer-implemented method as recited in claim 16, wherein said graphical element for each of the activities comprises an activity icon, and further including the step of expanding said timeline and aligning two or more overlapping graphical elements in a non-overlapping vertical display configuration on said timeline.

18. A computer program product for generating a time-based graphical representation of a business process, the business process comprising a plurality of activities, said computer program product comprising:

a non-transitory storage medium configured to store computer readable instructions;

said computer readable instructions including instructions for, inputting data comprising data associated with the plurality of activities;

processing said data and generating a graphical timeline associated with the business process and generating a graphical element for each of the activities and an activity date associated with each of the activities, wherein said activity date comprises a single date associated with a state of the activity;

independently arranging each of said graphical elements on said graphical timeline in a chronological order based on said activity date for each of the associated activities, and wherein individually arranging comprises arranging each of said graphical elements without regard to any relationship between the associated activities; and displaying the time-based graphical representation comprising said graphical elements and said graphical timeline.

19. The computer program product as claimed in claim 18, wherein said graphical element for each of the activities comprises an activity icon, and further including instructions for expanding said graphical timeline and aligning two or more overlapping graphical elements in a non-overlapping vertical display configuration on said graphical timeline.

20. The computer-implemented method as claimed in claim 19, wherein said graphical element for each of the activities comprises an activity icon, and said instructions for displaying the time-based graphical representation comprises displaying a plurality of icons comprising selected activities.

21. The computer-implemented method as claimed in claim 20, wherein said selected activities include activities yet to occur in time.

22. A computer system for generating a graphical representation for one or more business processes, each of the business processes comprising a plurality of activities, said system comprising:

an interface module comprising a graphical interface configured to be responsive to user actions for inputting data, wherein said data comprises data associated with the plurality of activities;

a processor, implemented at least in part in hardware, configured for processing said data and generating a graphical representation for the user, said graphical representation comprising a first graphical object, and a second graphical object, and said processor being configured to generate a timeline associated with the business process, and said processor being further configured to assign an activity date for one of the plurality of activities to said first graphical object and another activity date for said one of the plurality of activities to said second graphical object;

wherein said processor is configured to independently arrange said first and said second graphical objects for each of the activities on said timeline in chronological order based on the associated activity date for each of the activities, and wherein said processor is configured to arrange said first and said second graphical objects without regard to any relationship between the activities; and wherein said activity date associated with said first graphical object can occur after said activity date associated with said second graphical object.

23. The system as claimed in claim 22, further including a third graphical object, said processor being configured to generate said third graphical object and said third graphical object comprising a linear graphical element for joining said first and said second graphical objects associated with one of said plurality of activities.

24. The system as claimed in claim 23, wherein said linear graphical element represents a duration of time associated with the one of the said plurality of activities.

25. The system as claimed in claim 24, wherein said activity date associated with said second graphical object has occurred and said activity date associated with said first graphical object comprises a time still to occur.

26. A computer system comprising:

a graphical user interface display system operatively coupled to a processor, implemented at least in part in hardware, for generating a graphical representation of one or more business processes comprising data retrieved from a database, said graphical user interface display system including, a business process entry screen comprising a user responsive component configured to define a business process for display in a chart screen;

said business process entry screen comprising a user responsive component configured to select one or more activities associated with said business process;

said processor being configured to retrieve date information and an activity state from said database for each of said selected activities;

said processor being configured to generate a graphical representation of the business process for display on said chart screen and said graphical representation comprising a timeline and a graphical element for each of said one or more selected activities and said processor being configured to generate an activity date for each of said graphical elements based on said date information for each of said selected one or more activities and said processor being configured to display each of said graphical elements based on said state for the associated activity; and said processor being configured to independently arrange said graphical element for each of said selected one or more activities on said timeline in a chronological order based on said activity date for said graphical element corresponding to said selected one or more activities, and wherein independently arranging comprises arranging one or more of said graphical elements without regard to any relationship between said selected one or more activities.

27. The computer system as claimed in claim 26, wherein said business process entry screen comprises a user responsive component configured to select a business process from a plurality of predefined business processes.

28. The computer system as claimed in claim 26, wherein said business process entry screen comprises a user responsive component configured to define a chart start date associated with the display of the graphical representation of said business process on said chart screen, and a user responsive component configured to define a chart end date associated with the display of the graphical representation of said business process on said chart screen.

29. The computer system as claimed in claim 26, further including a filter screen comprising a user responsive component configured to create a subset of activities wherein said subset of activities comprises one or more activities selected from said activities associated with said business process, and said processor being configured to generate a graphical representation of the business process comprising a timeline and a graphical element for each of said one or more selected activities and said processor being configured to generate a single activity date for each of said graphical elements based on said date information for each of said one or more activities comprising said subset of activities and said processor being configured to display each of said graphical elements based on said activity state for the associated activity.

30. The computer system as claimed in claim 26, wherein said business process comprises a plurality of business process instances, and said chart screen comprises a user responsive component configured to align the graphical representation of one or more of said plurality of business process instances according to a user defined parameter.

31. A computer system for displaying a business process comprising a plurality of workflow events, said system comprising:

an interface module comprising a graphical interface configured to be responsive to user actions for inputting data, wherein said data comprises data associated with each of the plurality of workflow events, and said data including a workflow event date for each the plurality of workflow events;

a processor, implemented at least in part in hardware, configured for processing said data and generating a graphical representation comprising a timeline and a graphical element for each of the plurality of workflow events and said processor being configured to generate a single activity date for each of said graphical elements based on said workflow event date; and said processor being configured to independently arrange each of said graphical elements in chronological order on said timeline based on said associated activity date for each of the plurality of workflow events, and wherein said processor is configured to independently arrange comprises arranging one or more of said graphical elements without regard to any relationship between the one or more of the plurality of workflow events, and the arrangement of said graphical elements on said timeline providing a time-based notation characterizing the business process, wherein the business process comprises a chronological sequence of one or more of the plurality of workflow events, and said processor being configured to display said graphical elements associated with said one or more of the plurality of workflow events under a condition wherein said activity date is unknown for one or more of said other workflow events or under a condition wherein said activity dates for one or more of said workflow events are inconsistent with said chronological sequence for the business process.

* * * * *